US009982754B2

(12) United States Patent
Morris et al.

(10) Patent No.: US 9,982,754 B2
(45) Date of Patent: May 29, 2018

(54) DUAL CLUTCH POWERSHIFTING TRANSMISSION

(71) Applicant: Eaton Corporation, Cleveland, OH (US)

(72) Inventors: Benjamin Morris, Houston, TX (US); Thomas Joseph Stoltz, Allen Park, MI (US)

(73) Assignee: Eaton Corporation, Cleveland, OH (US)

( * ) Notice: Subject to any disclaimer, the term of this patent is extended or adjusted under 35 U.S.C. 154(b) by 126 days.

(21) Appl. No.: 15/215,855

(22) Filed: Jul. 21, 2016

(65) Prior Publication Data

US 2016/0327125 A1    Nov. 10, 2016

Related U.S. Application Data

(63) Continuation of application No. 14/106,087, filed on Dec. 13, 2013, now Pat. No. 9,400,036.

(Continued)

(51) Int. Cl.
*F16H 3/08* (2006.01)
*F16H 3/00* (2006.01)
(Continued)

(52) U.S. Cl.
CPC .......... *F16H 3/006* (2013.01); *F16H 3/0915* (2013.01); *F16H 3/097* (2013.01);
(Continued)

(58) Field of Classification Search
CPC ............. F16H 2003/0933; F16H 3/097; F16H 2003/0826; F16H 2061/0448;
(Continued)

(56) References Cited

U.S. PATENT DOCUMENTS 5,125,282 A    6/1992    Bender et al.
6,012,561 A    1/2000    Reed et al.
(Continued)

FOREIGN PATENT DOCUMENTS

DE    102008002554 A1    12/2009
DE    102009014359 A1    9/2010
(Continued)

OTHER PUBLICATIONS

Resch et al., "Advanced power shift transmissions for commercial vehicles", Jun. 8, 2010, 4th CTI Symposium and Exhibition, Automotive Transmissions and Drive Trains North America, Ann Arbor, 35 pages.

*Primary Examiner* — Jake Cook
(74) *Attorney, Agent, or Firm* — RMCK Law Group PLC

(57) ABSTRACT

A dual clutch transmission is provided with first and second coaxial input shafts, at least one mainshaft, and an output shaft that are coaxial with one another. The transmission has a countershaft offset from the first input shaft that supports seven countershaft gear elements drivably connected to respective gear elements on the first and second input shafts and the at least one mainshaft thereby forming seven forward gear meshes for the transmission. The seven forward gear meshes provide at least nine forward gear ratios for the transmission. The transmission is powershiftable between consecutive gear ratios of the at least nine gear ratios such that no torque interrupt occurs during sequential shifts.

20 Claims, 38 Drawing Sheets

Related U.S. Application Data

(60) Provisional application No. 61/737,180, filed on Dec. 14, 2012.

(51) Int. Cl.
*F16H 3/091* (2006.01)
*F16H 3/097* (2006.01)
*F16H 3/093* (2006.01)

(52) U.S. Cl.
CPC ............ *F16H 2003/0803* (2013.01); *F16H 2003/0807* (2013.01); *F16H 2003/0818* (2013.01); *F16H 2003/0826* (2013.01); *F16H 2003/0933* (2013.01); *F16H 2200/0065* (2013.01); *F16H 2200/0069* (2013.01); *Y10T 74/19228* (2015.01)

(58) Field of Classification Search
CPC .......... F16H 2200/0065; F16H 3/0915; F16H 3/006; F16H 2003/0803
See application file for complete search history.

(56) References Cited

U.S. PATENT DOCUMENTS

| | | | |
|---|---|---|---|
| 6,044,719 A | 4/2000 | Reed et al. | |
| 6,460,425 B1 | 10/2002 | Bowen | |
| 6,463,821 B1 | 10/2002 | Reed et al. | |
| 6,675,668 B2 | 1/2004 | Schamscha | |
| 6,790,159 B1 | 9/2004 | Buchanan et al. | |
| 6,819,997 B2 | 11/2004 | Buchanan et al. | |
| 6,869,382 B2 | 3/2005 | Leising et al. | |
| 6,883,394 B2 | 4/2005 | Koenig et al. | |
| 6,898,992 B2 | 5/2005 | Koenig et al. | |
| 6,909,955 B2 | 6/2005 | Vukovich et al. | |
| 6,953,417 B2 | 10/2005 | Koenig | |
| 7,040,186 B2 | 5/2006 | Pollak | |
| 7,073,407 B2 | 7/2006 | Stefina | |
| 7,127,961 B2 | 10/2006 | Braford et al. | |
| 7,155,993 B2 | 1/2007 | Koenig et al. | |
| 7,171,867 B2 | 2/2007 | McCrary et al. | |
| 7,225,695 B2 | 6/2007 | Gumpoltsberger et al. | |
| 7,231,843 B2 | 6/2007 | Gumpoltsberger et al. | |
| 7,267,022 B2 | 9/2007 | Gumpoltsberger et al. | |
| 7,272,985 B2 | 9/2007 | Gumpoltsberger et al. | |
| 7,287,443 B2 | 10/2007 | Kuhstrebe et al. | |
| 7,311,015 B2 | 12/2007 | Kluge | |
| 7,313,981 B2 | 1/2008 | Gumpoltsberger | |
| 7,377,191 B2 | 5/2008 | Gitt | |
| 7,384,374 B2 | 6/2008 | Jiang | |
| 7,387,590 B2 | 6/2008 | Dreher | |
| 7,421,919 B2 | 9/2008 | Gumpoltsberger et al. | |
| 7,437,963 B2 | 10/2008 | Haka et al. | |
| 7,469,609 B2 | 12/2008 | Baldwin | |
| 7,472,617 B2 | 1/2009 | Nicklass | |
| 7,500,411 B2 | 3/2009 | Gumpoltsberger | |
| 7,510,506 B2 | 3/2009 | Kupper et al. | |
| 7,540,823 B2 | 6/2009 | Kilian et al. | |
| 7,552,658 B2 | 6/2009 | Forsyth | |
| 7,587,957 B2 | 9/2009 | Jackson | |
| 7,658,261 B2 | 2/2010 | Pfund | |
| 7,665,376 B2 | 2/2010 | Forsyth | |
| 7,730,799 B2 | 6/2010 | Drabek | |
| 7,878,083 B2 | 2/2011 | Nicklass et al. | |
| 7,886,626 B2 | 2/2011 | Bjorck et al. | |
| 8,001,863 B2 | 8/2011 | Patzner | |
| 8,011,261 B2 | 9/2011 | Diemer et al. | |
| 8,117,932 B2 | 2/2012 | Bjorck et al. | |
| 8,151,662 B2 | 4/2012 | Fitzgerald et al. | |
| 8,201,469 B2 | 6/2012 | Akashi et al. | |
| 8,220,606 B2 | 7/2012 | Dreher | |
| 8,230,753 B2 | 7/2012 | Jackson | |
| 2007/0214904 A1 | 9/2007 | Ohnemus | |
| 2008/0000311 A1* | 1/2008 | Baldwin | F16H 3/006 74/331 |
| 2009/0223317 A1 | 9/2009 | Annear | |
| 2010/0096232 A1 | 4/2010 | Buchanan et al. | |
| 2010/0186532 A1 | 7/2010 | Stefina | |
| 2010/0192717 A1 | 8/2010 | Gitt | |
| 2011/0042177 A1 | 2/2011 | Bauer et al. | |
| 2011/0067512 A1 | 3/2011 | Kang et al. | |
| 2011/0290072 A1 | 12/2011 | Xie et al. | |
| 2012/0160044 A1* | 6/2012 | Kahl | F16H 3/006 74/330 |
| 2012/0168274 A1 | 7/2012 | Mills | |
| 2012/0260756 A1 | 10/2012 | Mellet et al. | |
| 2013/0160588 A1 | 6/2013 | Dreibholz et al. | |
| 2014/0109705 A1* | 4/2014 | Reisch | F16H 3/006 74/331 |

FOREIGN PATENT DOCUMENTS

| | | | |
|---|---|---|---|
| WO | 2010127651 A1 | 11/2010 | |
| WO | 2012116867 A1 | 9/2012 | |
| WO | WO 2012159794 A1 * | 11/2012 | ............ F16H 3/006 |

* cited by examiner

GEAR #7
RATIO 1.21:1
POWER UPSHIFT: YES

GEAR #8
RATIO 1.00:1
POWER UPSHIFT: YES

GEAR #9
RATIO 0.85:1
POWER UPSHIFT: N/A

Gear #1 Driving (solid)
Gear #2 Pre-selected (dashed)
Ratio 13.60:1
Power Upshift: Yes Gear #2 Driving (solid)
Gear #3 Pre-selected (dashed)
Ratio 7.77:1
Power Upshift: Yes Gear #3 Driving (solid)
Gear #4 Pre-selected (dashed)
Ratio 4.44:1
Power Upshift: Yes Gear #4 Driving (solid)
Gear #5 Pre-selected (dashed)
Ratio 2.54:1
Power Upshift: Yes Gear #5 Driving (solid)
Gear #6 Pre-selected (dashed)
Ratio 2.01:1
Power Upshift: Yes Gear #6 Driving (solid)
Gear #7 Pre-selected (dashed)
Ratio 1.64:1
Power Upshift: Yes Gear #7 Driving (solid)
Gear #8 Pre-selected (dashed)
Ratio 1.21:1
Power Upshift: Yes Gear #8 Driving (solid)
Gear #9 Pre-selected (dashed)
Ratio 1.00:1
Power Upshift: Yes Gear #9 Driving (solid)
Ratio 0.85:1
Power Upshift: N/A Gear #1 Driving (solid)
Gear #2 Pre-selected (dashed)
Ratio 13.60:1
Power Upshift: Yes Gear #2 Driving (solid)
Gear #3 Pre-selected (dashed)
Ratio 7.77:1
Power Upshift: Yes Gear #3 Driving (solid)
Gear #4 Pre-selected (dashed)
Ratio 4.44:1
Power Upshift: Yes Gear #4 Driving (solid)
Gear #5 Pre-selected (dashed)
Ratio 2.54:1
Power Upshift: Yes Gear #5 Driving (solid)
Gear #6 Pre-selected (dashed)
Ratio 2.03:1
Power Upshift: Yes Gear #6 Driving (solid)
Gear #7 Pre-selected (dashed)
Ratio 1.56:1
Power Upshift: Yes Gear #7 Driving (solid)
Gear #8 Pre-selected (dashed)
Ratio 1.25:1
Power Upshift: Yes Gear #8 Driving (solid)
Gear #9 Pre-selected (dashed)
Ratio 1.00:1
Power Upshift: Yes Gear #9 Driving (solid)
Ratio 0.80:1
Power Upshift: N/A

GEAR #4
RATIO 2.54:1
POWER UPSHIFT: YES

GEAR #5
RATIO 2.03:1
POWER UPSHIFT: YES

GEAR #6
RATIO 1.56:1
POWER UPSHIFT: YES

Gear #1 Driving (solid)
Gear #2 Pre-selected (dashed)
Ratio 13.60:1
Power Upshift: Yes Gear #2 Driving (solid)
Gear #3 Pre-selected (dashed)
Ratio 7.77:1
Power Upshift: Yes Gear #3 Driving (solid)
Gear #4 Pre-selected (dashed)
Ratio 4.44:1
Power Upshift: Yes Gear #4 Driving (solid)
Gear #5 Pre-selected (dashed)
Ratio 2.54:1
Power Upshift: Yes Gear #5 Driving (solid)
Gear #6 Pre-selected (dashed)
Ratio 2.03:1
Power Upshift: Yes Gear #6 Driving (solid)
Gear #7 Pre-selected (dashed)
Ratio 1.56:1
Power Upshift: Yes

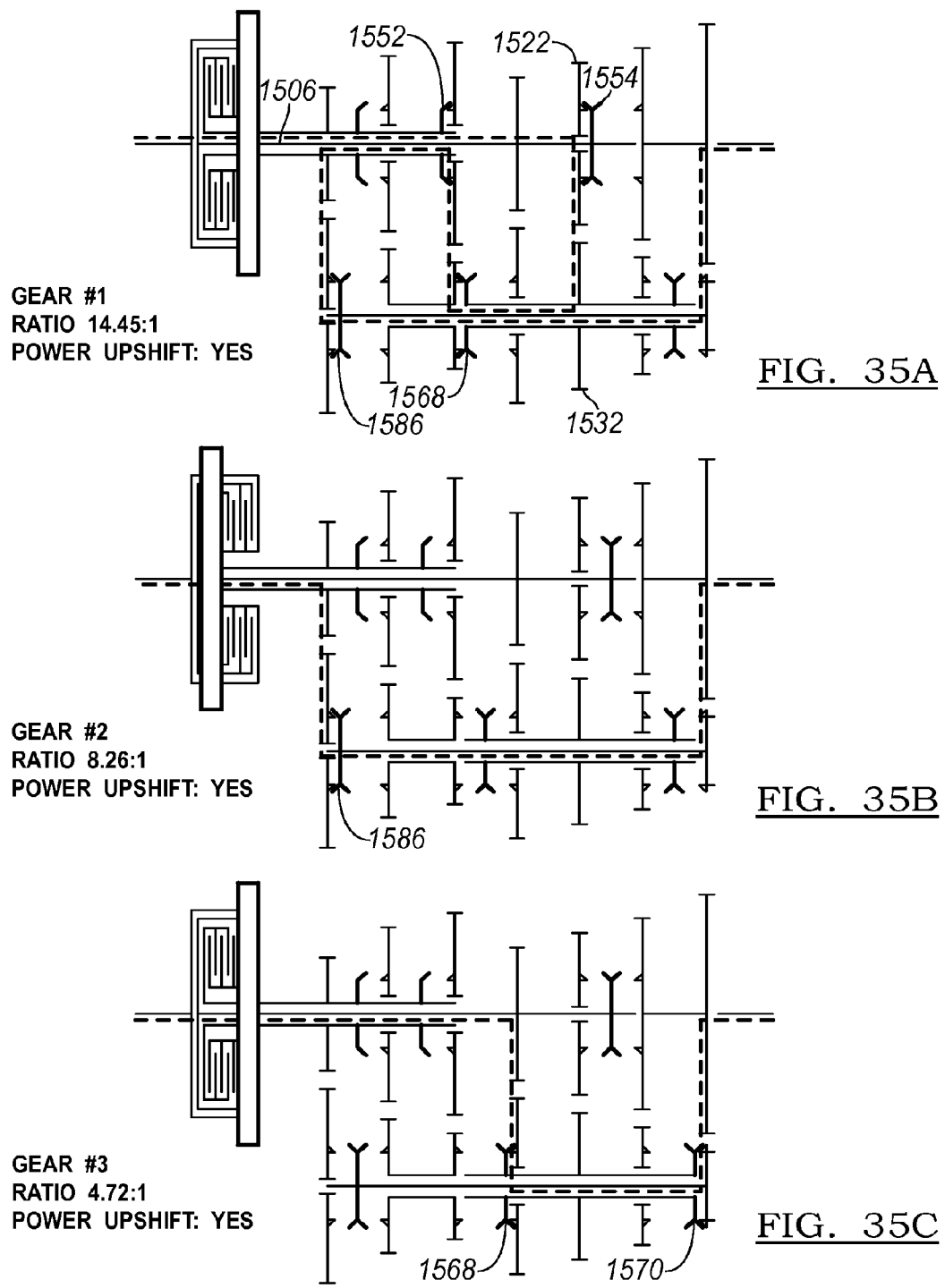

GEAR #7
RATIO 1.48:1
POWER UPSHIFT: YES

GEAR #8
RATIO 1.25:1
POWER UPSHIFT: YES

Gear #1 Driving (solid)
Gear #2 Pre-selected (dashed)
Ratio 14.45:1
Power Upshift: Yes Gear #2 Driving (solid)
Gear #3 Pre-selected (dashed)
Ratio 8.26:1
Power Upshift: Yes Gear #3 Driving (solid)
Gear #4 Pre-selected (dashed)
Ratio 4.72:1
Power Upshift: Yes Gear #4 Driving (solid)
Gear #5 Pre-selected (dashed)
Ratio 2.70:1
Power Upshift: Yes Gear #5 Driving (solid)
Gear #6 Pre-selected (dashed)
Ratio 2.19:1
Power Upshift: Yes Gear #6 Driving (solid)
Gear #7 Pre-selected (dashed)
Ratio 1.82:1
Power Upshift: Yes

DUAL CLUTCH POWERSHIFTING TRANSMISSION

CROSS-REFERENCE TO RELATED APPLICATIONS

This application is a continuation of U.S. patent application Ser. No. 14/106,087 filed on Dec. 13, 2013, issued on Jul. 26, 2016 as U.S. Pat. No. 9,400,036, which claims the benefit of U.S. provisional Application No. 61/737,180 filed on Dec. 14, 2012, the disclosures of which are incorporated in their entirety by reference herein.

FIELD

Various embodiments relate to a powershifting dual clutch transmission.

BACKGROUND

Conventional automotive vehicle powertrains typically have multiple-ratio transmission mechanisms that establish power delivery paths from an engine to vehicle traction wheels. Adequate powertrain performance for heavy-duty or medium-duty powertrains requires more than one range of gear ratios so that the speed and torque characteristic of the engine will provide optimum traction wheel power throughout the operating speed range for the vehicle. Ratio range gearing, therefore, typically is used with a transmission mechanism in such high torque capacity powertrains so that sufficient overall gear ratio coverage is provided.

One class of transmission mechanisms in automotive vehicle powertrains includes countershaft gearing having power delivery gears journaled on a transmission mainshaft and countershaft gear elements journaled on a countershaft arranged in spaced, parallel disposition with respect to the mainshaft. The countershaft gear elements typically mesh with the gears mounted on a mainshaft axis. Controlled clutches, which may be either positive drive dog clutches or synchronizer clutches, selectively connect torque transmitting gears on the mainshaft axis to the mainshaft, thereby establishing a power delivery path from the engine to the traction wheels. The controlled clutches may be operator controlled, computer controlled, or automatically controlled. In other countershaft transmission mechanisms, the dog clutches or the synchronizer clutches may be mounted on the countershaft axis to selectively engage countershaft gear elements with torque transmitting gears on the mainshaft.

It is known in the art to use a dual clutch arrangement for selectively connecting the engine to first and second torque input gears, sometimes called headset gears, of a countershaft transmission mechanism. A dual clutch arrangement makes it possible for a countershaft transmission mechanism to be powershifted from one ratio to another. As one of the dual clutches is engaged, the other is disengaged. The engaged clutch will establish a power delivery path through the countershaft gear elements and through the main transmission gears as one or more of the ratio change clutches are engaged. A ratio change clutch for a main transmission gear, or a countershaft gear element that is not involved in a given selected power flow path, can be pre-engaged in preparation for a ratio change to an adjacent ratio. When a ratio change is initiated, the ratio change clutch for one main gear or for one countershaft gear element is disengaged, and a power flow path is established by the preengaged ratio change clutch for a second main gear or a second countershaft gear element. The dual clutches of the dual clutch arrangement are alternately engaged and disengaged ("swapped" or "traded") thereby providing a smooth transition from one ratio to an adjacent ratio in a seamless fashion.

If the powertrain includes multiple speed range gearing in a torque flow path from the multiple ratio transmission mechanism to the vehicle traction wheels, it is necessary with known heavy-duty or medium-duty powertrains for the torque flow path to be interrupted during a transition from one range to the other. That torque interruption may deteriorate the shift quality and cause drivability issues due to the loss of acceleration during the shift resulting in an un-smooth acceleration, loss of speed during the shift, and/or longer times to reach a desired cruise speed. Further, the time needed to execute a ratio change in the range gearing increases the time needed to execute a shift between the highest overall ratio for one range to the adjacent lowest overall ratio for another range.

The ability to shift a dual clutch transmission between two gear ratios during a tip-in event, such as when the accelerator pedal is engaged or the throttle is at least partially opened, is a powershift event. Torque interrupts during a shift by the transmission may be avoided if the transmission is designed such that it powershifts. Currently, dual clutch transmissions exists that partially powershift, or powershift through only a portion of the shifts such that there are still some remaining torque interrupts. However, it is difficult to design a transmission with the appropriate gear ratios and step sizes where all of the shifts are powershifts such that the transmission is fully powershiftable. As a dual clutch transmission becomes more complex and include a greater number of speeds, packaging concerns also arise. It becomes even more difficult to provide powershifting between all of the gear ratios such that the transmission is fully and continuously powershiftable with no torque interrupts for a shift while minimizing a part count for the transmission to meet packaging and other requirements.

SUMMARY

Various embodiments of the present disclosure have associated non-limiting advantages. For example, a dual clutch transmission is provided that has a single countershaft and seven gear meshes. The seven gear meshes cooperate to provide at least nine gear or speed ratios for the transmission. The transmission is fully powershiftable for consecutive shifts between the nine gear ratios, thereby eliminating torque interrupts caused by shifting.

A dual clutch transmission according to one example of the present disclosure includes a first input shaft supporting a first headset gear element and a second headset gear element. A second input shaft is concentric with the first input shaft and supports a third headset gear element, a fourth headset gear element, and a fifth headset gear element. A mainshaft is coaxial with the first input shaft and supports a pair of mainshaft gear elements. A countershaft is offset from the first input shaft and supports seven countershaft gear elements drivably connected to respective gear elements on the first and second input shafts and the mainshaft thereby forming seven forward gear meshes for the transmission. The seven gear meshes provide at least nine forward gear ratios. An output shaft is coaxial with and connected to the mainshaft for rotation therewith. The transmission is powershiftable between consecutive gear ratios of the at least nine gear ratios such that no torque interrupt occurs during sequential shifts.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIGS. 35A-J illustrate various powerpaths for the transmission of FIG. 32; and

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Various transmission layouts are provided in the disclosure and include fully powershiftable, single countershaft dual clutch transmissions without torque interrupts where part counts and packaging have been factored into the design. The various embodiments described herein include seven layer dual clutch transmission with nine or more speeds. However, if the design is constrained further, for example, by step sizing requirements, various embodiments may extend to including eight layer, single countershaft, powershifting dual clutch transmissions with ten, eleven, or more speeds.

Figure 1:
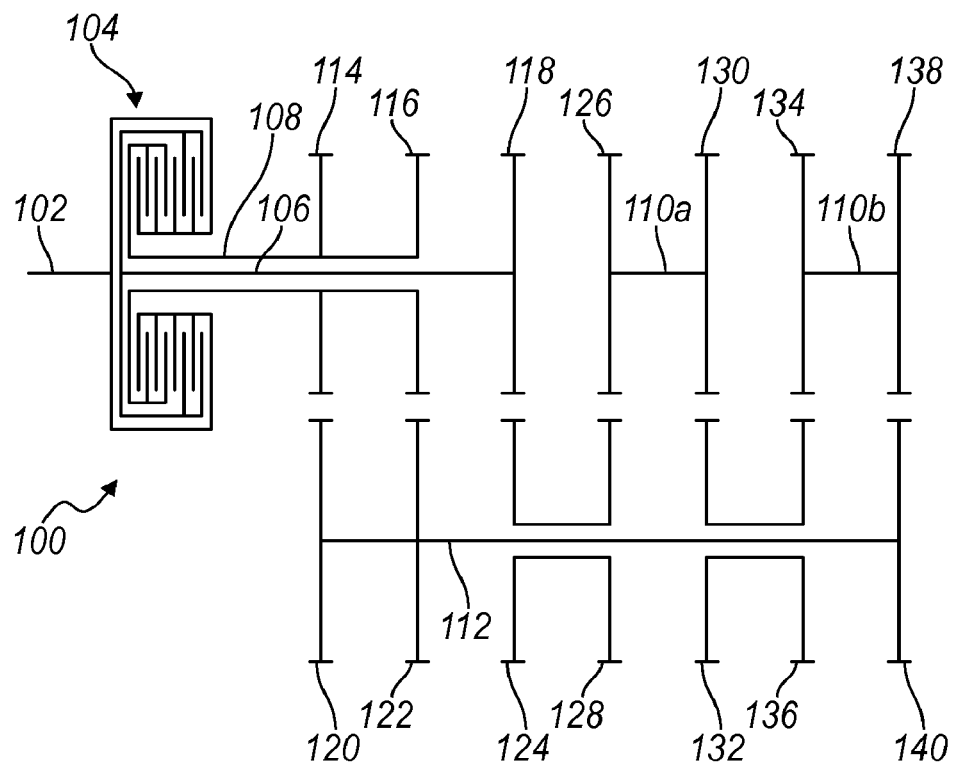
FIG. 1 is a diagram for a powershifting dual clutch transmission according to an embodiment.

FIG. 1 illustrates an embodiment of a multiple speed, dual clutch transmission layout. FIG. 1 depicts a dual clutch transmission 100 having concentric input shafts, a single countershaft, and seven layers of gear meshes. FIG. 1 represents a shaft layout of the transmission 100 and is not limiting in terms of how the gears are attached to the input shaft, a mainshaft, or countershaft. It is also possible to use various clutch arrangements and gear diameter sizing with the transmission 100, examples of which are described below.

A shaft 102 is connected to the dual clutch 104 of the transmission 100. Shaft 102 may be connected to a prime mover, such as an engine, that provides input torque to the transmission 100. The dual clutch 104 is configured to provide torque to either a first input torque shaft 106 or a second input torque shaft 108 from shaft 102. Input shaft 108 is a sleeve shaft that surrounds input shaft 106. Input shaft 108 may be journaled within the transmission housing (not shown). Input shaft 106 is journaled within input shaft 108. Shafts 106, 108 are coaxial with one another.

The transmission 100 has one or more mainshaft sections 110. The mainshaft 110 is coaxial with the input shafts 106, 108. The transmission has a single countershaft 112. The countershaft 112 is offset from the input shafts 106, 108 and mainshaft 110. The transmission 100 also has an output shaft (not shown), that may be coaxial with the mainshaft 110.

Input shaft 108 has first and second headset gears 114, 116. The headset gears 114, 116 may be directly connected to the shaft 108, for example, by a splined connection or other drivable connection. Alternatively, one or both of the headset gears 110, 112 may be journaled to the shaft 108 for selective connection, for example, by a clutch device, such as a synchronizing clutch assembly, a dog clutch, or the like. Shaft 106 has a headset gear 118 that may be directly connected to the shaft 106, or journaled to the shaft 106 for selective connection to the shaft 106.

The transmission 100 has seven layers of gear meshes. For example, one layer of gear mesh is formed by gear 114 and gear 120. Gear 116 meshes with gear 122 on the countershaft 112. Gear 118 meshes with gear 124 on the countershaft. Another layer of gear mesh is formed by gear 126 on the mainshaft 110 and gear 128 on the countershaft 112. Gear 130 on the mainshaft 110 meshes with gear 132 on the countershaft 112. Gear 134 on the mainshaft 110 meshes with gear 136 on the countershaft 112. Gear 138 on the mainshaft 110 meshes with gear 140 on the countershaft 112.

Gears 126, 130, 134, 138 on the mainshaft 110 may be directly connected to the mainshaft 110 for rotation therewith, or may be journaled to the mainshaft 110 for selective connection therewith. Gears 120, 122, 124, 128, 132, 136 on the countershaft 112 may be directly connected to the countershaft 112 for rotation therewith, or alternatively, may be journaled to the countershaft 112 for selective connection therewith. More than one gear may be connected for rotation together. For example, the gear 120, 122, and 140 are connected or journaled to the countershaft 112, and gears 124, 128, 132, and 136 are connected or journaled to a common journaled sleeve shaft.

Figure 2:
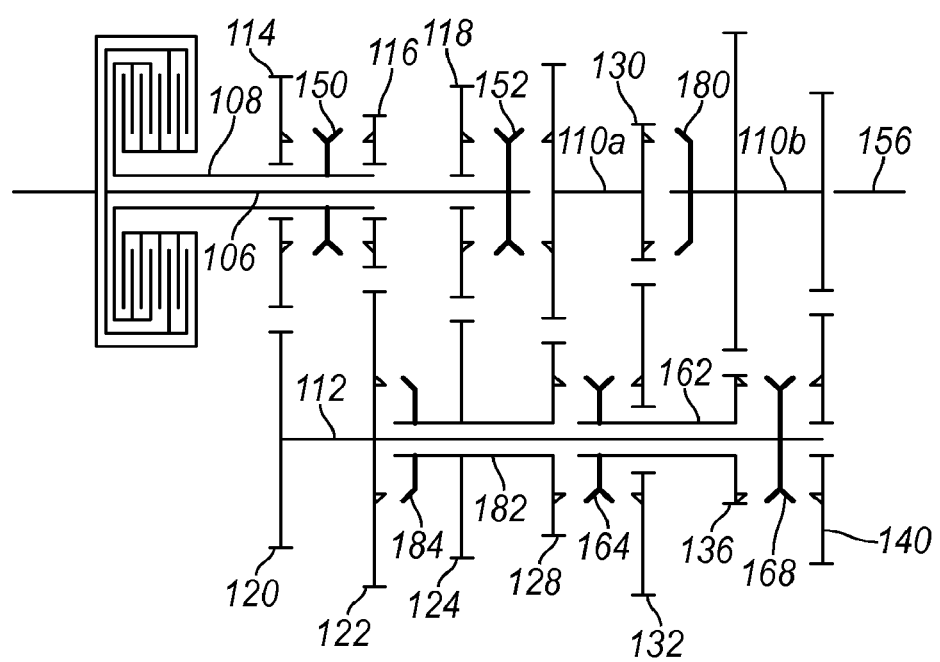
FIG. 2 is a diagram for the transmission of FIG. 1 with clutch placements according to an embodiment.

FIG. 2 illustrates the transmission 100 with clutch placements and gear element to shaft connections according to an embodiment. FIG. 2 uses the same reference numerals for elements in common with those shown in FIG. 1.

Headset gears 114, 116 are journaled to the shaft 108. A clutch 150, such as a synchronizer clutch sleeve, connects either gear 114 or gear 116 to the shaft 108 for rotation therewith.

Headset gear 118 is journaled to shaft 106. A clutch 152 is connected to shaft 106 and configured to connect headset gear 118 to shaft 106 for rotation therewith. The clutch 152 may alternatively connect the input shaft 106 to mainshaft gear element 126, thereby connecting the input shaft 106 to the mainshaft 110a for rotation therewith.

The mainshaft is made of two sections in FIG. 2. The first mainshaft section 110a may be connected to the second mainshaft section 110b by use of a clutch 180 located on mainshaft 110b. The clutch 180 connects the mainshaft section 110b to mainshaft gear element 130 of the first mainshaft section 110a. The output shaft 156 is coaxial with and connected to the second mainshaft section 110b, for example, using a splined connection.

The countershaft 112 has countershaft gear elements 120, 122 directly connected to it. Countershaft gear elements 124, 128 are on a common sleeve shaft 182 journaled to the countershaft 112. A clutch 184 is connected to the sleeve shaft 182 and is configured to connect the sleeve shaft 182 to gear element 122.

Countershaft gear element 136 is connected to a second sleeve shaft 162 journaled to the countershaft 112. Countershaft gear element 132 is journaled to the second sleeve shaft 162. A clutch 164 is configured to connect the second sleeve shaft 162 to countershaft gear element 128 and the first sleeve shaft 158. Alternatively, clutch 164 may connect journaled countershaft gear element 132 to the second sleeve shaft 162 for rotation therewith.

Countershaft gear element 140 is journaled to the countershaft 112. A clutch 168 is connected to the countershaft 112. The clutch 168 may connect the countershaft 112 to countershaft gear element 136 and the second sleeve shaft 162. Alternatively, the clutch 168 may connect the countershaft 112 to countershaft gear element 140 for rotation therewith.

Figure 3:
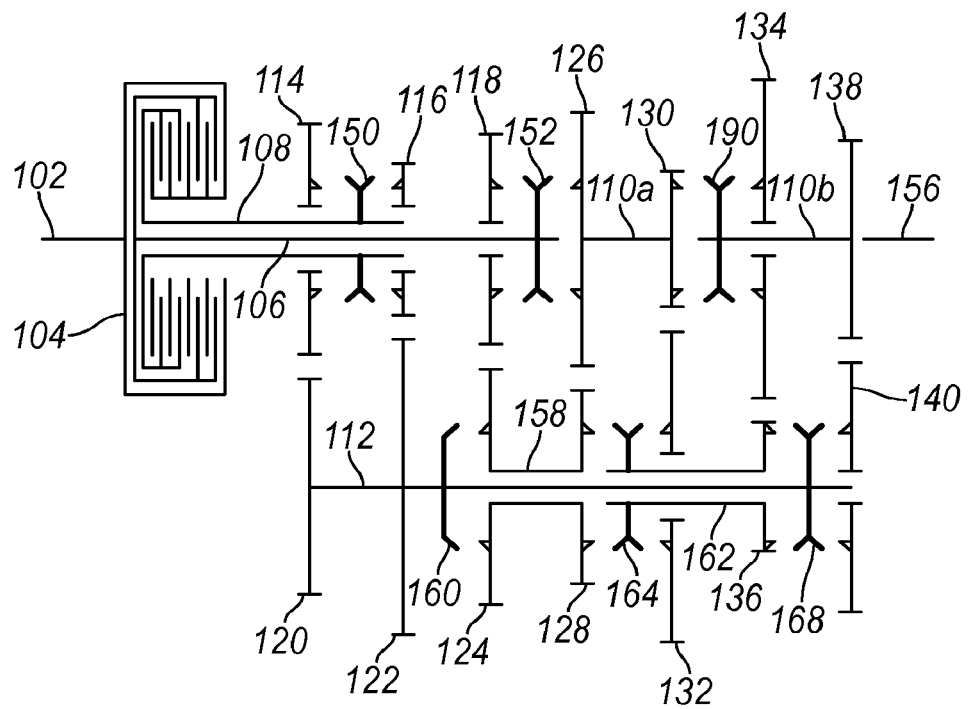
FIG. 3 is a diagram for the transmission of FIG. 1 with clutch placements according to another embodiment.

FIG. 3 illustrates the transmission 100 with clutch placements and gear element to shaft connections according to another embodiment. FIG. 3 uses the same reference numerals for elements in common with those shown in FIGS. 1-2.

Headset gears 114, 116 are journaled to the shaft 108. A clutch 150, such as a synchronizer clutch sleeve, connects either gear 114 or gear 116 to the shaft 108 for rotation therewith.

Headset gear 118 is journaled to shaft 106. A clutch 152 is connected to shaft 106 and configured to connect headset gear 118 to shaft 106 for rotation therewith. The clutch 152 may alternatively connect the input shaft 106 to mainshaft gear element 126, thereby connecting the input shaft 106 to the mainshaft 110a for rotation therewith.

The mainshaft is made of two sections in FIG. 3. The first mainshaft section 110a may be connected to the second mainshaft section 110b by use of a clutch 190 located on mainshaft 110b. The clutch 190 connects the mainshaft section 110b to mainshaft gear element 130 that is connected to the first mainshaft section 110a.

The mainshaft gear element 134 is journaled to mainshaft section 110b. Clutch 190 may also be used to connect the gear element 134 to mainshaft section 110b for rotation therewith. The output shaft 156 is coaxial with and connected to the second mainshaft section 110b, for example, using a splined connection.

The countershaft 112 has countershaft gear elements 120, 122 directly connected to it. Countershaft gear elements 124, 128 are on a common sleeve shaft 158 journaled to the countershaft 112. A clutch 160 supported by countershaft 112 is configured to connect the countershaft 112 to gear element 124.

Countershaft gear element 136 is connected to a second sleeve shaft 162 journaled to the countershaft 112. Countershaft gear element 132 is journaled to the second sleeve shaft 162. A clutch 164 is configured to connect the second sleeve shaft 162 to countershaft gear element 128 and the first sleeve shaft 158. Alternatively, clutch 164 may connect journaled countershaft gear element 132 to the second sleeve shaft 162 for rotation therewith.

Countershaft gear element 140 is journaled to the countershaft 112. A clutch 168 is connected to the countershaft 112. The clutch 168 may connect the countershaft 112 to countershaft gear element 136 and the second sleeve shaft 162. Alternatively, the clutch 168 may connect the countershaft 112 to countershaft gear element 140 for rotation therewith.

Figure 4:
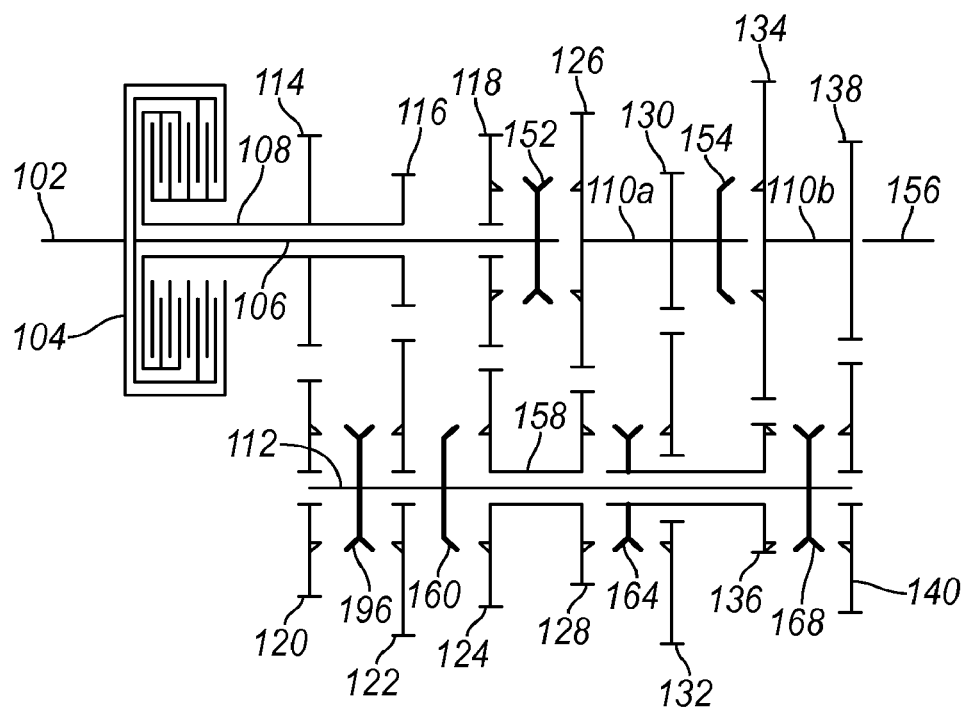
FIG. 4 is a diagram for the transmission of FIG. 1 with clutch placements according to yet another embodiment.

FIG. 4 illustrates the transmission 100 with clutch placements and gear to shaft connections according to yet another embodiment. FIG. 4 uses the same reference numerals for elements in common with those shown in FIGS. 1-3.

Headset gears 114, 116 are connected to the shaft 108 for rotation therewith, for example, using a splined connection. Headset gear 118 is journaled to shaft 106. A clutch 152 is configured to connect headset gear 118 to shaft 106 for rotation therewith. The clutch 152 may alternatively connect the input shaft 106 to mainshaft gear element 126, thereby connecting the input shaft 106 to the mainshaft 110a for rotation therewith.

The first mainshaft section 110a may be connected to the second mainshaft section 110b by use of a clutch 154 supported by mainshaft 110a. The clutch 154 connects the mainshaft section 110a to mainshaft gear element 134 that is connected to the second mainshaft section 110b. The output shaft 156 is coaxial with and connected to the second mainshaft section 110b, for example, using a splined connection.

The countershaft 112 has countershaft gear elements 120, 122 journaled to it. A clutch 196 is supported by the countershaft 112. The clutch 196 is configured to connect the countershaft gear element 120 to the countershaft 112 for rotation therewith. Alternatively, the clutch 196 may connect countershaft gear element 122 to the countershaft 112 for rotation therewith.

Countershaft gear elements 124, 128 are on a common sleeve shaft 158 journaled to the countershaft 112. A clutch 160 supported by the countershaft 112 is configured to connect the countershaft 112 to gear element 124.

Countershaft gear element 136 is connected to a second sleeve shaft 162 journaled to the countershaft 112. Countershaft gear element 132 is journaled to the second sleeve shaft 162. A clutch 164 is supported by the sleeve shaft 162. The clutch 164 is configured to connect the second sleeve shaft 162 to countershaft gear element 128 and the first sleeve shaft 158. Alternatively, clutch 164 may connect journaled countershaft gear element 132 to the second sleeve shaft 162 for rotation therewith.

Countershaft gear element 140 is journaled to the countershaft 112. A clutch 168 is connected to the countershaft 112. The clutch 168 may connect the countershaft 112 to countershaft gear element 136 and the second sleeve shaft 162. Alternatively, the clutch 168 may connect the countershaft 112 to countershaft gear element 140 for rotation therewith.

Figures 5, 6, 7:
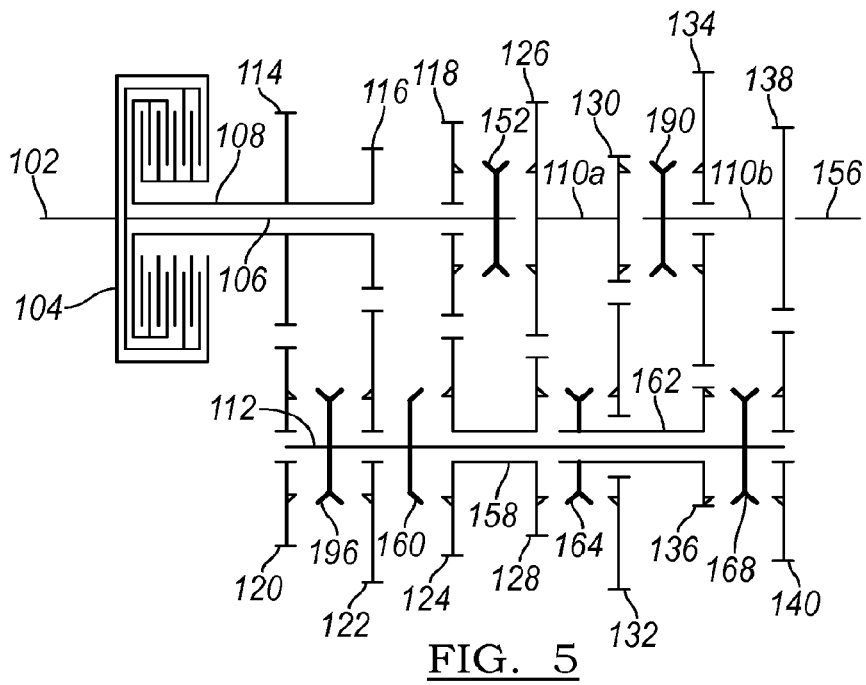
FIG. 5 is a diagram for the transmission of FIG. 1 with clutch placements and gear diameters according to another embodiment.
FIG. 6 is a graph illustrating forward ratios for the transmission layout and gear diameters as shown in FIG. 5.
FIG. 7 is a graph illustrating step sizes for the transmission layout and gear diameters as shown in FIG. 5.

FIG. 5 illustrates the transmission 100 with clutch placements and gear to shaft connections according to another embodiment. FIG. 5 uses the same reference numerals for elements in common with those shown in FIG. 1-4. The gear diameters for the transmission 100 of FIG. 5 according to a non-limiting example are as follows: diameter of gear 114 is 181.1 mm, diameter of gear 116 is 111.8 mm, diameter of gear 188 is 156.2 mm, diameter of gear 126 is 196.8 mm, diameter of gear 130 is 107.0 mm, diameter of gear 134 is 230.0 mm, diameter of gear 138 is 167.6 mm, diameter of gear 120 is 150.9 mm, diameter of gear 122 is 220.2 mm, diameter of gear 124 is 175.8 mm, diameter of gear 128 is 135.2 mm, diameter of gear 132 is 225.0 mm, diameter of gear 136 is 102.0 mm, and diameter of gear 140 is 164.4 mm.

Headset gears 114, 116 are connected to the shaft 108 for rotation therewith, for example, using a splined connection. Headset gear 118 is journaled to shaft 106. A clutch 152 is configured to connect headset gear 118 to shaft 106 for rotation therewith. The clutch 152 may alternatively connect the input shaft 106 to mainshaft gear element 126, thereby connecting the input shaft 106 to the mainshaft 110a for rotation therewith.

The mainshaft is made of two sections in FIG. 5. The first section 110a and second section 110b are coaxial with one another. The first mainshaft section 110a may be connected to the second mainshaft section 110b by use of a clutch 190 located on mainshaft 110b. The clutch 190 connects the mainshaft section 110b to mainshaft gear element 130 that is connected to the first mainshaft section 110a when it is shifted to a left hand position.

The mainshaft gear element 134 is journaled to mainshaft section 110b. Clutch 190 may also be used to connect the gear element 134 to mainshaft section 110b for rotation therewith when it is shifted to a right hand position. The output shaft 156 is coaxial with and connected to the second mainshaft section 110b, for example, using a splined connection.

The countershaft 112 has countershaft gear elements 120, 122 journaled to it. A clutch 196 is supported by the countershaft 112. The clutch 196 is configured to connect the countershaft gear element 120 to the countershaft 112 for rotation therewith. Alternatively, the clutch 196 may connect countershaft gear element 122 to the countershaft 112 for rotation therewith.

Countershaft gear elements 124, 128 are on a common sleeve shaft 158 journaled to the countershaft 112. A clutch 160 supported by the countershaft 112 is configured to connect the countershaft 112 to gear element 124.

Countershaft gear element 136 is connected to a second sleeve shaft 162 journaled to the countershaft 112. Countershaft gear element 132 is journaled to the second sleeve shaft 162. A clutch 164 is supported by the sleeve shaft 162. The clutch 164 is configured to connect the second sleeve shaft 162 to countershaft gear element 128 and the first sleeve shaft 158. Alternatively, clutch 164 may connect journaled countershaft gear element 132 to the second sleeve shaft 162 for rotation therewith.

Countershaft gear element 140 is journaled to the countershaft 112. A clutch 168 is connected to the countershaft 112. The clutch 168 may connect the countershaft 112 to countershaft gear element 136 and the second sleeve shaft 162. Alternatively, the clutch 168 may connect the countershaft 112 to countershaft gear element 140 for rotation therewith.

FIG. 6 illustrates forward ratios for the gear diameters and layout of the transmission 100 of FIG. 5. As can be seen by the graph, each forward gear ratio is smaller than the one before it, such that the gear ratios are monotonically decreasing as the gear number increases. Gear diameters and power paths for the various transmission 100 layouts are selected such that the gear ratio monotonically decreases in this manner. Also shown in the number of meshes engaged to transmit torque for each associated forward ratio.

FIG. 7 illustrates step sizes for the gear diameters and layout of the transmission 100 of FIG. 5. As can be seen by the graph, the step sizes are large in the lower, launch gears and shifts, and small in the higher gears and shifts.

FIG. 8 illustrates an embodiment of various powerpaths for the transmission 100 of FIG. 5. The transmissions illustrated in FIGS. 1-4 have associated powerpaths, and FIG. 8 is not intended to limit the spirit and scope of the disclosure. The transmission 100 as shown in FIGS. 5-8 powershifts between consecutive gear ratios such that there are no torque interrupts during a shift. The torque or power path is illustrated by a dashed line in FIG. 8.

Figure 8A:
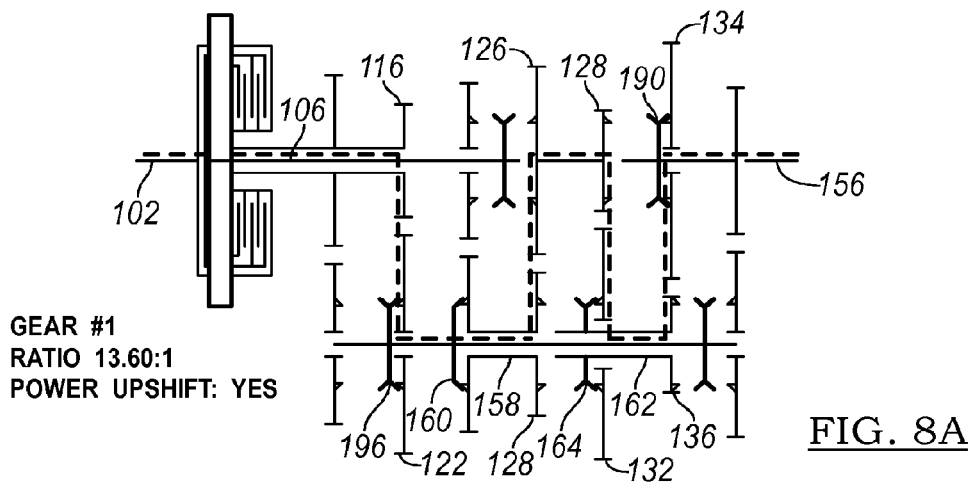
FIGS. 8A-I illustrate various powerpaths for the transmission of FIG. 5.

FIG. 8A illustrates the transmission 100 in a first gear ratio. The torque path for the first gear ratio begins at the input shaft 102, and through the dual clutch 104 that is engaged such that the torque flows to the input shaft 108. Clutch 196 is engaged on the countershaft 112 to connect journaled countershaft gear element 122 to the countershaft 112. Torque flows from the headset gear 116 to countershaft gear element 122 and to the countershaft 112. Clutch 160 connects the countershaft 112 to countershaft gear element 124 such that the torque flows to the journaled sleeve 158, countershaft gear element 128 and mainshaft gear element 126. Torque flows through mainshaft section 110a to mainshaft gear element 128. Clutch 164 is engaged to connect gear 132 to the second countershaft sleeve 162. Clutch 190 connects gear 134 to the mainshaft section 110b such that torque then flows through countershaft gear element 136 to mainshaft gear element 134, and to the output shaft 156 of the transmission 100.

Figure 8B:
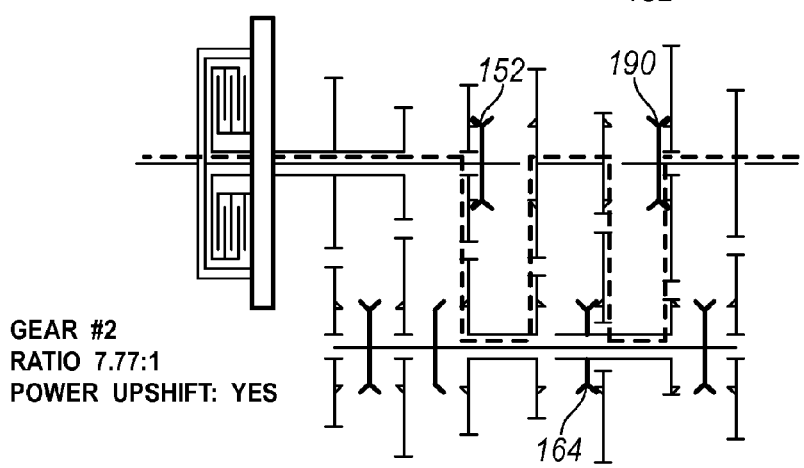

FIG. 8B illustrates the transmission 100 in a second gear ratio. The dual clutch is engaged such that torque flows to the input shaft 106. Clutches 152, 164, and 190 are engaged to provide the torque path as shown.

Figure 8C:
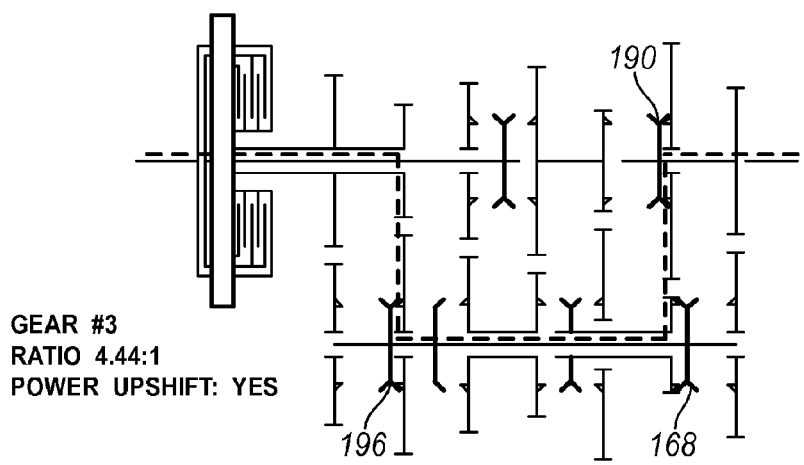

FIG. 8C illustrates the transmission 100 in a third gear ratio. The dual clutch is engaged such that torque flows to the input shaft 108. Clutches 196, 168, and 190 are engaged to provide the torque path as shown.

Figure 8D:
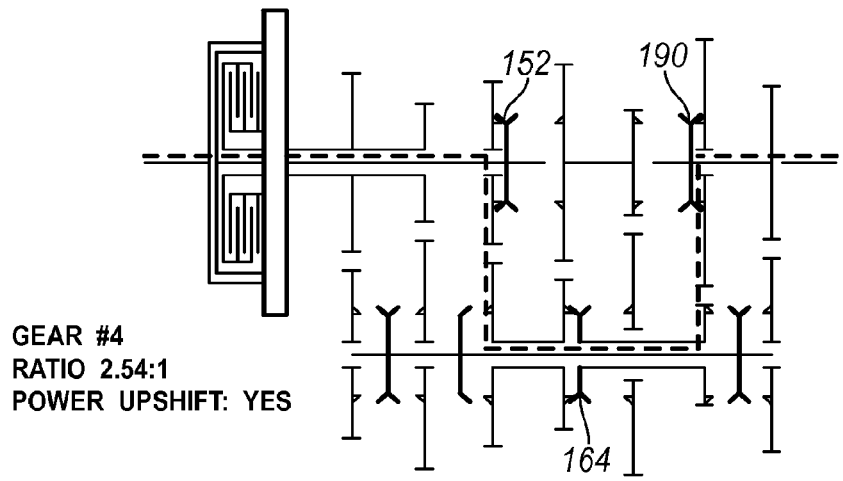

FIG. 8D illustrates the transmission 100 in a fourth gear ratio. The dual clutch is engaged such that torque flows to the input shaft 106. Clutches 152, 164, and 190 are engaged to provide the torque path as shown.

Figure 8E:
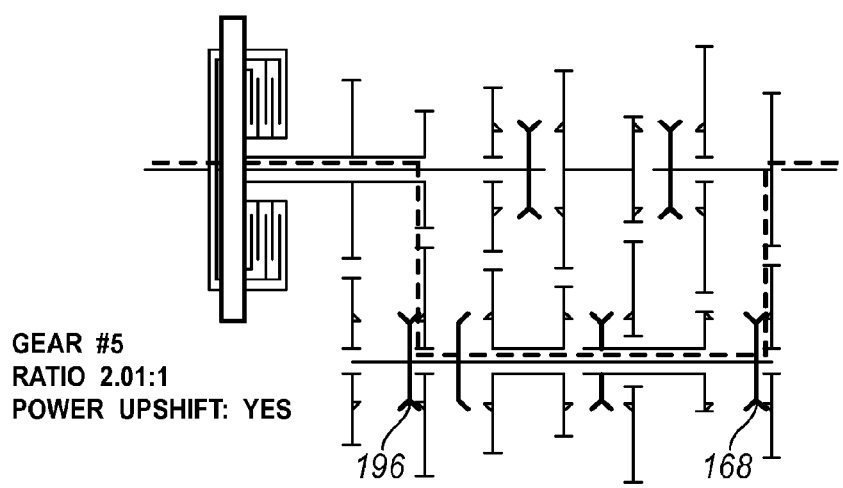

FIG. 8E illustrates the transmission 100 in a fifth gear ratio. The dual clutch is engaged such that torque flow to the input shaft 108. Clutches 196 and 168 are engaged to provide the torque path as shown.

Figure 8F:
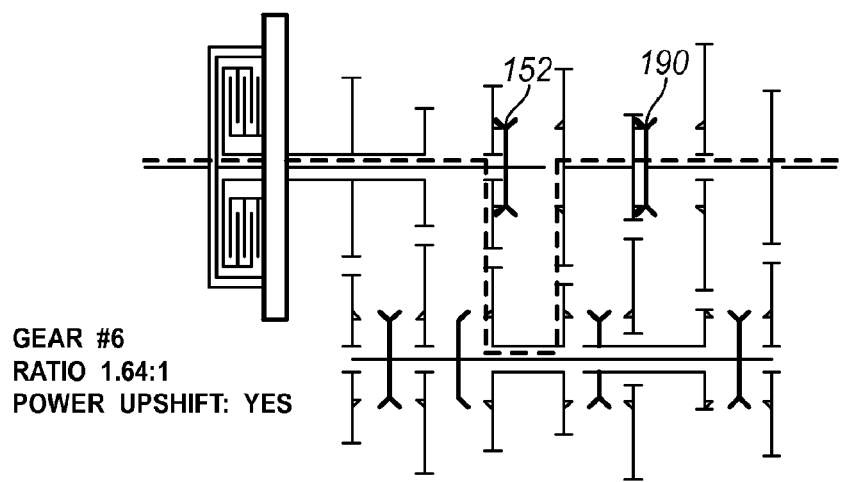

FIG. 8F illustrates the transmission 100 in a sixth gear ratio. The dual clutch is engaged such that torque flow to the input shaft 106. Clutches 152 and 190 are engaged to provide the torque path as shown.

Figure 8G:
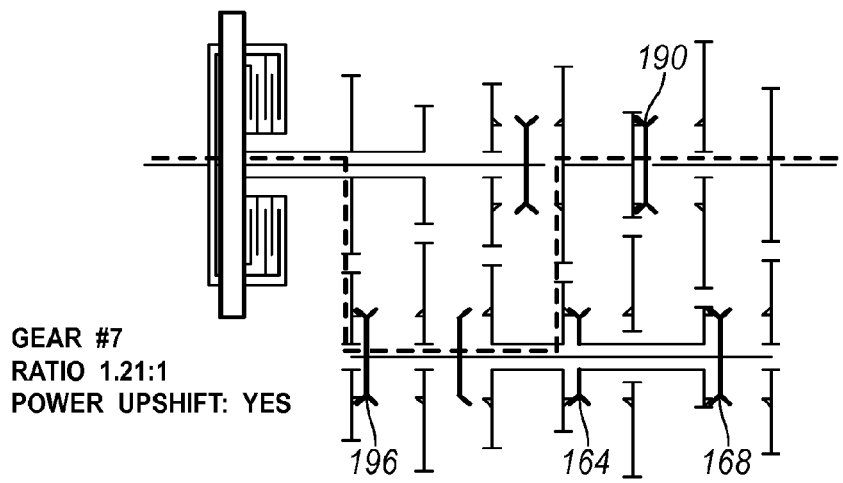

FIG. 8G illustrates the transmission 100 in a seventh gear ratio. The dual clutch is engaged such that torque flow to the input shaft 108. Clutches 196, 168, 164, and 190 are engaged to provide the torque path as shown.

Figure 8H:
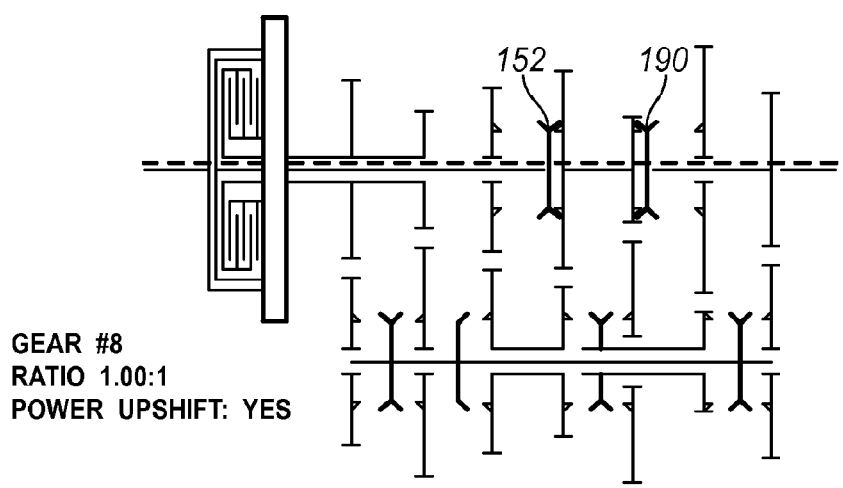

FIG. 8H illustrates the transmission 100 in an eighth gear ratio. The dual clutch is engaged such that torque flow to the input shaft 106. Clutches 152 and 190 are engaged to provide the torque path as shown.

Figure 8I:
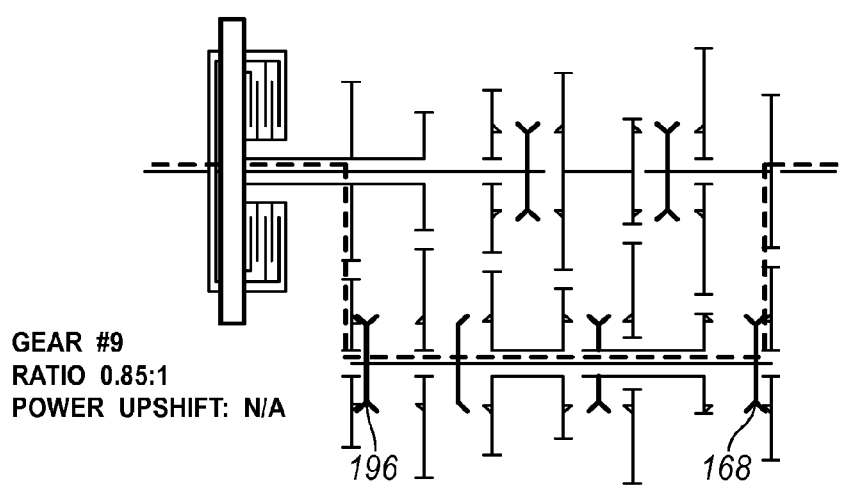

FIG. 8I illustrates the transmission 100 in a ninth gear ratio. The dual clutch is engaged such that torque flow to the input shaft 108. Clutches 196 and 168 are engaged to provide the torque path as shown.

FIG. 9 illustrates shift diagrams for the transmission 100 as illustrated in FIG. 5. Of course, the transmissions 100 illustrated in FIGS. 1-4 have associated powerpaths and shift patterns, and FIG. 9 is not intended to limit the spirit and scope of the disclosure. The transmission 100 powershifts between consecutive gear ratios of the transmission 100 such that there are no torque interrupts during a shift. The torque or power path of driving gear ratio in FIG. 9 is shown as a solid line, and the torque or power path of the preselected gear ratio is illustrated as a dashed line.

Figure 9A:
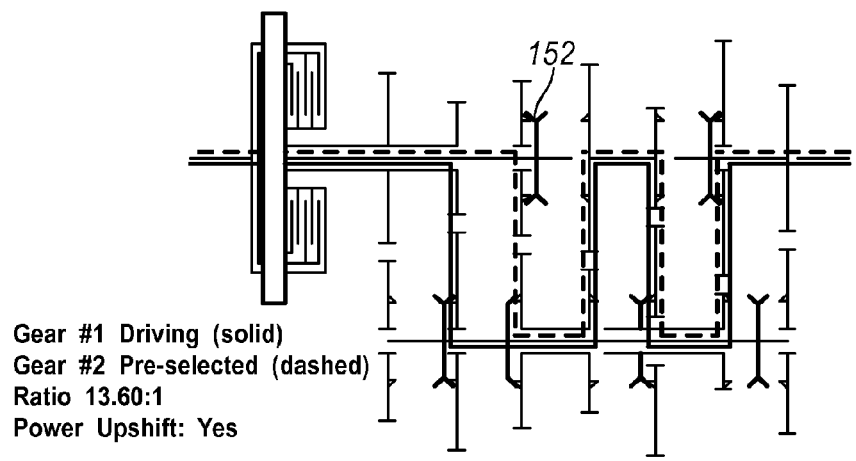
FIGS. 9A-I are shift diagrams for the transmission of FIG. 5.

FIG. 9A illustrates the transmission driving in first gear as shown in FIG. 8A and the preselected power path for after an upshift is completed into second gear, as shown in FIG. 8B. The transmission has clutch 152 preselected and engaged such that when the dual clutch is activated to change the torque flow from input shaft 108 to shaft 106, the transmission shifts into second gear without a torque interrupt.

Figure 9B:
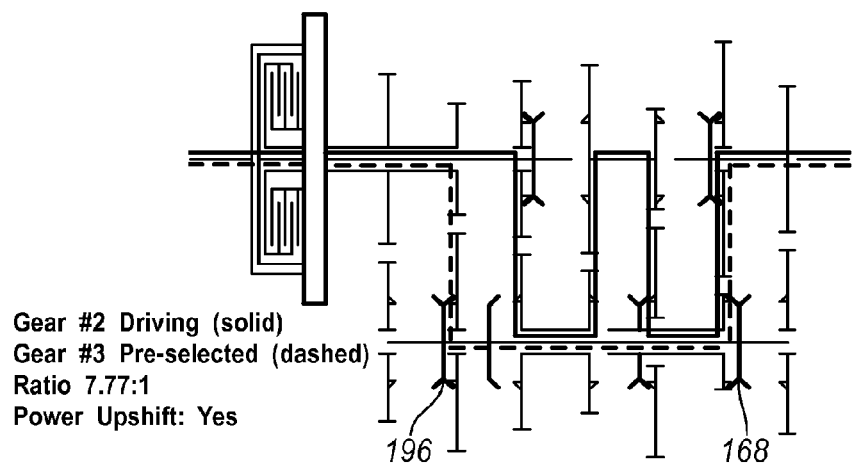

FIG. 9B illustrates the transmission in second gear as shown in FIG. 8B and the preselected power path for after an upshift is completed into third gear, as shown in FIG. 8C. The transmission has clutches 196 and 168 preselected and engaged such that when the dual clutch is activated to change the torque flow from input shaft 106 to shaft 108, the transmission shifts into third gear without a torque interrupt.

Figure 9C:
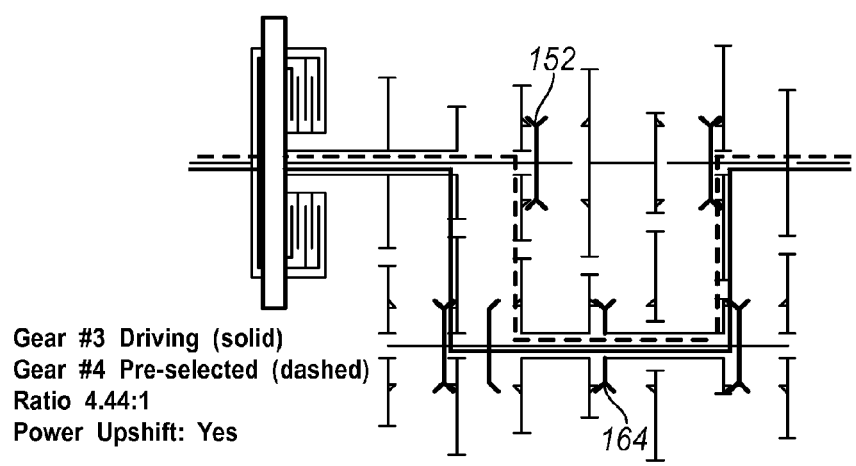

FIG. 9C illustrates the transmission in third gear as shown in FIG. 8C and the preselected power path for after an upshift is completed into fourth gear, as shown in FIG. 8D. The transmission has clutches 152 and 164 preselected and engaged such that when the dual clutch is activated to change the torque flow from input shaft 108 to shaft 106, the transmission shifts into fourth gear without a torque interrupt.

Figure 9D:
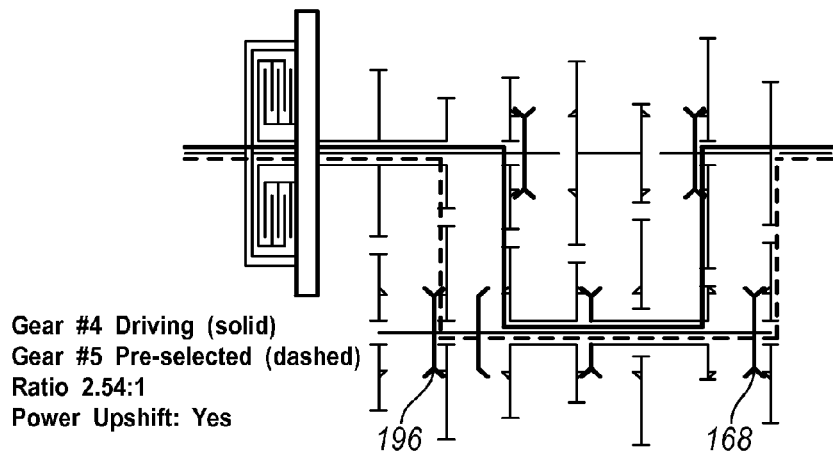

FIG. 9D illustrates the transmission in fourth gear as shown in FIG. 8D and the preselected power path for after an upshift is completed into fifth gear, as shown in FIG. 8E. The transmission has clutches 196 and 168 preselected and engaged such that when the dual clutch is activated to change the torque flow from input shaft 106 to shaft 108, the transmission shifts into fifth gear without a torque interrupt.

Figure 9E:
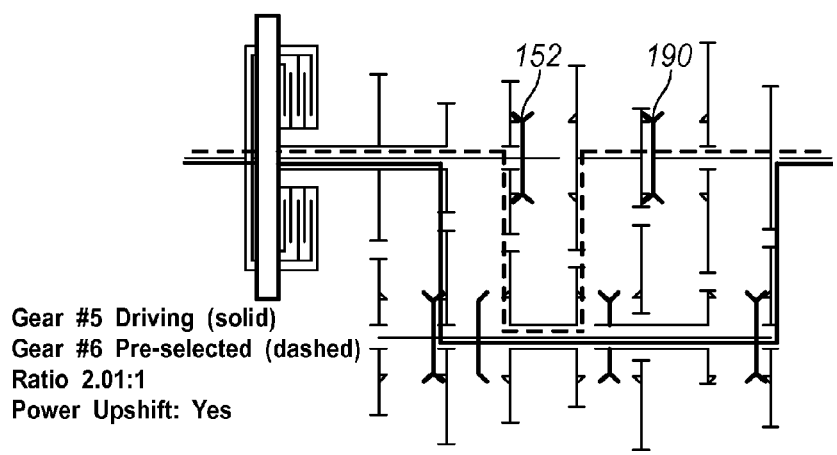

FIG. 9E illustrates the transmission in fifth gear as shown in FIG. 8E and the preselected power path for after an upshift is completed into sixth gear, as shown in FIG. 8F. The transmission has clutches 152 and 190 preselected and engaged such that when the dual clutch is activated to change the torque flow from input shaft 108 to shaft 106, the transmission shifts into sixth gear without a torque interrupt.

Figure 9F:
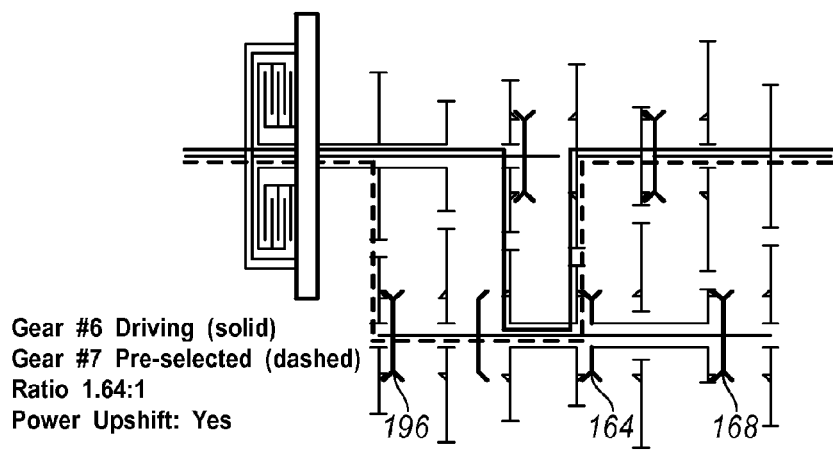

FIG. 9F illustrates the transmission in sixth gear as shown in FIG. 8F and the preselected power path for after an upshift is completed into seventh gear, as shown in FIG. 8G. The transmission has clutches 196, 164, and 168 preselected and engaged such that when the dual clutch is activated to change the torque flow from input shaft 106 to shaft 108, the transmission shifts into seventh gear without a torque interrupt.

Figure 9G:
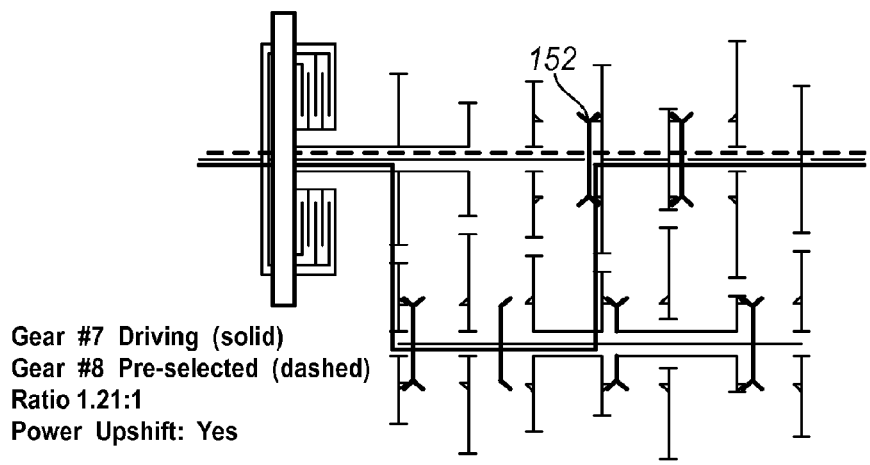

FIG. 9G illustrates the transmission in seventh gear as shown in FIG. 8G and the preselected power path for after an upshift is completed into eighth gear, as shown in FIG. 8H. The transmission has clutch 152 preselected and engaged such that when the dual clutch is activated to change the torque flow from input shaft 108 to shaft 106, the transmission shifts into eighth gear without a torque interrupt.

Figure 9H:
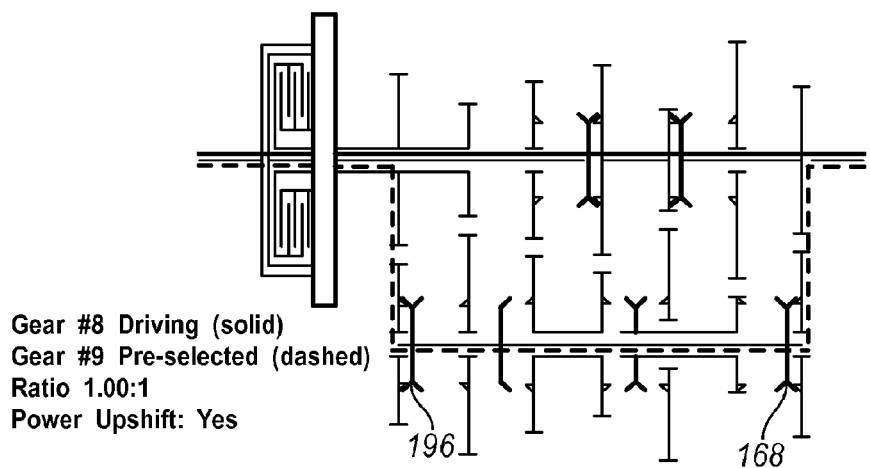

FIG. 9H illustrates the transmission in eighth gear as shown in FIG. 8H and the preselected power path for after an upshift is completed into ninth gear, as shown in FIG. 8I. The transmission has clutches 196 and 168 preselected and engaged such that when the dual clutch is activated to change the torque flow from input shaft 106 to shaft 108, the transmission shifts into ninth gear without a torque interrupt.

Figure 9I:
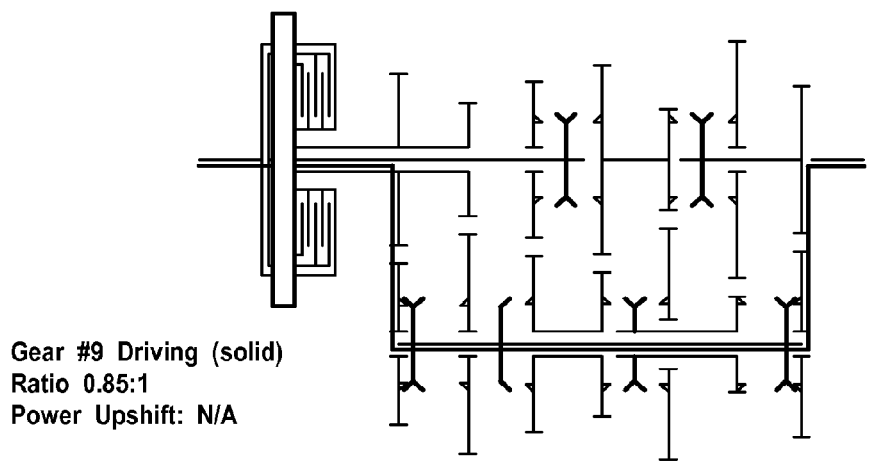

FIG. 9I illustrates the transmission in ninth gear as shown in FIG. 8I. The transmission 100 is now at its highest gear ratio, and no further upshifting occurs.

Figure 10:
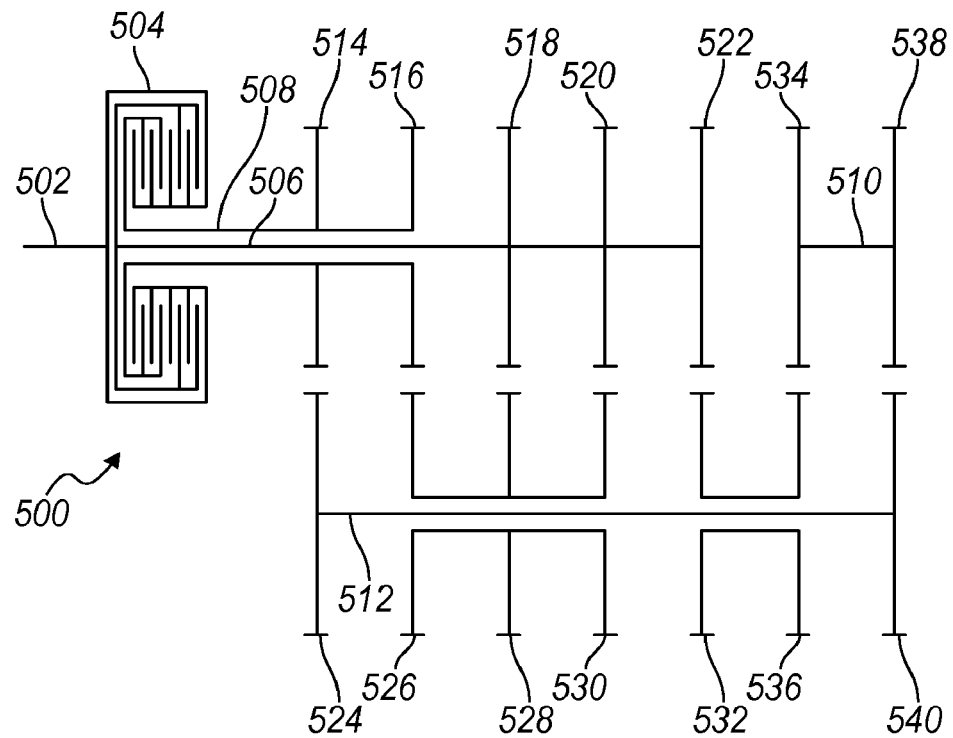
FIG. 10 is a diagram for a powershifting dual clutch transmission according to another embodiment.

FIG. 10 illustrates another embodiment of a multiple speed, dual clutch transmission layout. FIG. 10 depicts a dual clutch transmission 500 having concentric input shafts, a single countershaft, and seven layers of gear meshes. FIG. 10 represents a shaft layout of the transmission 500 and is not limiting in terms of how the gears are attached to the input shaft, a mainshaft, or countershaft. It is also possible to use various clutch arrangements and gear diameter sizing with the transmission 500, examples of which are described below.

A shaft 502 is connected to the dual clutch 504 of the transmission 500. Shaft 502 may be connected to a prime mover, such as an engine, that provides input torque to the transmission 500. The dual clutch 504 is configured to provide torque to either a first input torque shaft 506 or a second input torque shaft 508 from shaft 502. Input shaft 508 is a sleeve shaft that surrounds input shaft 506. Input shaft 508 may be journaled within the transmission housing (not shown). Input shaft 506 is journaled within input shaft 508. Shafts 506, 508 are coaxial with one another.

The transmission 500 has a mainshaft 510. The mainshaft 510 is coaxial with the input shafts 506, 508. The transmission has a single countershaft 512. The countershaft 512 is offset from the input shafts 506, 508 and mainshaft 510. The transmission 500 also has an output shaft (not shown), that may be coaxial with the mainshaft 510.

Input shaft 508 has first and second headset gears 514, 516. The headset gears 514, 516 may be directly connected to the shaft 508, for example, by a splined connection or other drivable connection. Alternatively, one or both of the headset gears 514, 516 may be journaled to the shaft 508 for selective connection, for example, by a clutch device, such as a synchronizing clutch assembly, a dog clutch, or the like. Shaft 506 has first, second and third headset gears 518, 520, 522 that may be directly connected to the shaft 506, or journaled to the shaft 506 for selective connection to the shaft 506.

The transmission 500 has seven layers of gear meshes. For example, one layer of gear mesh is formed by gear 514 and gear 524. Gear 516 meshes with gear 526 on the countershaft 512. Gear 518 meshes with gear 528 on the countershaft. Another layer of gear mesh is formed by gear 520 on input shaft 506 and gear 530 on the countershaft 512. Gear 522 meshes with gear 532 on the countershaft 512. Gear 534 on the mainshaft 510 meshes with gear 536 on the countershaft 512. Gear 538 on the mainshaft 510 meshes with gear 540 on the countershaft 512.

Gears 534, 538 on the mainshaft 510 may be directly connected to the mainshaft 510 for rotation therewith, or may be journaled to the mainshaft 510 for selective connection therewith. Gears 524, 526, 528, 530, 532, 536, and 540 on the countershaft 512 may be directly connected to the countershaft 512 for rotation therewith, or alternatively, may be journaled to the countershaft 512 for selective connection therewith. More than one gear may be connected for rotation together. For example, the gears 524, 540 may be connected or journaled to countershafts 512, and gears 526, 528, 532, and 536 may be connected to journaled sleeve shafts.

Figure 11:
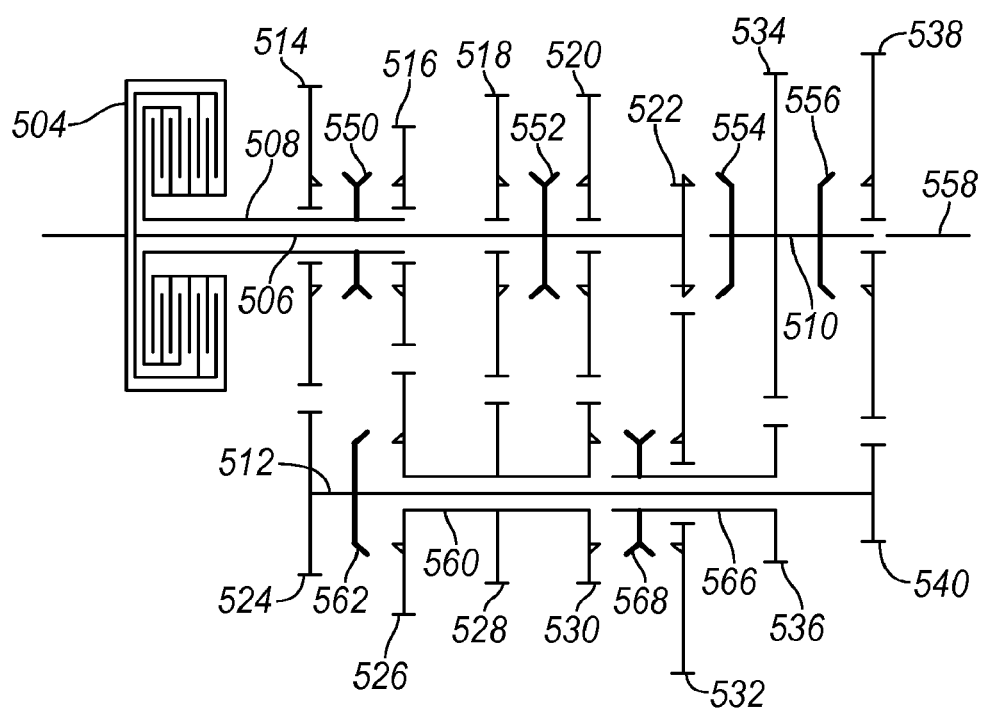
FIG. 11 is a diagram for the transmission of FIG. 10 with clutch placements according to an embodiment.

FIG. 11 illustrates the transmission 500 with clutch placements and gear element to shaft connections according to an embodiment. FIG. 11 uses the same reference numerals for elements in common with those shown in FIG. 10.

Headset gears 514, 516 are journaled to the shaft 508. A clutch 550, such as a synchronizer clutch sleeve, connects either gear 514 or gear 516 to the shaft 508 for rotation therewith.

Headset gears 518 and 520 are journaled to shaft 506. A clutch 552 is connected to shaft 506 and configured to connect either headset gear 518 or gear 520 to shaft 506 for rotation therewith. Headset gear 522 is connected to shaft 506 for rotation therewith, for example using a splined connection.

A clutch 554 may selectively connect the mainshaft 510 to headset gear 522 on the input shaft 506, thereby connecting the input shaft 506 to the mainshaft 510 for rotation therewith. Gear 534 is connected to mainshaft 510 for rotation therewith, and gear 538 is journaled about mainshaft 510. Clutch 556 selectively connects gear 538 to mainshaft 510 for rotation therewith.

The output shaft 558 is coaxial with and connected to the mainshaft section 510, for example, using a splined connection.

The countershaft 512 has countershaft gear elements 524, 540 directly connected to it. Countershaft gear elements 526, 528, 530 are on a common sleeve shaft 560 journaled to the countershaft 512. A clutch 562 is connected to the countershaft 512 and is configured to connect the countershaft 512 to gear element 526 on the sleeve shaft 560.

Countershaft gear element 536 is connected to a second sleeve shaft 566 journaled to the countershaft 512. Countershaft gear element 532 is journaled to the second sleeve shaft 566. A clutch 568 is configured to connect the second sleeve shaft 566 to countershaft gear element 530 and the first sleeve shaft 560. Alternatively, clutch 568 may connect journaled countershaft gear element 532 to the second sleeve shaft 566 for rotation therewith.

Figure 12:
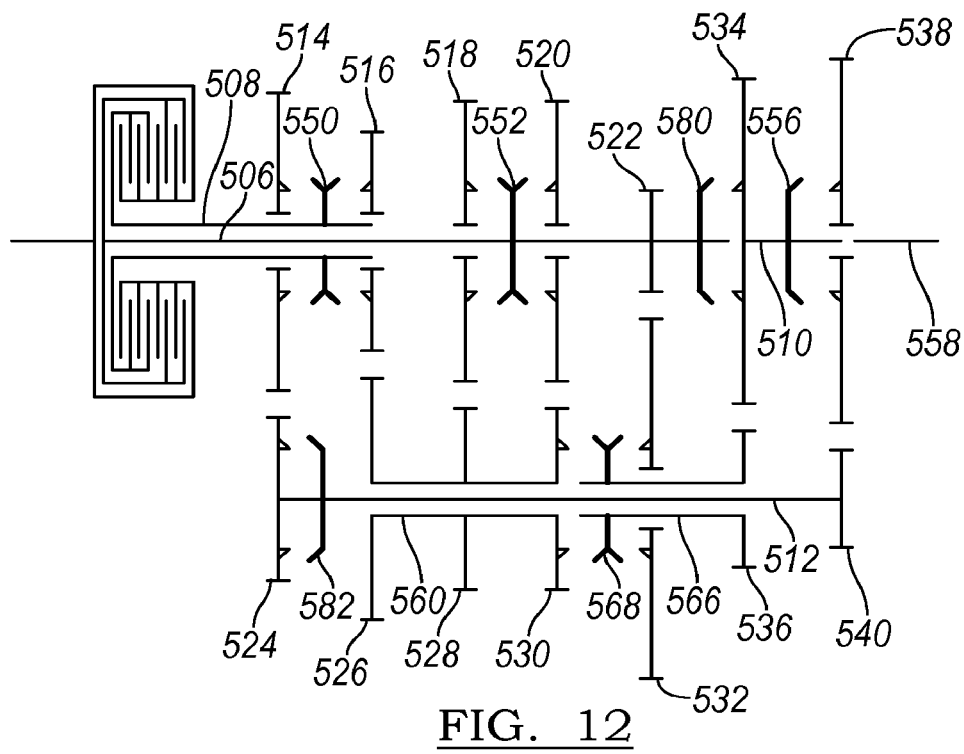
FIG. 12 is a diagram for the transmission of FIG. 10 with clutch placements according to another embodiment.

FIG. 12 illustrates the transmission 500 with clutch placements and gear element to shaft connections according to another embodiment. FIG. 12 uses the same reference numerals for elements in common with those shown in FIGS. 10-11.

Headset gears 514, 516 are journaled to the shaft 508. A clutch 550, such as a synchronizer clutch sleeve, connects either gear 514 or gear 516 to the shaft 508 for rotation therewith.

Headset gears 518 and 520 are journaled to shaft 506. A clutch 552 is connected to shaft 506 and configured to connect either headset gear 518 or gear 520 to shaft 506 for rotation therewith. Headset gear 522 is connected to shaft 506 for rotation therewith, for example using a splined connection.

A clutch 580 may selectively connect the input shaft 506 to gear 534 on the mainshaft 510, thereby connecting the input shaft 506 to the mainshaft 510 for rotation therewith. Gear 534 is connected to mainshaft 510 for rotation therewith, and gear 538 is journaled about mainshaft 510. Clutch 556 selectively connects gear 538 to mainshaft 510 for rotation therewith.

The output shaft 558 is coaxial with and connected to the mainshaft section 510, for example, using a splined connection.

The countershaft 512 has countershaft gear elements 524, 540 directly connected to it. Countershaft gear elements 526, 528, 530 are on a common sleeve shaft 560 journaled to the countershaft 512. A clutch 582 is connected to the sleeve shaft 560 and is configured to connect the sleeve shaft 560 to gear element 524 on the countershaft 512.

Countershaft gear element 536 is connected to a second sleeve shaft 566 journaled to the countershaft 512. Countershaft gear element 532 is journaled to the second sleeve shaft 566. A clutch 568 is configured to connect the second sleeve shaft 566 to countershaft gear element 530 and the first sleeve shaft 560. Alternatively, clutch 568 may connect journaled countershaft gear element 532 to the second sleeve shaft 566 for rotation therewith.

Figure 13:
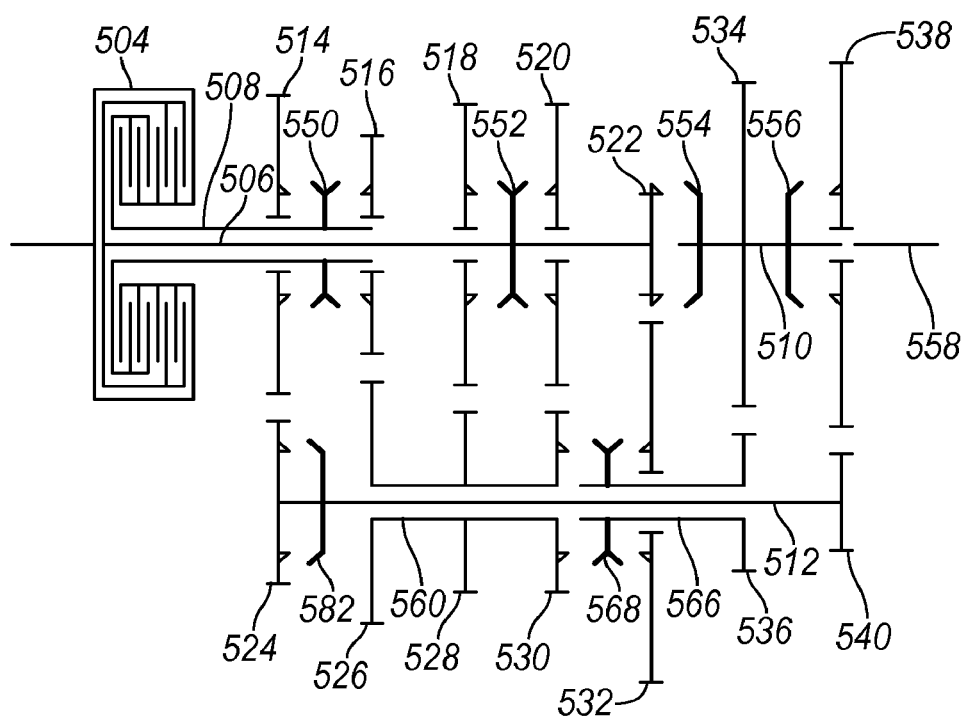
FIG. 13 is a diagram for the transmission of FIG. 10 with clutch placements according to yet another embodiment.

FIG. 13 illustrates the transmission 500 with clutch placements and gear to shaft connections according to yet another embodiment. FIG. 13 uses the same reference numerals for elements in common with those shown in FIGS. 10-12.

Headset gears 518 and 520 are journaled to shaft 506. A clutch 552 is connected to shaft 506 and configured to connect either headset gear 518 or gear 520 to shaft 506 for rotation therewith. Headset gear 522 is connected to shaft 506 for rotation therewith, for example using a splined connection.

A clutch 554 may selectively connect the mainshaft 510 to headset gear 522 on the input shaft 506, thereby connecting the input shaft 506 to the mainshaft 510 for rotation therewith. Gear 534 is connected to mainshaft 510 for rotation therewith, and gear 538 is journaled about mainshaft 510. Clutch 556 selectively connects gear 538 to mainshaft 510 for rotation therewith.

The output shaft 558 is coaxial with and connected to the mainshaft section 510, for example, using a splined connection.

The countershaft 512 has countershaft gear elements 524, 540 directly connected to it. Countershaft gear elements 526, 528, 530 are on a common sleeve shaft 560 journaled to the countershaft 512. A clutch 582 is connected to the sleeve shaft 560 and is configured to connect the sleeve shaft 560 to gear element 524 on the countershaft 512.

Countershaft gear element 536 is connected to a second sleeve shaft 566 journaled to the countershaft 512. Countershaft gear element 532 is journaled to the second sleeve shaft 566. A clutch 568 is configured to connect the second sleeve shaft 566 to countershaft gear element 530 and the first sleeve shaft 560. Alternatively, clutch 568 may connect journaled countershaft gear element 532 to the second sleeve shaft 566 for rotation therewith.

Figure 14:
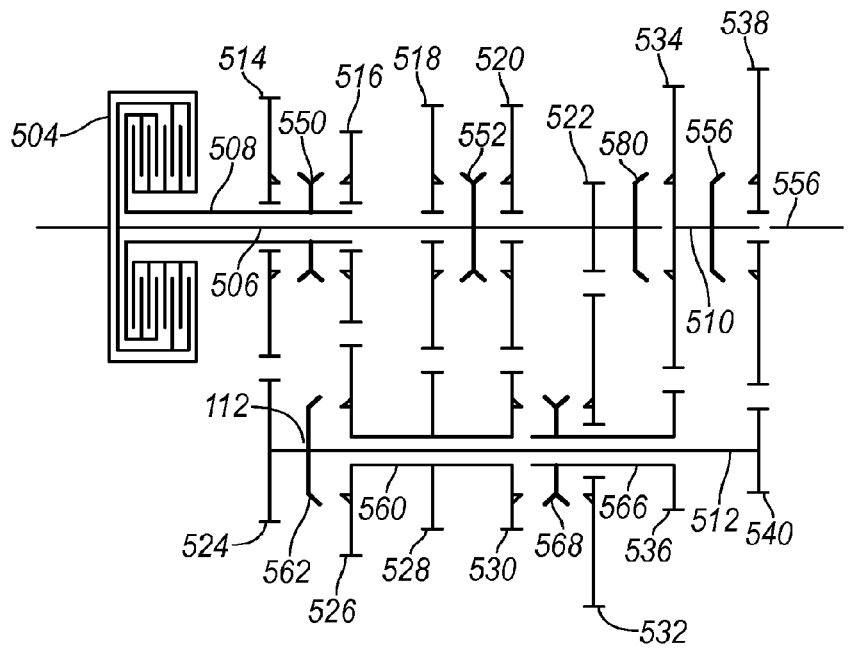
FIG. 14 is a diagram for the transmission of FIG. 10 with clutch placements and gear diameters according to another embodiment.

FIG. 14 illustrates the transmission 500 with clutch placements and gear to shaft connections according to another embodiment. FIG. 14 uses the same reference numerals for elements in common with those shown in FIG. 10-13. The gear diameters for the transmission 500 of FIG. 14 according to a non-limiting example are as follows: diameter of gear 514 is 241.6 mm, diameter of gear 516 is 171.1 mm, diameter of gear 518 is 222.4 mm, diameter of gear 520 is 222.4 mm, diameter of gear 522 is 86.0 mm, diameter of gear 534 is 259.7 mm, diameter of gear 538 is 293.3 mm, diameter of gear 524 is 128.4 mm, diameter of gear 526 is 198.9 mm, diameter of gear 528 is 147.6 mm, diameter of gear 530 is 147.6 mm, diameter of gear 532 is 284.0 mm, diameter of gear 536 is 110.3 mm, and diameter of gear 540 is 76.7 mm.

Headset gears 514, 516 are journaled to the shaft 508. A clutch 550, such as a synchronizer clutch sleeve, connects either gear 514 or gear 516 to the shaft 508 for rotation therewith.

Headset gears 518 and 520 are journaled to shaft 506. A clutch 552 is connected to shaft 506 and configured to connect either headset gear 518 or gear 520 to shaft 506 for rotation therewith. Headset gear 522 is connected to shaft 506 for rotation therewith, for example using a splined connection.

A clutch 580 may selectively connect the input shaft 506 to gear 534 on the mainshaft 510, thereby connecting the input shaft 506 to the mainshaft 510 for rotation therewith. Gear 534 is connected to mainshaft 510 for rotation therewith, and gear 538 is journaled about mainshaft 510. Clutch 556 selectively connects gear 538 to mainshaft 510 for rotation therewith.

The output shaft 558 is coaxial with and connected to the mainshaft section 510, for example, using a splined connection.

The countershaft 512 has countershaft gear elements 524, 540 directly connected to it. Countershaft gear elements 526, 528, 530 are on a common sleeve shaft 560 journaled to the countershaft 512. A clutch 562 is connected to the countershaft 512 and is configured to connect the countershaft 512 to gear element 526 on the sleeve shaft 560.

Countershaft gear element 536 is connected to a second sleeve shaft 566 journaled to the countershaft 512. Countershaft gear element 532 is journaled to the second sleeve shaft 566. A clutch 568 is configured to connect the second sleeve shaft 566 to countershaft gear element 530 and the first sleeve shaft 560. Alternatively, clutch 568 may connect journaled countershaft gear element 532 to the second sleeve shaft 566 for rotation therewith.

Figure 15:
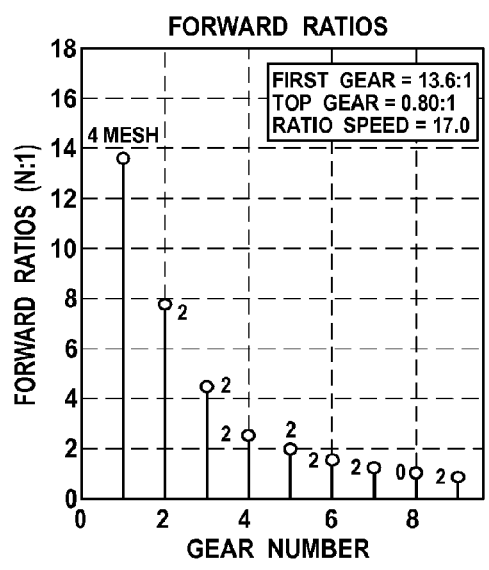
FIG. 15 is a graph illustrating forward ratios for the transmission layout and gear diameters as shown in FIG. 14.

FIG. 15 illustrates forward ratios for the gear diameters and layout of the transmission 500 of FIG. 14. As can be seen by the graph, each forward gear ratio is smaller than the one before it, such that the gear ratios are monotonically decreasing as the gear number increases. Gear diameters and power paths for the transmission 500 layouts are selected such that the gear ratios monotonically decrease in this manner. Also shown is the number of meshes engaged to transmit torque for each associated forward ratio.

Figure 16:
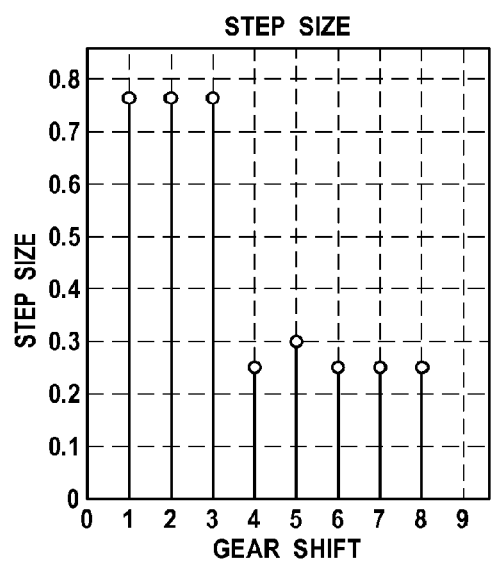
FIG. 16 is a graph illustrating step sizes for the transmission layout and gear diameters as shown in FIG. 14.

FIG. 16 illustrates step sizes for the gear diameters and layout of the transmission 500 of FIG. 14. As can be seen by the graph, the step sizes are large in the lower, launch gears and shifts, and small in the higher gears and shifts.

FIG. 17 illustrates an embodiment of various powerpaths for the transmission 500 of FIG. 14. The transmissions 500 illustrated in FIGS. 10-13 have associated powerpaths, and FIG. 17 is not intended to limit the spirit and scope of the disclosure. The transmission 500 as shown in FIGS. 10-14 powershifts between consecutive gear ratios such that there are no torque interrupts during a shift. The torque or power path is illustrated by a dashed line in FIG. 17.

Figure 17A:
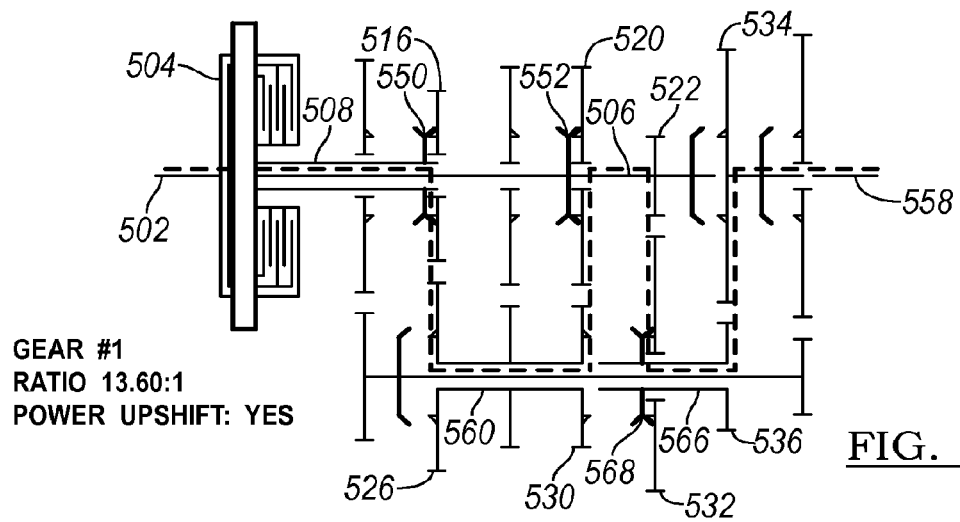
FIGS. 17A-I illustrate various powerpaths for the transmission of FIG. 14.

FIG. 17A illustrates the transmission 500 in a first gear ratio. The torque path for the first gear ratio begins at the input shaft 502, and continues through the dual clutch 504 that is engaged such that torque flows to the input shaft 508. Clutch 550 is engaged to connect journaled headset gear element 516 to the input shaft 508. Torque flows from the headset gear 516 to countershaft gear element 526 through journaled sleeve shaft 560 and to gear element 530. Clutch 552 connects the headset gear element 520 to shaft 506 such that the torque flows to headset gear 522. Clutch 568 is engaged to connect gear 532 to the second countershaft sleeve 566. Torque then flows through countershaft gear element 536 to mainshaft gear element 534, and torque then goes to the output shaft 558 of the transmission 500.

Figure 17B:
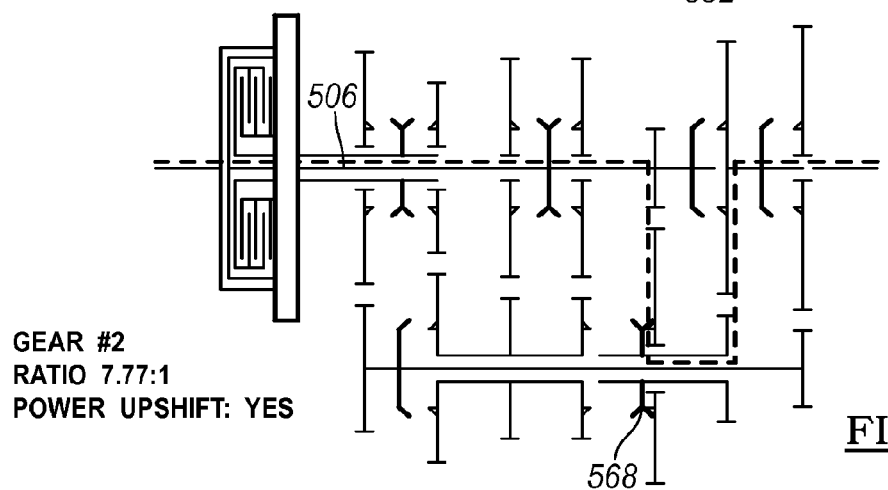

FIG. 17B illustrates the transmission 500 in a second gear ratio. The dual clutch is engaged such that torque flows to the input shaft 506. Clutch 568 is engaged to provide the torque flow path as shown.

Figure 17C:
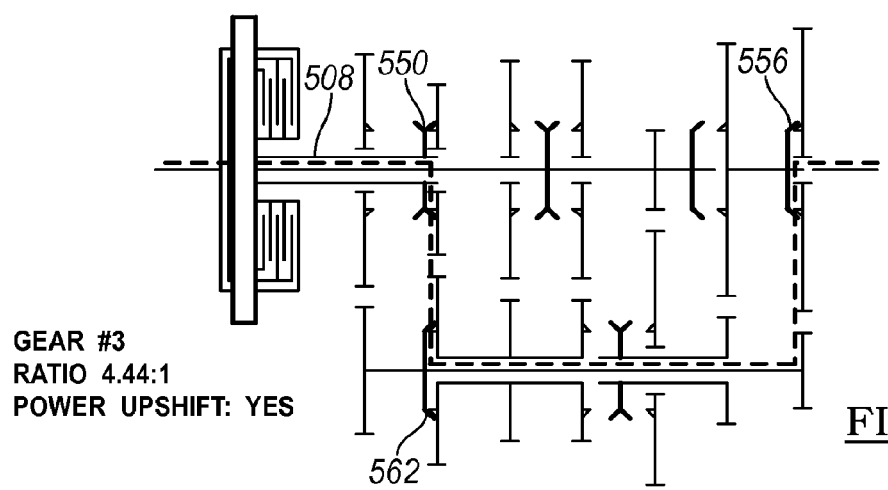

FIG. 17C illustrates the transmission 500 in a third gear ratio. The dual clutch is engaged such that torque flows to the input shaft 508. Clutches 550, 562, and 556 are engaged to provide the torque flow path as shown.

Figure 17D:
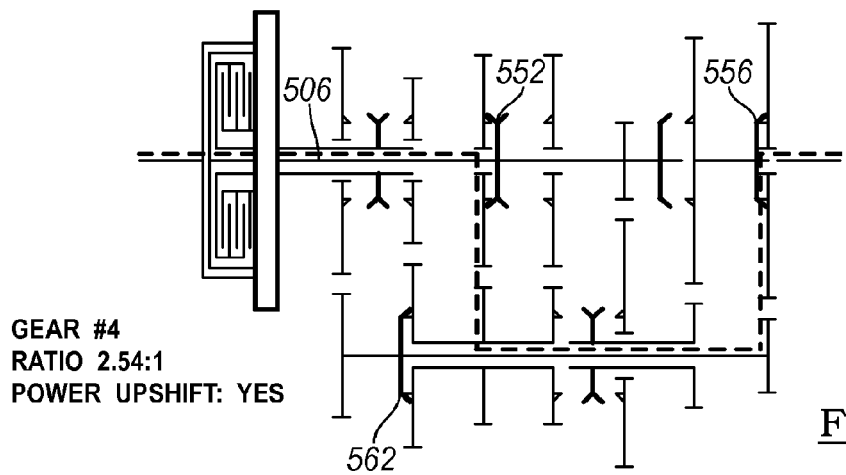

FIG. 17D illustrates the transmission 500 in a fourth gear ratio. The dual clutch is engaged such that torque flows to the input shaft 506. Clutches 552, 562, and 556 are engaged to provide the torque flow path as shown.

Figure 17E:
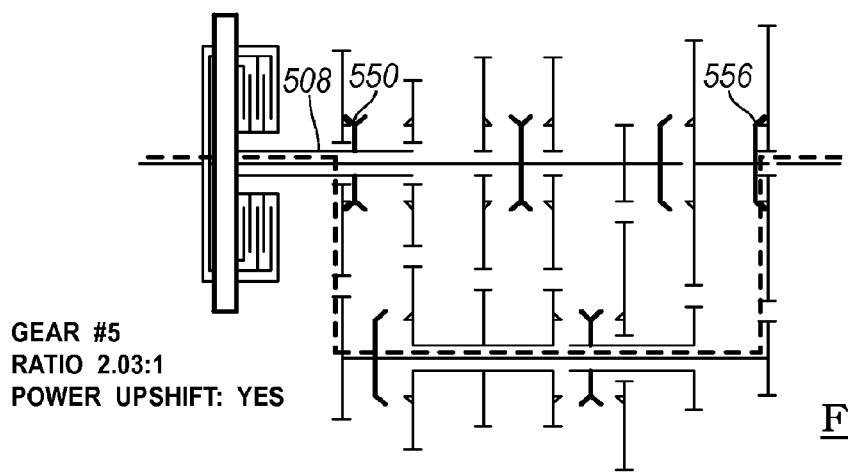

FIG. 17E illustrates the transmission 500 in a fifth gear ratio. The dual clutch is engaged such that torque flow to the input shaft 508. Clutches 550 and 556 are engaged to provide the torque flow path as shown.

Figure 17F:
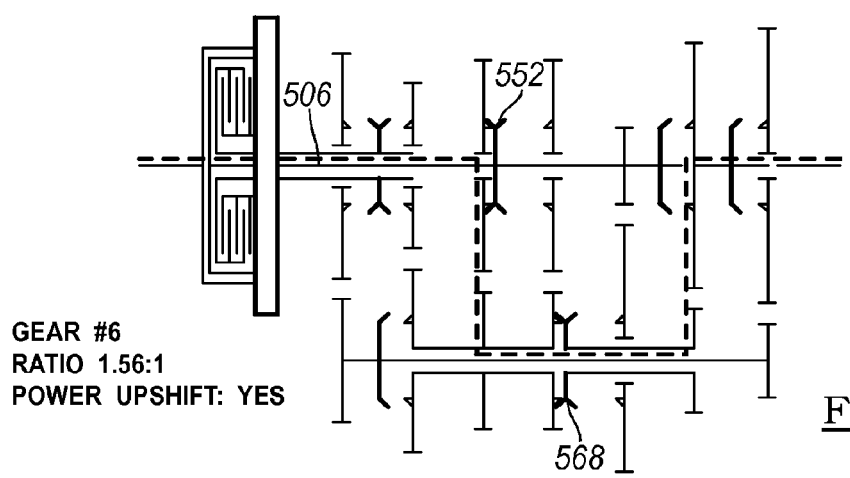

FIG. 17F illustrates the transmission 500 in a sixth gear ratio. The dual clutch is engaged such that torque flow to the input shaft 506. Clutches 552 and 568 are engaged to provide the torque flow path as shown.

Figure 17G:
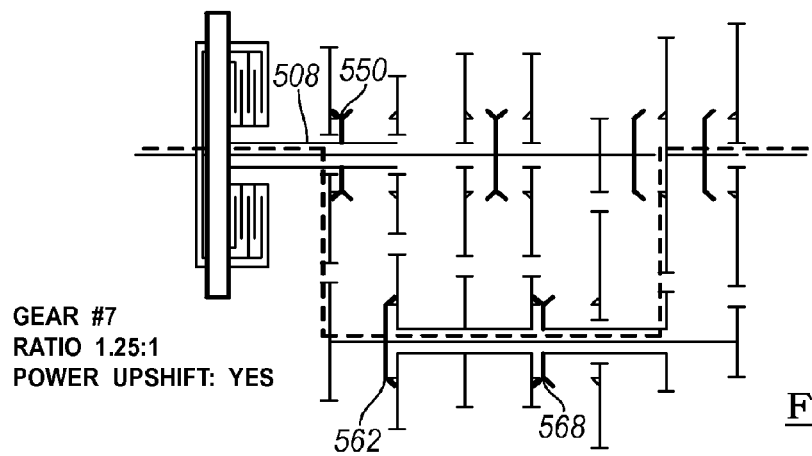

FIG. 17G illustrates the transmission 500 in a seventh gear ratio. The dual clutch is engaged such that torque flow to the input shaft 508. Clutches 550, 562, and 568 are engaged to provide the torque flow path as shown.

Figure 17H:
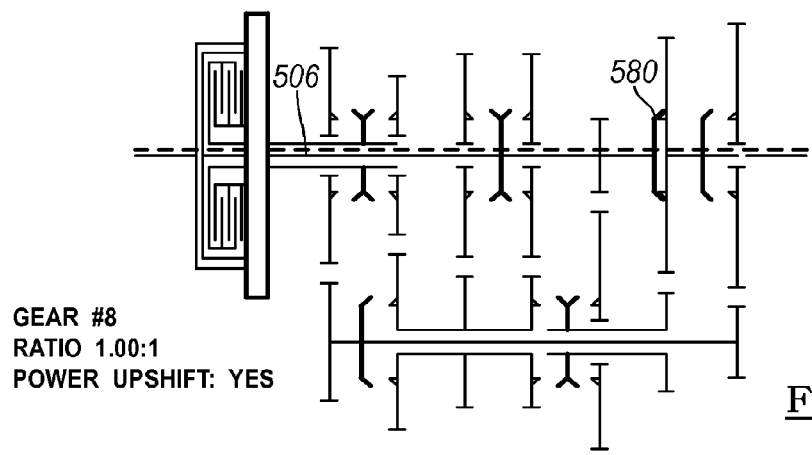

FIG. 17H illustrates the transmission 500 in an eighth gear ratio. The dual clutch is engaged such that torque flow to the input shaft 506. Clutch 580 is engaged to provide the torque flow path as shown.

Figure 17I:
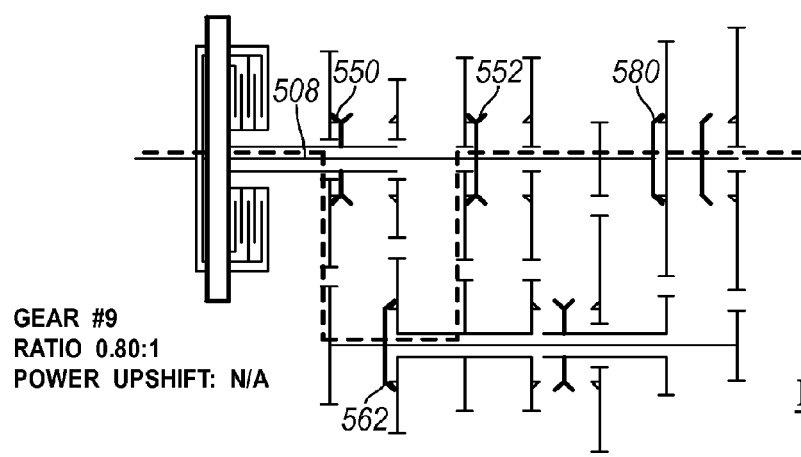

FIG. 17I illustrates the transmission 500 in a ninth gear ratio. The dual clutch is engaged such that torque flow to the input shaft 508. Clutches 550, 562, 552, and 580 are engaged to provide the torque flow path as shown.

FIG. 18 illustrates shift diagrams for the transmission 500 as illustrated in FIG. 14. Of course, the transmissions 500 illustrated in FIGS. 10-13 have associated powerpaths and shift patterns and FIG. 18 is not intended to limit the spirit and scope of the disclosure. The transmission 500 powershifts between consecutive gear ratios of the transmission 500 such that there are no torque interrupts during a shift. The torque or power path of the driving gear ratio in FIG. 18 is shown as a solid line, and the torque of power path of the preselected gear ratio is illustrated as a dashed line.

Figure 18A:
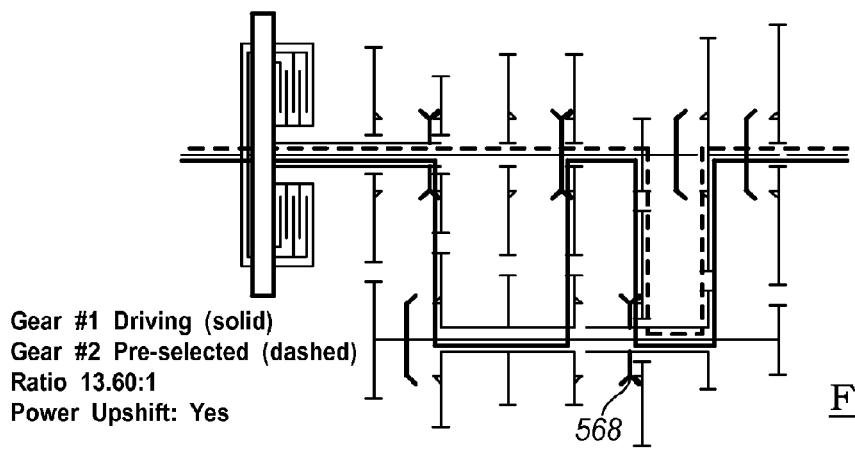
FIGS. 18A-I are shift diagrams for the transmission of FIG. 14.

FIG. 18A illustrates the transmission in first gear as shown in FIG. 17A and the preselected power path for after an upshift is completed into second gear, as shown in FIG. 17B. The transmission has clutch 568 preselected and engaged such that when the dual clutch is activated to change the torque flow from input shaft 508 to shaft 506, the transmission shifts into second gear without a torque interrupt. Note that gear 568 is also engaged and used for driving the transmission 500 in first gear.

Figure 18B:
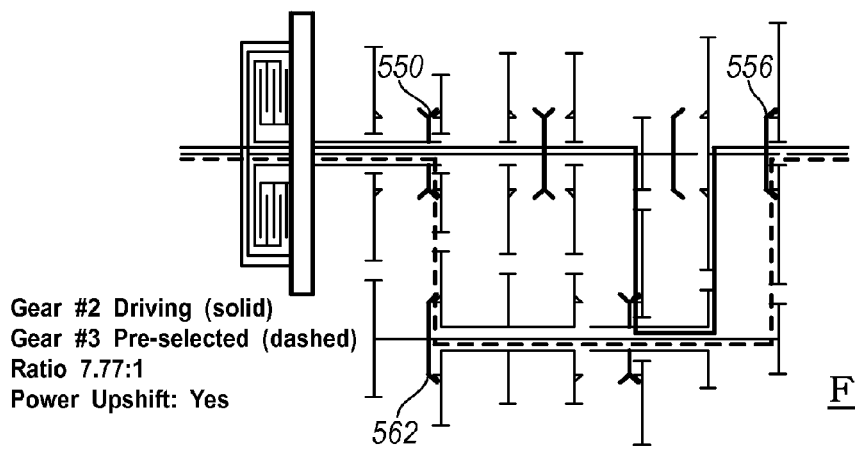

FIG. 18B illustrates the transmission in second gear as shown in FIG. 17B and the preselected power path for after an upshift is completed into third gear, as shown in FIG. 17C. The transmission has clutches 550, 562, and 556 preselected and engaged such that when the dual clutch is activated to change the torque flow from input shaft 506 to shaft 508, the transmission shifts into third gear without a torque interrupt.

Figure 18C:
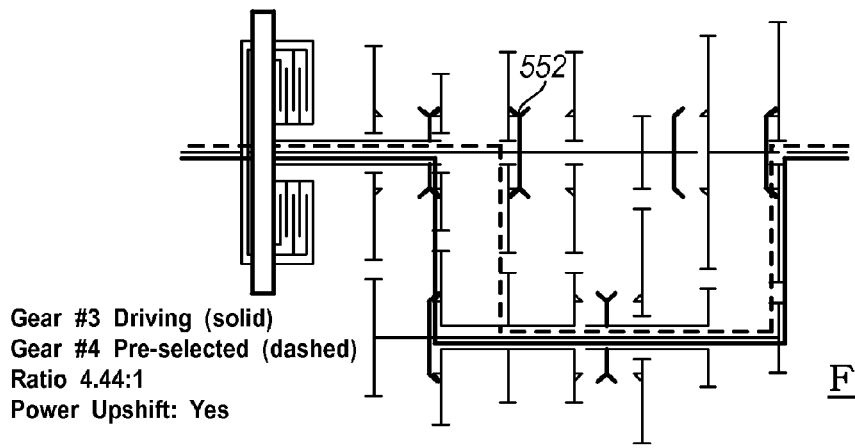

FIG. 18C illustrates the transmission in third gear as shown in FIG. 17C and the preselected power path for after an upshift is completed into fourth gear, as shown in FIG. 17D. The transmission has clutch 552 preselected and engaged such that when the dual clutch is activated to change the torque flow from input shaft 508 to shaft 506, the transmission shifts into fourth gear without a torque interrupt.

Figure 18D:
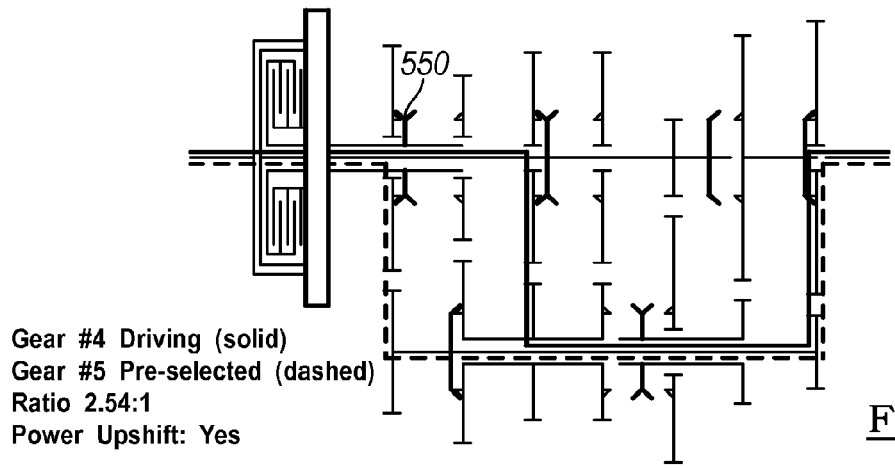

FIG. 18D illustrates the transmission in fourth gear as shown in FIG. 17D and the preselected power path for after an upshift is completed into fifth gear, as shown in FIG. 17E. The transmission has clutch 550 preselected and engaged such that when the dual clutch is activated to change the torque flow from input shaft 506 to shaft 508, the transmission shifts into fifth gear without a torque interrupt.

Figure 18E:
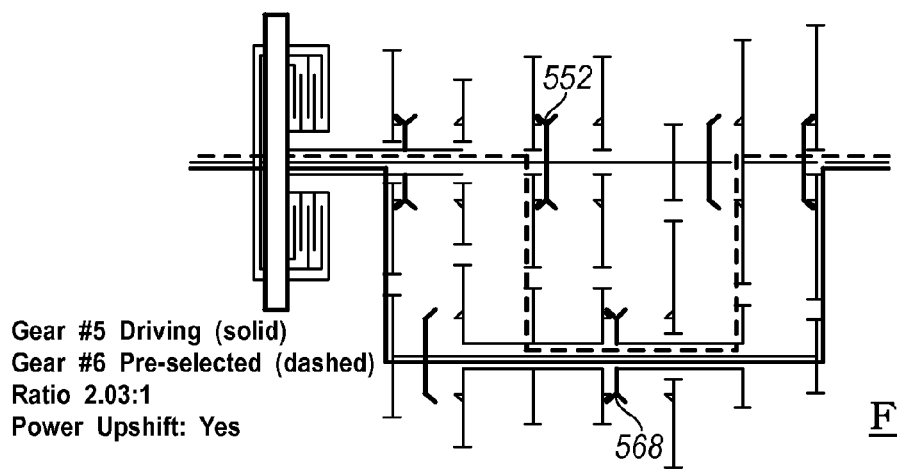

FIG. 18E illustrates the transmission in fifth gear as shown in FIG. 17E and the preselected power path for after an upshift is completed into sixth gear, as shown in FIG. 17F. The transmission has clutches 552 and 568 preselected and engaged such that when the dual clutch is activated to change the torque flow from input shaft 508 to shaft 506, the transmission shifts into sixth gear without a torque interrupt.

Figure 18F:
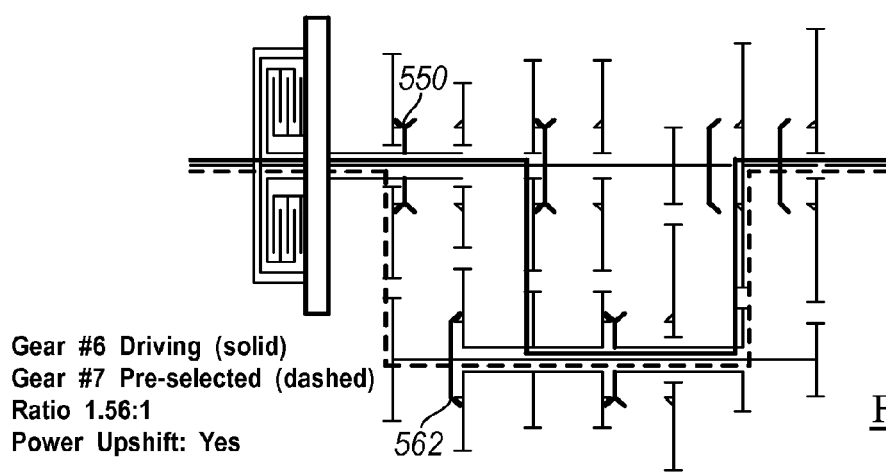

FIG. 18F illustrates the transmission in sixth gear as shown in FIG. 17F and the preselected power path for after an upshift is completed into seventh gear, as shown in FIG. 17G. The transmission has clutches 550 and 562 preselected and engaged such that when the dual clutch is activated to change the torque flow from input shaft 506 to shaft 508, the transmission shifts into seventh gear without a torque interrupt.

Figure 18G:
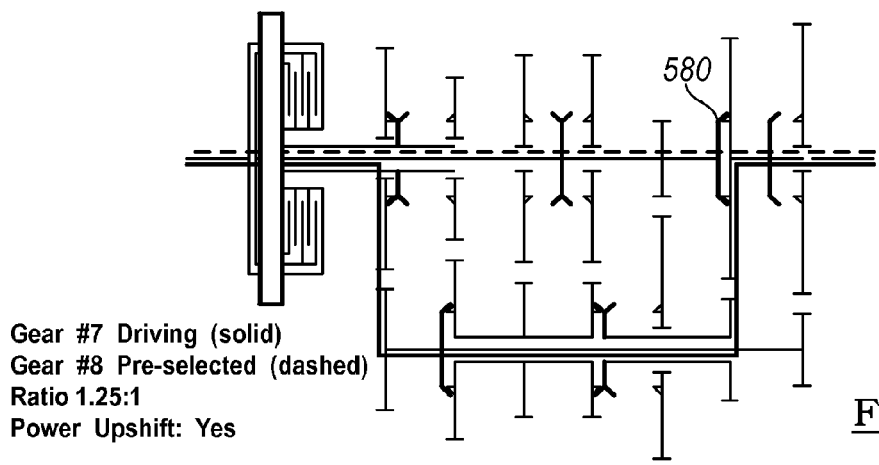

FIG. 18G illustrates the transmission in seventh gear as shown in FIG. 17G and the preselected power path for after an upshift is completed into eighth gear, as shown in FIG. 17H. The transmission has clutch 580 preselected and engaged such that when the dual clutch is activated to change the torque flow from input shaft 508 to shaft 506, the transmission shifts into eighth gear without a torque interrupt.

Figure 18H:
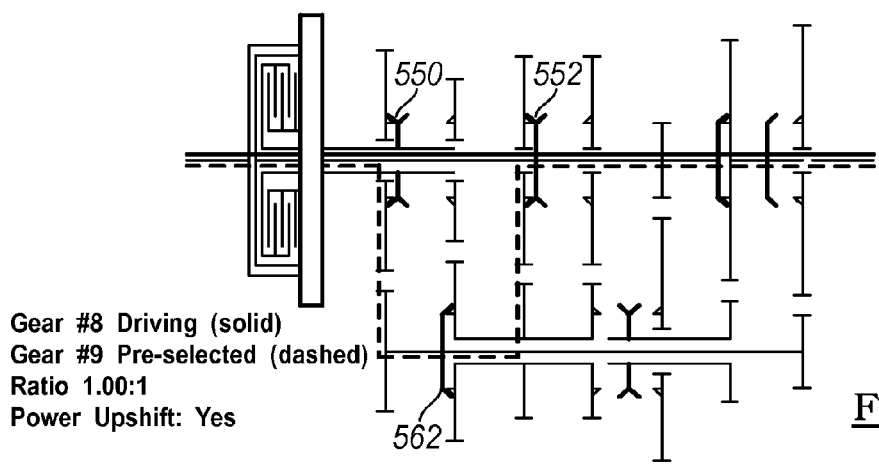

FIG. 18H illustrates the transmission in eighth gear as shown in FIG. 17H and the preselected power path for after an upshift is completed into ninth gear, as shown in FIG. 17I. The transmission has clutches 550, 562, and 552 preselected and engaged such that when the dual clutch is activated to change the torque flow from input shaft 506 to shaft 508, the transmission shifts into ninth gear without a torque interrupt.

Figure 18I:
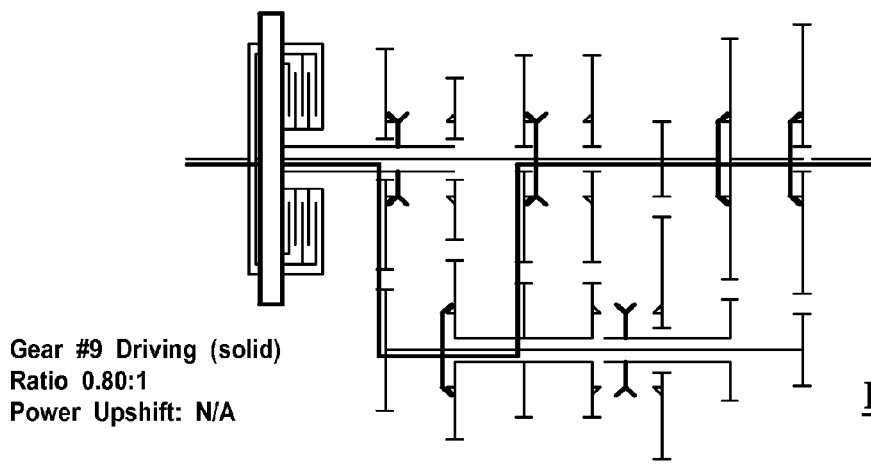

FIG. 18I illustrates the transmission in ninth gear as shown in FIG. 17I. The transmission 500 is now at its highest gear ratio, and no further upshifting occurs.

Figure 19:
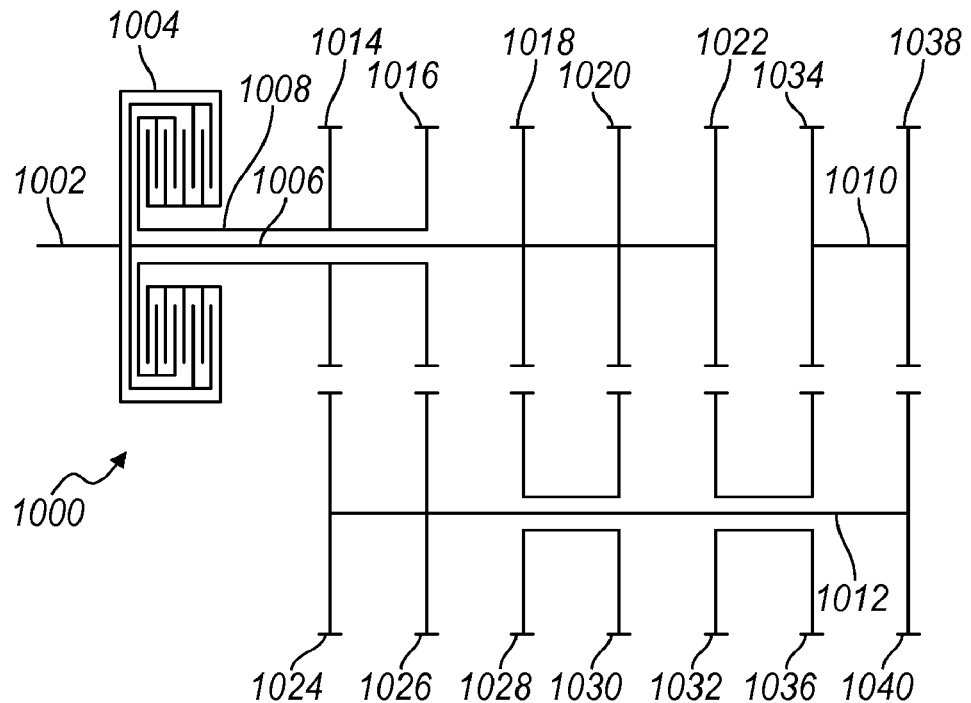
FIG. 19 is a diagram for a powershifting dual clutch transmission according to yet another embodiment.

FIG. 19 illustrates another embodiment of a multiple speed, dual clutch transmission layout. FIG. 19 depicts a dual clutch transmission 1000 having concentric input shafts, a single countershaft, and seven layers of gear meshes. FIG. 19 represents a shaft layout of the transmission 1000 and is not limiting in terms of how the gears are attached to the input shaft, a mainshaft, or countershaft. It is also possible to use various clutch arrangements and gear diameter sizing with the transmission 1000, examples of which are described below.

A shaft 1002 is connected to the dual clutch 1004 of the transmission 1000. Shaft 1002 may be connected to a prime mover, such as an engine, that provides input torque to the transmission 1000. The dual clutch 1004 is configured to provide torque to either a first input torque shaft 1006 or a second input torque shaft 1008 from shaft 1002. Input shaft 1008 is a sleeve shaft that surrounds input shaft 1006. Input shaft 1008 may be journaled within the transmission housing (not shown). Input shaft 1006 is journaled within input shaft 1008. Shafts 1006, 1008 are coaxial with one another.

The transmission 1000 has one or more mainshafts 1010. The mainshaft 1010 is coaxial with the input shafts 1006, 1008. The transmission has a single countershaft 1012. The countershaft 1012 is offset from the input shafts 1006, 1008 and mainshaft 1010. The transmission 1000 also has an output shaft (not shown), that may be coaxial with the mainshaft 1010.

Input shaft 1008 has first and second headset gears 1014, 1016. The headset gears 1014, 1016 may be directly connected to the shaft 1008, for example, by a splined connection or other drivable connection. Alternatively, one or both of the headset gears 1014, 1016 may be journaled to the shaft 1008 for selective connection, for example, by a clutch device, such as a synchronizing clutch assembly, a dog clutch, or the like. Shaft 1006 has first, second and third headset gears 1018, 1020, 1022 that may be directly connected to the shaft 1006, or journaled to the shaft 1006 for selective connection to the shaft 1006.

The transmission 1000 has seven layers of gear meshes. For example, one layer of gear mesh is formed by gear 1014 and gear 1024. Gear 1016 meshes with gear 1026 on the countershaft 1012. Gear 1018 meshes with gear 1028 on the countershaft. Another layer of gear mesh is formed by gear 1020 on input shaft 1006 and gear 1030 on the countershaft 1012. Gear 1022 meshes with gear 1032 on the countershaft 1012. Gear 1034 on the mainshaft 1010 meshes with gear 1036 on the countershaft 1012. Gear 1038 on the mainshaft 1010 meshes with gear 1040 on the countershaft 1012.

Gears 1034, 1038 on the mainshaft 1010 may be directly connected to the mainshaft 1010 for rotation therewith, or may be journaled to the mainshaft 1010 for selective connection therewith. Gears 1024, 1026, 1028, 1030, 1032, 1036, and 1040 on the countershaft 1012 may be directly connected to the countershaft 1012 for rotation therewith, or alternatively, may be journaled to the countershaft 1012 for selective connection therewith. More than one gear may be connected for rotation together. For example, the gears 1024, 1026, and 1040 may be connected or journaled to countershaft 1012, and gears 1028, 1030, 1032, and 1036 may be connected to journaled sleeve shafts.

Figure 20:
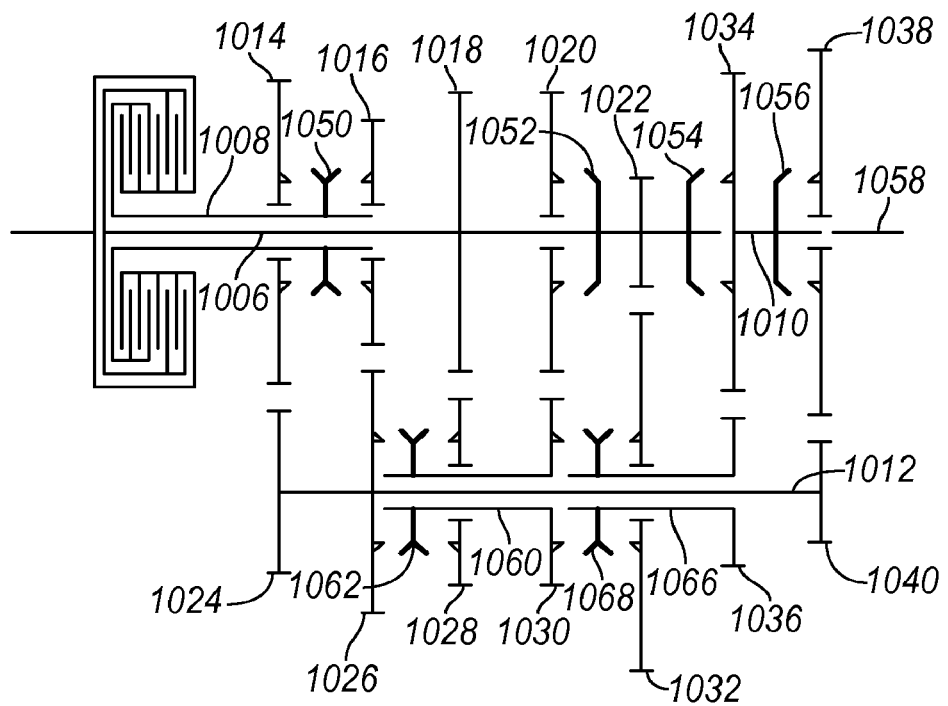
FIG. 20 is a diagram for the transmission of FIG. 19 with clutch placements according to an embodiment.

FIG. 20 illustrates the transmission 1000 with clutch placements and gear element to shaft connections according to an embodiment. FIG. 20 uses the same reference numerals for elements in common with those shown in FIG. 19.

Headset gears 1014, 1016 are journaled to the shaft 1008. A clutch 1050, such as a synchronizer clutch sleeve, connects either gear 1014 or gear 1016 to the shaft 1008 for rotation therewith.

Headset gear 1020 is journaled to shaft 1006. A clutch 1052 is connected to shaft 1006 and configured to connect headset gear 1020 to shaft 1006 for rotation therewith. Headset gears 1018 and 1022 are connected to shaft 1006 for rotation therewith, for example using a splined connection.

A clutch 1054 may selectively connect the input shaft 1006 to gear element 1034 on the mainshaft 1010, thereby connecting the input shaft 1006 to the mainshaft 1010 for rotation therewith. Gear 1034 is connected to mainshaft 1010 for rotation therewith, and gear 1038 is journaled about mainshaft 1010. Clutch 1056 selectively connects gear 1038 to mainshaft 1010 for rotation therewith.

The output shaft 1058 is coaxial with and connected to the mainshaft section 1010, for example, using a splined connection.

The countershaft 1012 has countershaft gear elements 1024, 1026, 1040 directly connected to it. Countershaft gear elements 1028 and 1030 are on a common sleeve shaft 1060 journaled to the countershaft 1012. A clutch 1062 is connected to the sleeve shaft 1060 and is configured to connect either gear element 1028 to the sleeve shaft 1060 or the sleeve shaft 1060 to gear element 1026 on the countershaft 1012.

Countershaft gear element 1036 is connected to a second sleeve shaft 1066 journaled to the countershaft 1012. Countershaft gear element 1032 is journaled to the second sleeve shaft 1066. A clutch 1068 is connected to the sleeve shaft 1066 and is configured to connect the second sleeve shaft 1066 to countershaft gear element 1030 and the first sleeve shaft 1060. Alternatively, clutch 1068 may connect journaled countershaft gear element 1032 to the second sleeve shaft 1066 for rotation therewith.

Figure 21:
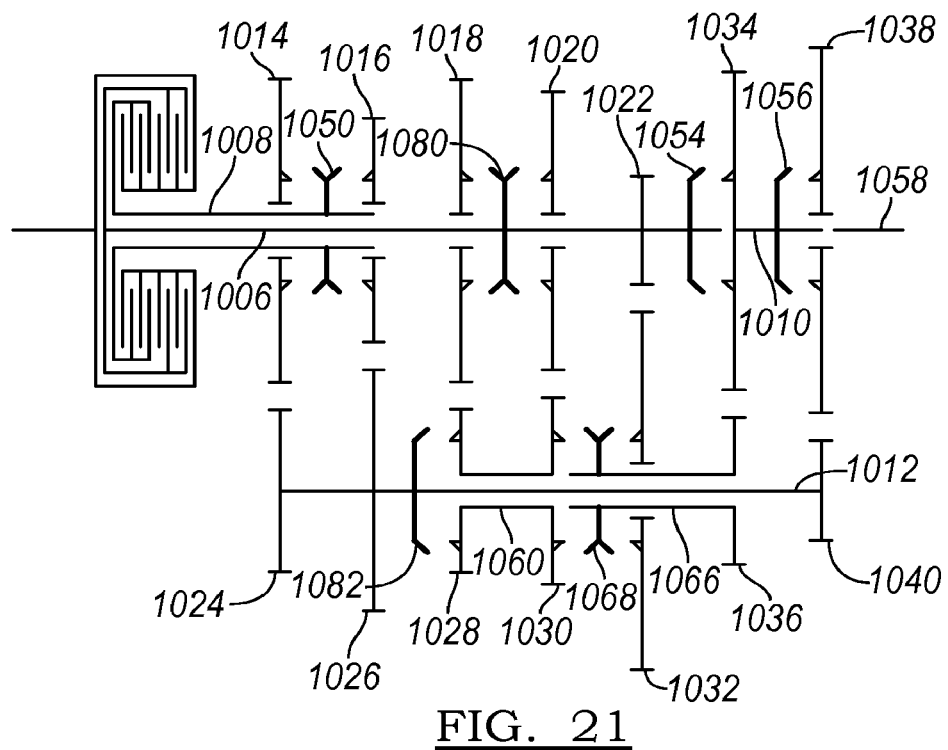
FIG. 21 is a diagram for the transmission of FIG. 19 with clutch placements according to another embodiment.

FIG. 21 illustrates the transmission 1000 with clutch placements and gear element to shaft connections according to another embodiment. FIG. 21 uses the same reference numerals for elements in common with those shown in FIGS. 19-20.

Headset gears 1014, 1016 are journaled to the shaft 1008. A clutch 1050, such as a synchronizer clutch sleeve, connects either gear 1014 or gear 1016 to the shaft 1008 for rotation therewith.

Headset gears 1018 and 1020 are journaled to shaft 1006. A clutch 1080 is connected to shaft 1006 and configured to connect either headset gear 1018 or gear 1020 to shaft 1006 for rotation therewith. Headset gear 1022 is connected to shaft 1006 for rotation therewith, for example using a splined connection.

A clutch 1054 may selectively connect the input shaft 1006 to gear element 1034 on the mainshaft 1010, thereby connecting the input shaft 1006 to the mainshaft 1010 for rotation therewith. Gear 1034 is connected to mainshaft 1010 for rotation therewith, and gear 1038 is journaled about mainshaft 1010. Clutch 1056 selectively connects gear 1038 to mainshaft 1010 for rotation therewith.

The output shaft 1058 is coaxial with and connected to the mainshaft section 1010, for example, using a splined connection.

The countershaft 1012 has countershaft gear elements 1024, 1026, 1040 directly connected to it. Countershaft gear elements 1028 and 1030 are on a common sleeve shaft 1060 journaled to the countershaft 1012. A clutch 1082 is connected to countershaft 1012 and is configured to connect the countershaft 1012 to gear element 1028 and the sleeve shaft 1060.

Countershaft gear element 1036 is connected to a second sleeve shaft 1066 journaled to the countershaft 1012. Countershaft gear element 1032 is journaled to the second sleeve shaft 1066. A clutch 1068 is connected to the sleeve shaft 1066 and is configured to connect the second sleeve shaft 1066 to countershaft gear element 1030 and the first sleeve shaft 1060. Alternatively, clutch 1068 may connect journaled countershaft gear element 1032 to the second sleeve shaft 1066 for rotation therewith.

Figure 22:
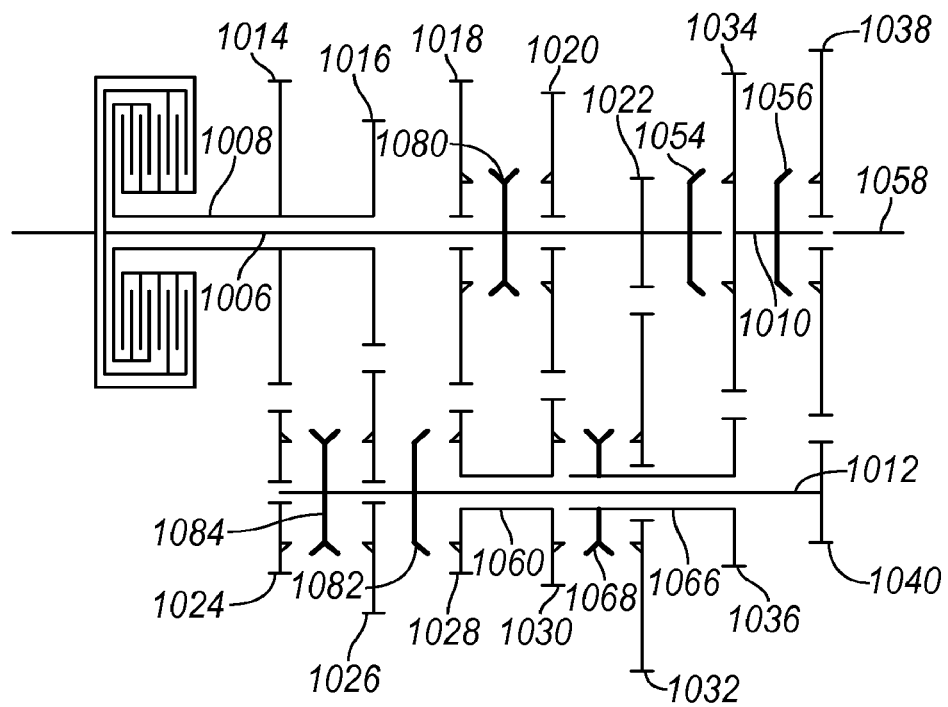
FIG. 22 is a diagram for the transmission of FIG. 19 with clutch placements according to yet another embodiment.

FIG. 22 illustrates the transmission 1000 with clutch placements and gear to shaft connections according to yet another embodiment. FIG. 22 uses the same reference numerals for elements in common with those shown in FIGS. 19-21.

Headset gears 1014, 1016 are connected to shaft 1008 for rotation therewith, for example, using a splined connection. Headset gears 1018 and 1020 are journaled to shaft 1006. A clutch 1080 is connected to shaft 1006 and configured to connect either headset gear 1018 or gear 1020 to shaft 1006 for rotation therewith. Headset gear 1022 is connected to shaft 1006 for rotation therewith, for example using a splined connection.

A clutch 1054 may selectively connect the input shaft 1006 to gear element 1034 on the mainshaft 1010, thereby connecting the input shaft 1006 to the mainshaft 1010 for rotation therewith. Gear 1034 is connected to mainshaft 1010 for rotation therewith, and gear 1038 is journaled about mainshaft 1010. Clutch 1056 selectively connects gear 1038 to mainshaft 1010 for rotation therewith.

The output shaft 1058 is coaxial with and connected to the mainshaft section 1010, for example, using a splined connection.

The countershaft 1012 has countershaft gear element 1040 directly connected to it. Countershaft gear elements 1024 and 1026 are journaled to the countershaft 1012. Clutch 1084 is connected to countershaft 1012 and is configured to connect either the countershaft 1012 to gear element 1024 or connect the countershaft 1012 to gear element 1026.

Countershaft gear elements 1028 and 1030 are on a common sleeve shaft 1060 journaled to the countershaft 1012. A clutch 1082 is connected to countershaft 1012 and is configured to connect the countershaft 1012 to gear element 1028 and the sleeve shaft 1060.

Countershaft gear element 1036 is connected to a second sleeve shaft 1066 journaled to the countershaft 1012. Countershaft gear element 1032 is journaled to the second sleeve shaft 1066. A clutch 1068 is connected to the sleeve shaft 1066 and is configured to connect the second sleeve shaft 1066 to countershaft gear element 1030 and the first sleeve shaft 1060. Alternatively, clutch 1068 may connect journaled countershaft gear element 1032 to the second sleeve shaft 1066 for rotation therewith.

Figure 23:
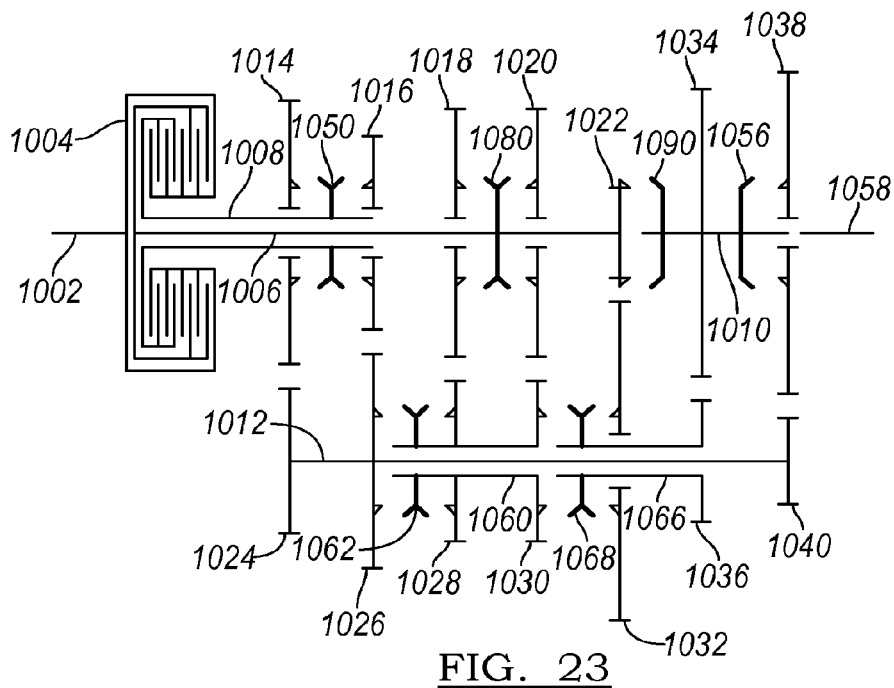
FIG. 23 is a diagram for the transmission of FIG. 19 with clutch placements and gear diameters according to another embodiment.

FIG. 23 illustrates the transmission 1000 with clutch placements and gear to shaft connections according to another embodiment. FIG. 23 uses the same reference numerals for elements in common with those shown in FIG. 19-22. The gear diameters for the transmission 1000 of FIG. 23 according to a non-limiting example are as follows: diameter of gear 1014 is 241.6 mm, diameter of gear 1016 is 171.1 mm, diameter of gear 1018 is 222.0 mm, diameter of gear 1020 is 222.4 mm, diameter of gear 1022 is 86.6 mm, diameter of gear 1034 is 259.7 mm, diameter of gear 1038 is 293.3 mm, diameter of gear 1024 is 128.4 mm, diameter of gear 1026 is 198.9 mm, diameter of gear 1028 is 148.0 mm, diameter of gear 1030 is 147.6 mm, diameter of gear 1032 is 284.0 mm, diameter of gear 1036 is 110.3 mm, and diameter of gear 1040 is 76.7 mm.

Headset gears 1014, 1016 are journaled to the shaft 1008. A clutch 1050, such as a synchronizer clutch sleeve, connects either gear 1014 or gear 1016 to the shaft 1008 for rotation therewith.

Headset gears 1018 and 1020 are journaled to shaft 1006. A clutch 1080 is connected to shaft 1006 and configured to connect either headset gear 1018 or gear 1020 to shaft 1006 for rotation therewith. Headset gear 1022 is connected to shaft 1006 for rotation therewith, for example using a splined connection.

A clutch 1090 may selectively connect the mainshaft 1010 to headset gear 1022, thereby connecting the input shaft 1006 to the mainshaft 1010 for rotation therewith. Gear 1034 is connected to mainshaft 1010 for rotation therewith, and gear 1038 is journaled about mainshaft 1010. Clutch 1056 selectively connects gear 1038 to mainshaft 1010 for rotation therewith.

The output shaft 1058 is coaxial with and connected to the mainshaft section 1010, for example, using a splined connection.

The countershaft 1012 has countershaft gear elements 1024, 1026, 1040 directly connected to it. Countershaft gear elements 1028 and 1030 are on a common sleeve shaft 1060 journaled to the countershaft 1012. A clutch 1062 is connected to the sleeve shaft 1060 and is configured to connect either gear element 1028 to the sleeve shaft 1060 or the sleeve shaft 1060 to gear element 1026 on the countershaft 1012.

Countershaft gear element 1036 is connected to a second sleeve shaft 1066 journaled to the countershaft 1012. Countershaft gear element 1032 is journaled to the second sleeve shaft 1066. A clutch 1068 is connected to the sleeve shaft 1066 and is configured to connect the second sleeve shaft 1066 to countershaft gear element 1030 and the first sleeve shaft 1060. Alternatively, clutch 1068 may connect journaled countershaft gear element 1032 to the second sleeve shaft 1066 for rotation therewith.

Figure 24:
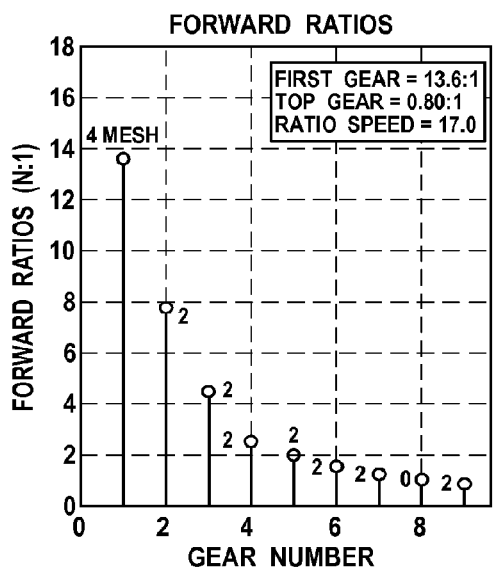
FIG. 24 is a graph illustrating forward ratios for the transmission layout and gear diameters as shown in FIG. 23.

FIG. 24 illustrates forward ratios for the gear diameters and layout of the transmission 1000 of FIG. 23. As can be seen by the graph, each forward gear ratio is smaller than the one before it, such that the gear ratios are monotonically decreasing as the gear number increases. Gear diameters and power paths for the transmission 1000 layouts are selected such that the gear ratios monotonically decrease in this manner. Also shown is the number of meshes engaged to transmit torque for each associated forward ratio.

Figure 25:
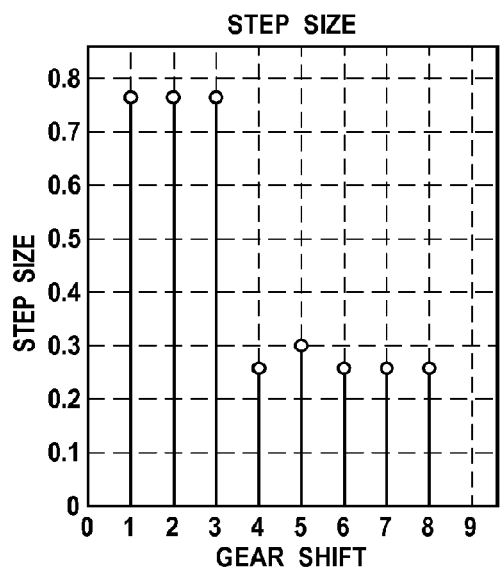
FIG. 25 is a graph illustrating step sizes for the transmission layout and gear diameters as shown in FIG. 23.

FIG. 25 illustrates step sizes for the gear diameters and layout of the transmission 1000 of FIG. 23. As can be seen by the graph, the step sizes are large in the lower, launch gears and shifts, and small in the higher gears and shifts.

FIG. 26 illustrates an embodiment of various powerpaths for the transmission 1000 of FIG. 23. The transmissions 1000 illustrated in FIGS. 19-22 have associated powerpaths, and FIG. 23 is not intended to limit the spirit and scope of the disclosure. The transmission 1000 as shown in FIGS. 19-23 powershifts between consecutive gear ratios such that there are no torque interrupts during a shift. The torque or power path is illustrated by a dashed line in FIG. 26.

Figure 26A:
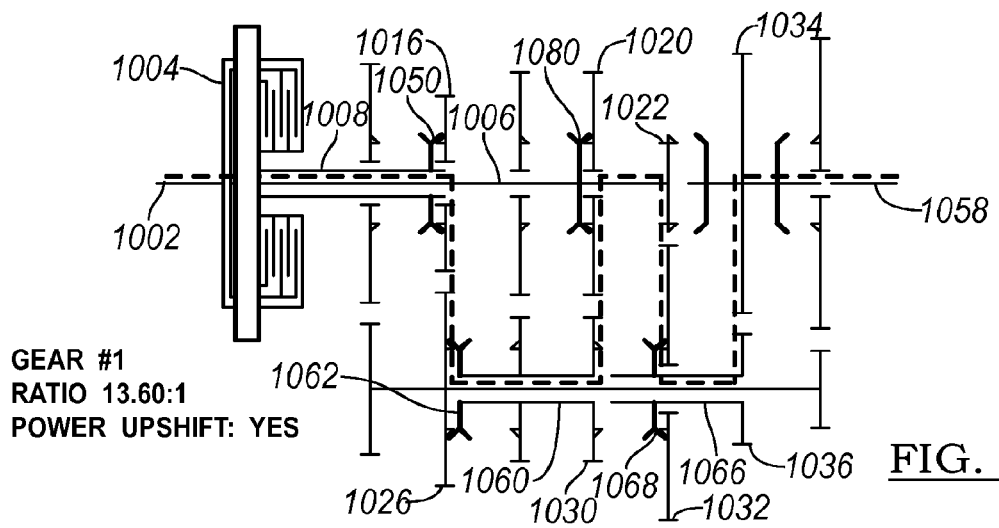
FIGS. 26A-I illustrate various powerpaths for the transmission of FIG. 23.

FIG. 26A illustrates the transmission 1000 in a first gear ratio. The torque path for the first gear ratio begins at the input shaft 1002, and continues through the dual clutch 1004 that is engaged such that torque flows to the input shaft 1008. Clutch 1050 is engaged to connect journaled headset gear element 1016 to the input shaft 1008. Torque flows from the headset gear 1016 to countershaft gear element 1026. Clutch 1062 connects gear 1026 to sleeve shaft 1060 and gear element 1030. Clutch 1080 connects the headset gear element 1020 to shaft 1006 such that torque flows to headset gear 1022. Clutch 1068 is engaged to connect gear 1032 to the second countershaft sleeve 1066. Torque then flows through countershaft gear element 1036 to mainshaft gear element 1034, and to the output shaft 1058 of the transmission 1000.

Figure 26B:
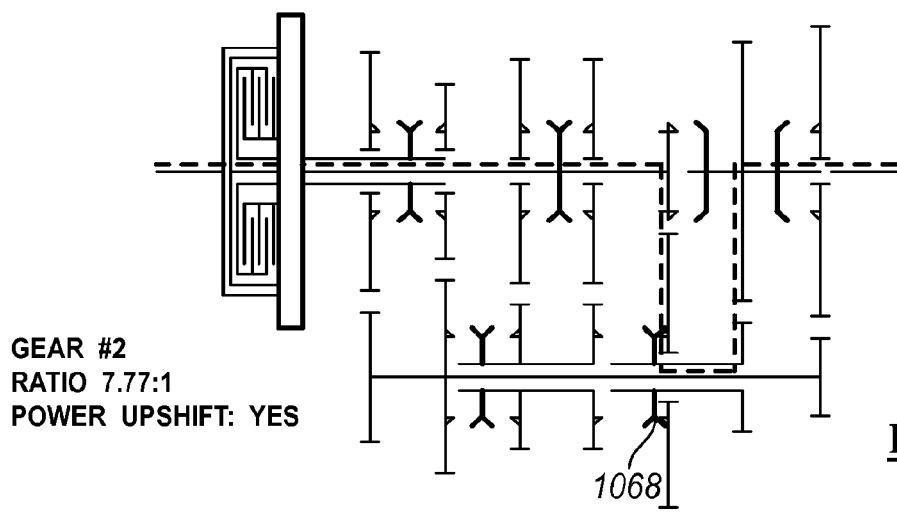

FIG. 26B illustrates the transmission 1000 in a second gear ratio. The dual clutch is engaged such that torque flows to the input shaft 1006. Clutch 1068 is engaged to provide the torque flow path as shown.

Figure 26C:
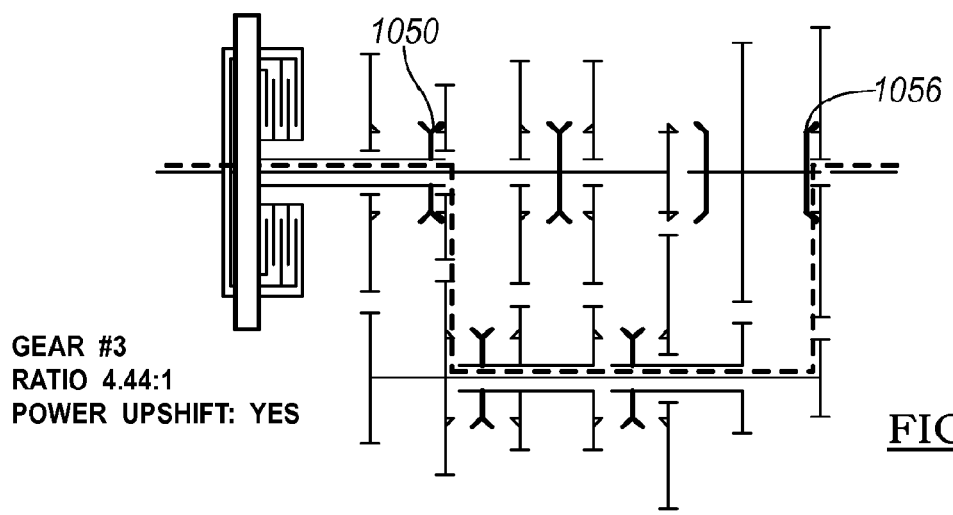

FIG. 26C illustrates the transmission 1000 in a third gear ratio. The dual clutch is engaged such that torque flows to the input shaft 1008. Clutches 1050 and 1056 are engaged to provide the torque flow path as shown.

Figure 26D:
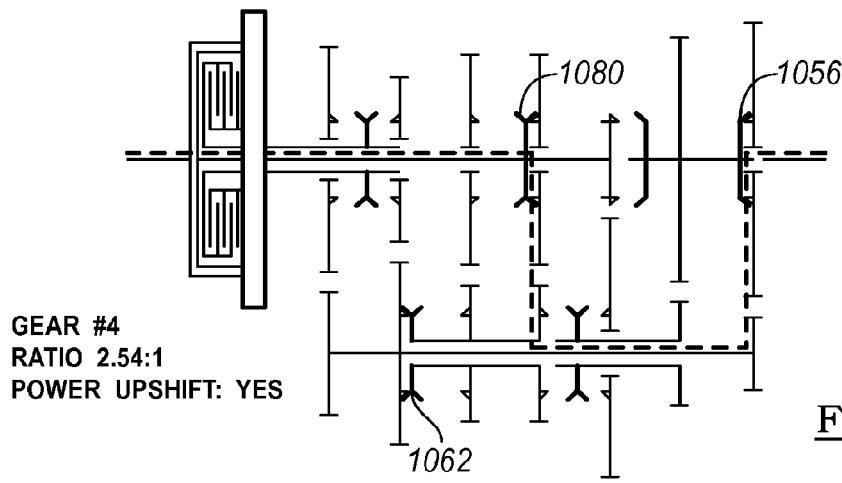

FIG. 26D illustrates the transmission 1000 in a fourth gear ratio. The dual clutch is engaged such that torque flows to the input shaft 1006. Clutches 1080, 1062, and 1056 are engaged to provide the torque flow path as shown.

Figure 26E:
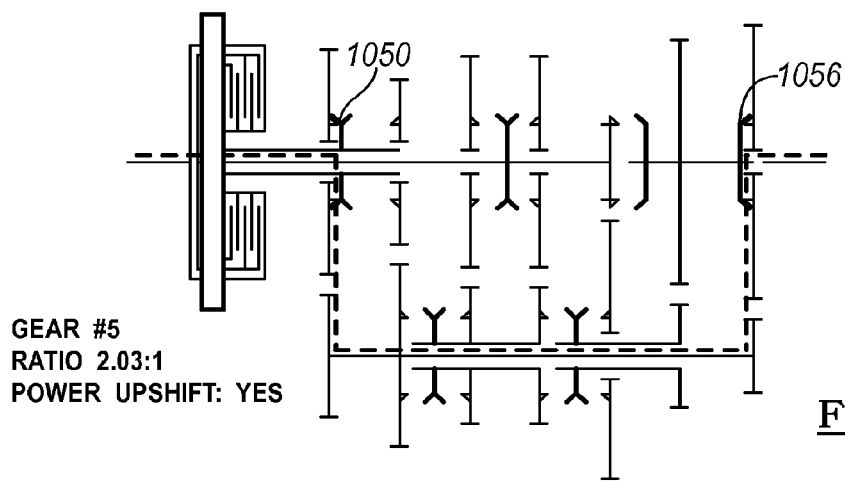

FIG. 26E illustrates the transmission 1000 in a fifth gear ratio. The dual clutch is engaged such that torque flow to the input shaft 1008. Clutches 1050 and 1056 are engaged to provide the torque flow path as shown.

Figure 26F:
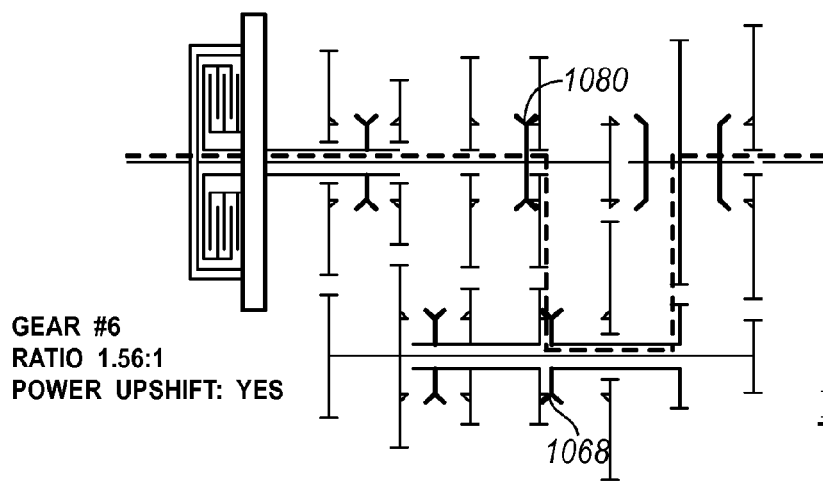

FIG. 26F illustrates the transmission 1000 in a sixth gear ratio. The dual clutch is engaged such that torque flow to the input shaft 1006. Clutches 1080 and 1068 are engaged to provide the torque flow path as shown.

Figure 26G:
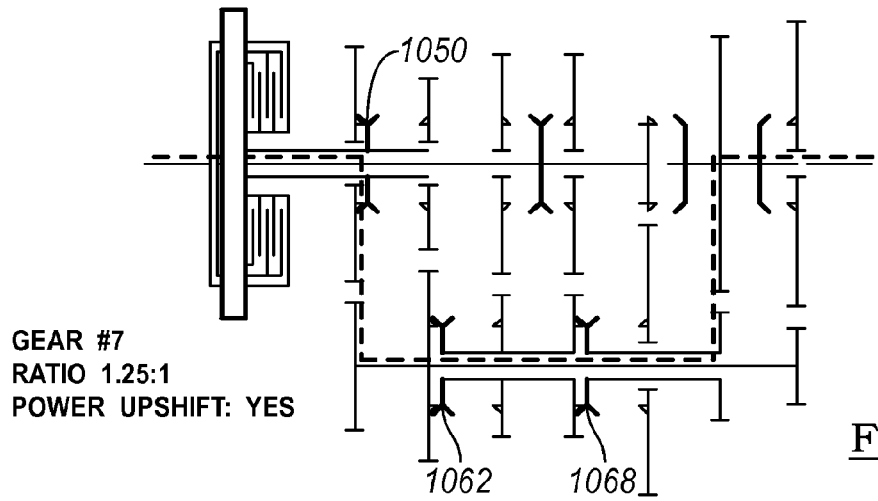

FIG. 26G illustrates the transmission 1000 in a seventh gear ratio. The dual clutch is engaged such that torque flow to the input shaft 1008. Clutches 1050, 1062, and 1068 are engaged to provide the torque flow path as shown.

Figure 26H:
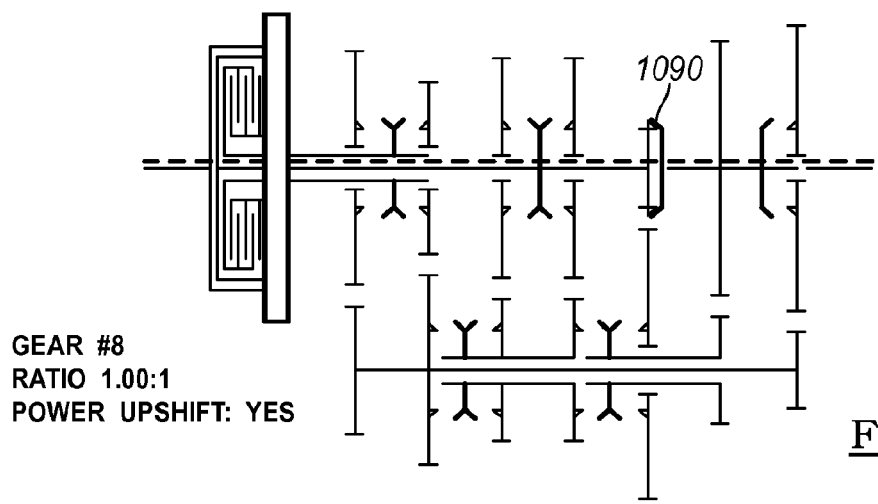

FIG. 26H illustrates the transmission 1000 in an eighth gear ratio. The dual clutch is engaged such that torque flow to the input shaft 1006. Clutch 1090 is engaged to provide the torque flow path as shown.

Figure 26I:
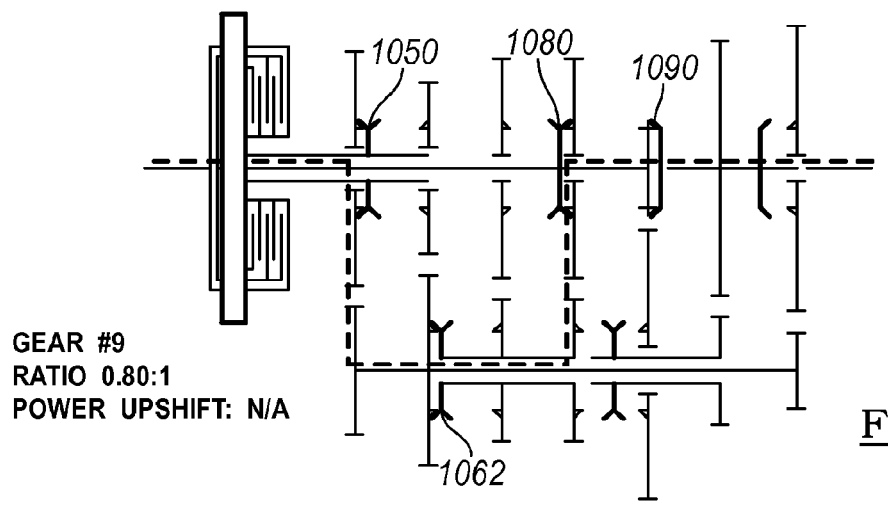

FIG. 26I illustrates the transmission 1000 in a ninth gear ratio. The dual clutch is engaged such that torque flow to the input shaft 1008. Clutches 1050, 1062, 1080, and 1090 are engaged to provide the torque flow path as shown.

FIG. 27 illustrates shift diagrams for the transmission 1000 as illustrated in FIG. 23. Of course, the transmissions 1000 illustrated in FIGS. 19-22 have associated powerpaths and shift patterns, and FIG. 27 is not intended to limit the spirit and scope of the disclosure. The transmission 1000 powershifts between consecutive gear ratios of the transmission 1000 such that there are no torque interrupts during a shift. The torque or power path of the driving gear ratio in FIG. 27 is shown as a solid line, and the torque or power path of the preselected gear ratio is illustrated as a dashed line.

Figure 27A:
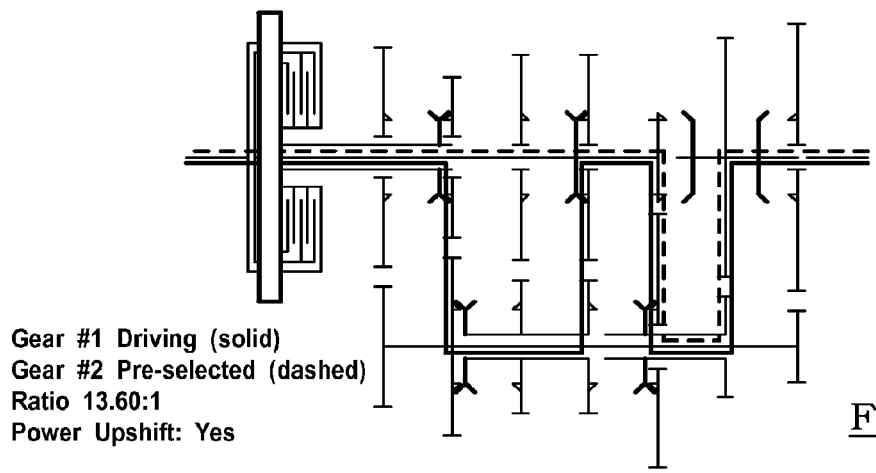
FIGS. 27A-I are shift diagrams for the transmission of FIG. 23.

FIG. 27A illustrates the transmission in first gear as shown in FIG. 26A and the preselected power path for after an upshift is completed into second gear, as shown in FIG. 26B. The transmission has clutch 1068 preselected and engaged such that when the dual clutch is activated to change the torque flow from input shaft 1008 to shaft 1006, the transmission shifts into second gear without a torque interrupt. Note that gear 1068 is also engaged and used for driving the transmission 1000 in first gear.

Figure 27B:
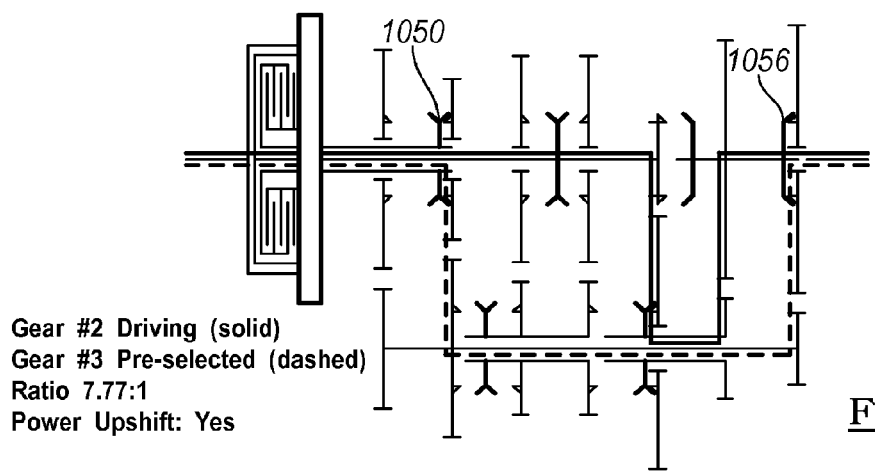

FIG. 27B illustrates the transmission in second gear as shown in FIG. 26B and the preselected power path for after an upshift is completed into third gear, as shown in FIG. 26C. The transmission has clutches 1050 and 1056 preselected and engaged such that when the dual clutch is activated to change the torque flow from input shaft 1006 to shaft 1008, the transmission shifts into third gear without a torque interrupt.

Figure 27C:
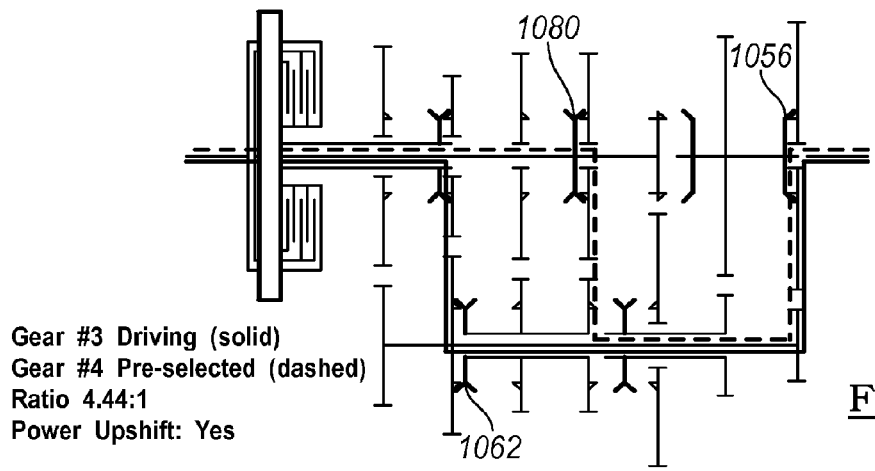

FIG. 27C illustrates the transmission in third gear as shown in FIG. 26C and the preselected power path for after an upshift is completed into fourth gear, as shown in FIG. 26D. The transmission has clutches 1080, 1062, and 1056 preselected and engaged such that when the dual clutch is activated to change the torque flow from input shaft 1008 to shaft 1006, the transmission shifts into fourth gear without a torque interrupt.

Figure 27D:
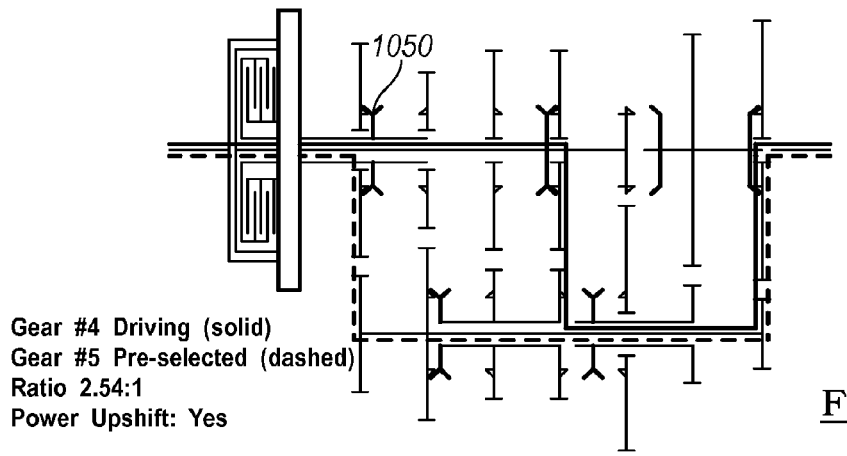

FIG. 27D illustrates the transmission in fourth gear as shown in FIG. 26D and the preselected power path for after an upshift is completed into fifth gear, as shown in FIG. 26E. The transmission has clutch 1050 preselected and engaged such that when the dual clutch is activated to change the torque flow from input shaft 1006 to shaft 1008, the transmission shifts into fifth gear without a torque interrupt.

Figure 27E:
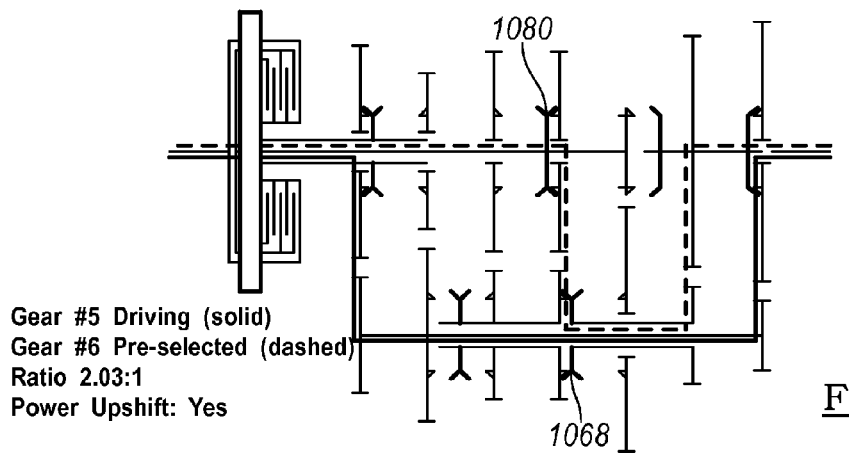

FIG. 27E illustrates the transmission in fifth gear as shown in FIG. 26E and the preselected power path for after an upshift is completed into sixth gear, as shown in FIG. 26F. The transmission has clutches 1080 and 1068 preselected and engaged such that when the dual clutch is activated to change the torque flow from input shaft 1008 to shaft 1006, the transmission shifts into sixth gear without a torque interrupt.

Figure 27F:
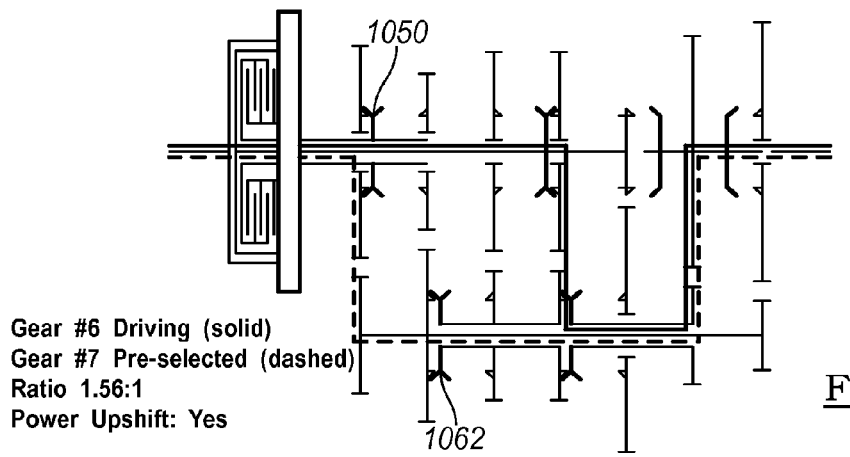

FIG. 27F illustrates the transmission in sixth gear as shown in FIG. 26F and the preselected power path for after an upshift is completed into seventh gear, as shown in FIG. 26G. The transmission has clutches 1050 and 1062 preselected and engaged such that when the dual clutch is activated to change the torque flow from input shaft 1006 to shaft 1008, the transmission shifts into seventh gear without a torque interrupt.

Figure 27G:
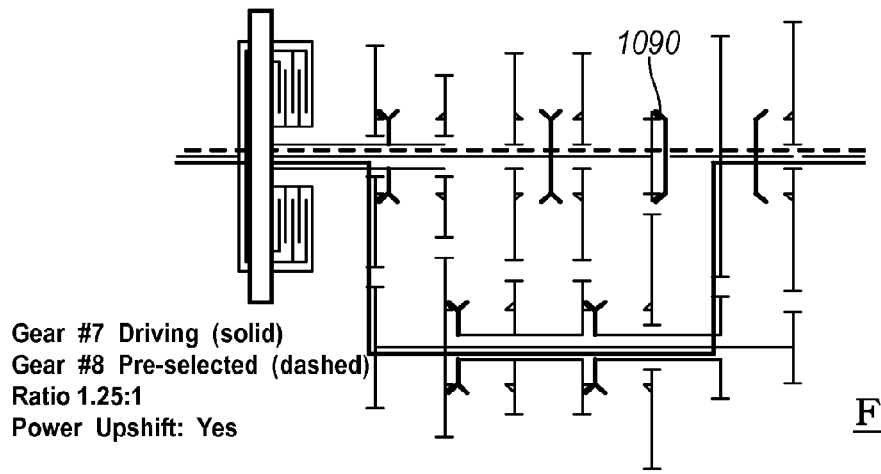

FIG. 27G illustrates the transmission in seventh gear as shown in FIG. 26G and the preselected power path for after an upshift is completed into eighth gear, as shown in FIG. 26H. The transmission has clutch 1090 preselected and engaged such that when the dual clutch is activated to change the torque flow from input shaft 1008 to shaft 1006, the transmission shifts into eighth gear without a torque interrupt.

Figure 27H:
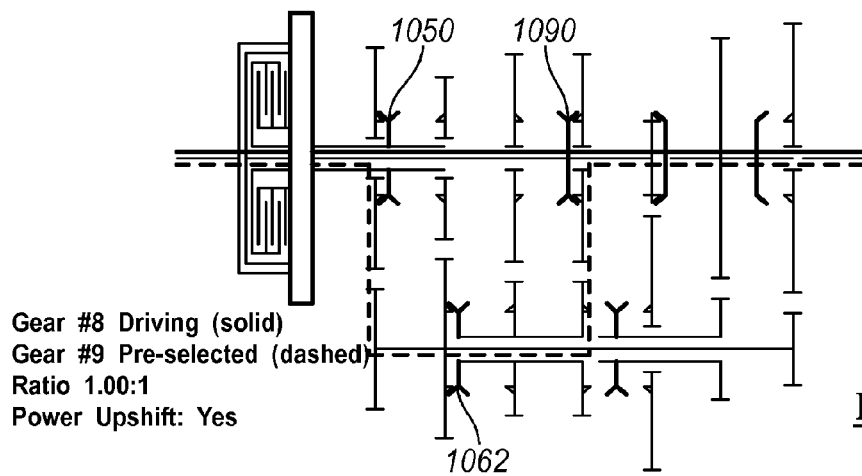

FIG. 27H illustrates the transmission in eighth gear as shown in FIG. 26H and the preselected power path for after an upshift is completed into ninth gear, as shown in FIG. 26I. The transmission has clutches 1050, 1062, and 1090 preselected and engaged such that when the dual clutch is activated to change the torque flow from input shaft 1006 to shaft 1008, the transmission shifts into ninth gear without a torque interrupt.

Figure 27I:
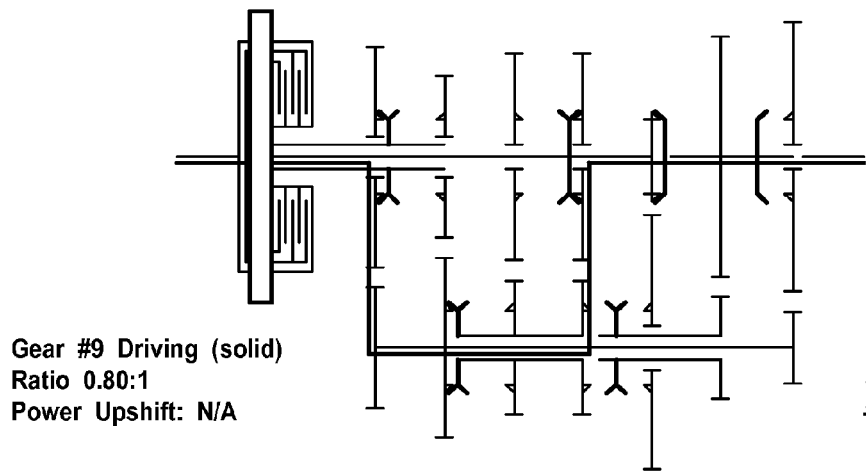

FIG. 27I illustrates the transmission in ninth gear as shown in FIG. 26I. The transmission 1000 is now at its highest gear ratio, and no further upshifting occurs.

Figure 28:
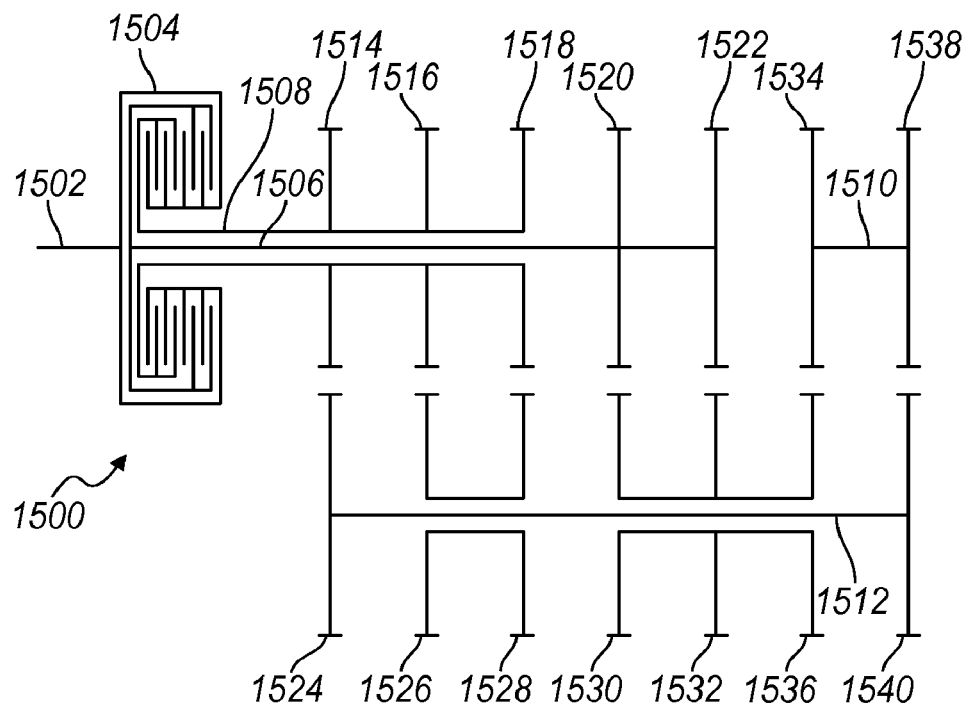
FIG. 28 is a diagram for a powershifting dual clutch transmission according to another embodiment.

FIG. 28 illustrates another embodiment of a multiple speed, dual clutch transmission layout. FIG. 28 depicts a dual clutch transmission 1500 having concentric input shafts, a single countershaft, and seven layers of gear meshes. FIG. 28 represents a shaft layout of the transmission 1500 and is not limiting in terms of how the gears are attached to the input shaft, a mainshaft, or countershaft. It is also possible to use various clutch arrangements and gear diameter sizing with the transmission 1500, examples of which are described below.

A shaft 1502 is connected to the dual clutch 1504 of the transmission 1500. Shaft 1502 may be connected to a prime mover, such as an engine, that provides input torque to the transmission 1500. The dual clutch 1504 is configured to provide torque to either a first input torque shaft 1506 or a second input torque shaft 1508 from shaft 1502. Input shaft 1508 is a sleeve shaft that surrounds input shaft 1506. Input shaft 1508 may be journaled within the transmission housing (not shown). Input shaft 1506 is journaled within input shaft 1508. Shafts 1506, 1508 are coaxial with one another.

The transmission 1500 has one or more mainshafts 1510. The mainshaft 1510 is coaxial with the input shafts 1506, 1508. The transmission has a single countershaft 1512. The countershaft 1512 is offset from the input shafts 1506, 1508 and mainshaft 1510. The transmission 1500 also has an output shaft (not shown), that may be coaxial with the mainshaft 1510

Input shaft 1508 has first, second, and third headset gears 1514, 1516, 1518. The headset gears 1514, 1516, 1518 may be directly connected to the shaft 1508, for example, by a splined connection or other drivable connection. Alternatively, one or more of the headset gears 1514, 1516, 1518 may be journaled to the shaft 1508 for selective connection, for example, by a clutch device, such as a synchronizing clutch assembly, a dog clutch, or the like. Shaft 1506 has first and second headset gears 1520, 1522 that may be directly connected to the shaft 1506, or journaled to the shaft 1506 for selective connection to the shaft 1506.

The transmission 1500 has seven layers of gear meshes. For example, one layer of gear mesh is formed by gear 1514 and gear 1524. Gear 1516 meshes with gear 1526 on the countershaft 1512. Gear 1518 meshes with gear 1528 on the countershaft. Another layer of gear mesh is formed by gear 1520 on input shaft 1506 and gear 1530 on the countershaft 1512. Gear 1522 meshes with gear 1532 on the countershaft 1512. Gear 1534 on the mainshaft 1510 meshes with gear 1536 on the countershaft 1512. Gear 1538 on the mainshaft 1510 meshes with gear 1540 on the countershaft 1512.

Gears 1534, 1538 on the mainshaft 1510 may be directly connected to the mainshaft 1510 for rotation therewith, or may be journaled to the mainshaft 1510 for selective connection therewith. Gears 1524, 1526, 1528, 1530, 1532, 1536, and 1540 on the countershaft 1512 may be directly connected to the countershaft 1512 for rotation therewith, or alternatively, may be journaled to the countershaft 1512 for selective connection therewith. More than one gear may be connected for rotation together. For example, the gears 1524 and 1540 may be connected or journaled to countershaft 1512, and gears 1526, 1528, 1530, 1532, and 1536 are connected to journaled sleeve shafts.

Figure 29:
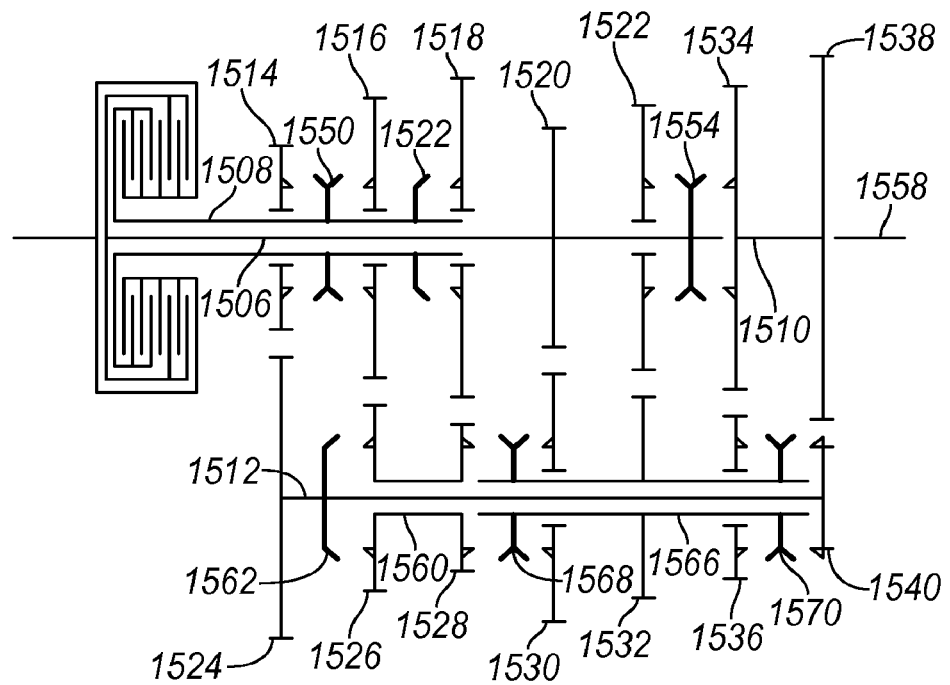
FIG. 29 is a diagram for the transmission of FIG. 28 with clutch placements according to an embodiment.

FIG. 29 illustrates the transmission 1500 with clutch placements and gear element to shaft connections according to an embodiment. FIG. 29 uses the same reference numerals for elements in common with those shown in FIG. 28.

Headset gears 1514, 1516, 1518 are journaled to the shaft 1508. A clutch 1550, such as a synchronizer clutch sleeve, connects either gear 1514 or gear 1516 to the shaft 1508 for rotation therewith. A clutch 1552 connects headset gear 1518 to shaft 1508 for rotation therewith.

Headset gear 1520 is connected to shaft 1506 for rotation therewith. Headset gear 1522 is journaled to shaft 1506. A clutch 1554 is connected to shaft 1506 and configured to connect headset gear 1522 to shaft 1506 for rotation therewith.

Clutch 1554 may also selectively connect the input shaft 1506 to gear element 1534 on the mainshaft 1510, thereby connecting the input shaft 1506 to the mainshaft 1510 for rotation therewith. Gears 1534, 1538 are connected to mainshaft 1510 for rotation therewith.

The output shaft 1558 is coaxial with and connected to the mainshaft section 1510, for example, using a splined connection.

The countershaft 1512 has countershaft gear elements 1524, 1540 directly connected to it. Countershaft gear elements 1526 and 1528 are on a common sleeve shaft 1560 journaled to the countershaft 1512. A clutch 1562 is connected to the countershaft 1512 and is configured to connect the countershaft 1512 to gear element 1526 on the sleeve shaft 1560.

Countershaft gear element 1532 is connected to a second sleeve shaft 1566 journaled to the countershaft 1512. Countershaft gear element 1530 is journaled to the second sleeve shaft 1566. A clutch 1568 is connected to the sleeve shaft 1566 and is configured to connect the second sleeve shaft 1566 to countershaft gear element 1528 and the first sleeve shaft 1560. Alternatively, clutch 1568 may connect journaled countershaft gear element 1530 to the second sleeve shaft 1566 for rotation therewith.

Another clutch 1570 is connected to the sleeve shaft 1566 and is configured to connect the second sleeve shaft 1566 to countershaft gear element 1540. Alternatively, clutch 1570 may connect journaled countershaft gear element 1536 to the second sleeve shaft 1566 for rotation therewith.

Figure 30:
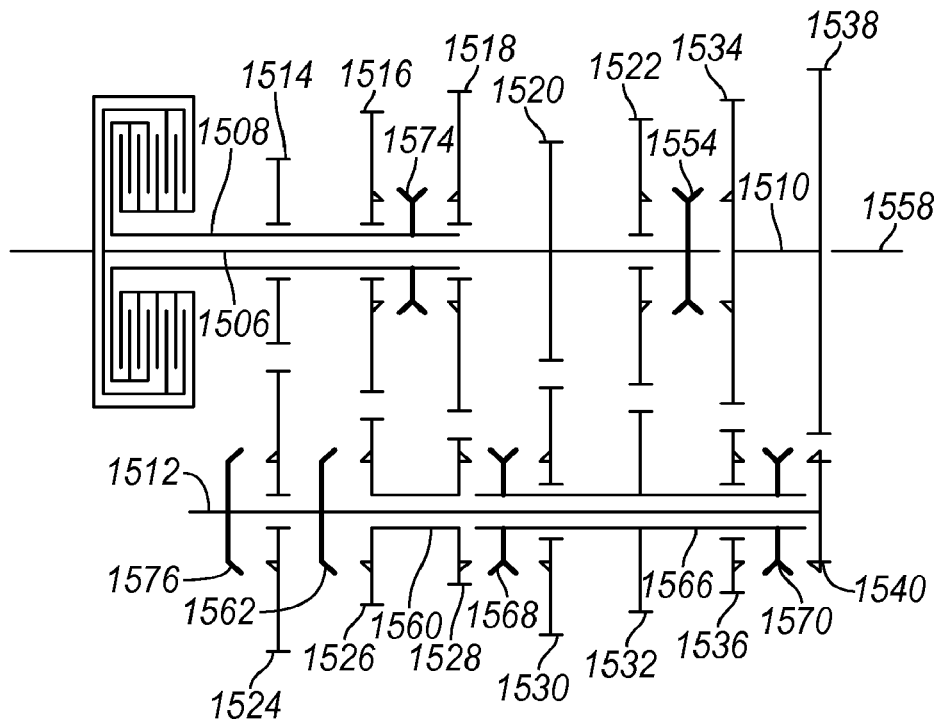
FIG. 30 is a diagram for the transmission of FIG. 28 with clutch placements according to another embodiment.

FIG. 30 illustrates the transmission 1500 with clutch placements and gear element to shaft connections according to another embodiment. FIG. 30 uses the same reference numerals for elements in common with those shown in FIGS. 28-29.

Headset gear 1514 is connected to the shaft 1508. Headset gears 1516, 1518 are journaled to the shaft 1508. A clutch 1574, such as a synchronizer clutch sleeve, connects either gear 1516 or gear 1518 to the shaft 1508 for rotation therewith.

Headset gear 1520 is connected to shaft 1506 for rotation therewith. Headset gear 1522 is journaled to shaft 1506. A clutch 1554 is connected to shaft 1506 and configured to connect headset gear 1522 to shaft 1506 for rotation therewith.

Clutch 1554 may also selectively connect the input shaft 1506 to gear element 1534 on the mainshaft 1510, thereby connecting the input shaft 1506 to the mainshaft 1510 for rotation therewith. Gears 1534, 1538 are connected to mainshaft 1510 for rotation therewith.

The output shaft 1558 is coaxial with and connected to the mainshaft section 1510, for example, using a splined connection.

The countershaft 1512 has countershaft gear element 1540 directly connected to it. Countershaft gear element 1524 is journaled to the countershaft 1512. Clutch 1576 selectively connects gear 1524 to the countershaft 1512 for rotation therewith.

Countershaft gear elements 1526 and 1528 are on a common sleeve shaft 1560 journaled to the countershaft 1512. A clutch 1562 is connected to the countershaft 1512 and is configured to connect the countershaft 1512 to gear element 1526 on the sleeve shaft 1560.

Countershaft gear element 1532 is connected to a second sleeve shaft 1566 journaled to the countershaft 1512. Countershaft gear element 1530 is journaled to the second sleeve shaft 1566. A clutch 1568 is connected to the sleeve shaft 1566 and is configured to connect the second sleeve shaft 1566 to countershaft gear element 1528 and the first sleeve shaft 1560. Alternatively, clutch 1568 may connect journaled countershaft gear element 1530 to the second sleeve shaft 1566 for rotation therewith.

Another clutch 1570 is connected to the sleeve shaft 1566 and is configured to connect the second sleeve shaft 1566 to countershaft gear element 1540. Alternatively, clutch 1570 may connect journaled countershaft gear element 1536 to the second sleeve shaft 1566 for rotation therewith.

Figure 31:
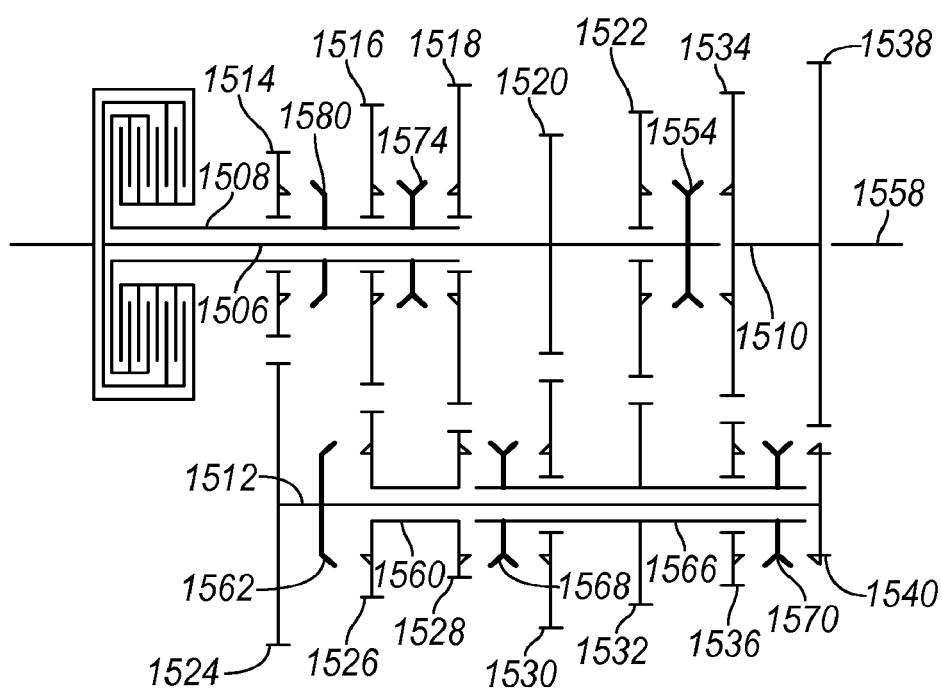
FIG. 31 is a diagram for the transmission of FIG. 28 with clutch placements according to yet another embodiment.

FIG. 31 illustrates the transmission 1500 with clutch placements and gear to shaft connections according to yet another embodiment. FIG. 31 uses the same reference numerals for elements in common with those shown in FIGS. 28-30.

Headset gears 1514, 1516, 1518 are journaled to the shaft 1508. A clutch 1580, such as a synchronizer clutch sleeve, connects gear 1514 to the shaft 1508 for rotation therewith. A clutch 1574 connects either headset gear 1516 or headset gear 1518 to shaft 1508 for rotation therewith.

Headset gear 1520 is connected to shaft 1506 for rotation therewith. Headset gear 1522 is journaled to shaft 1506. A clutch 1554 is connected to shaft 1506 and configured to connect headset gear 1522 to shaft 1506 for rotation therewith.

Clutch 1554 may also selectively connect the input shaft 1506 to gear element 1534 on the mainshaft 1510, thereby connecting the input shaft 1506 to the mainshaft 1510 for rotation therewith. Gears 1534, 1538 are connected to mainshaft 1510 for rotation therewith.

The output shaft 1558 is coaxial with and connected to the mainshaft section 1510, for example, using a splined connection.

The countershaft 1512 has countershaft gear elements 1524, 1540 directly connected to it. Countershaft gear elements 1526 and 1528 are on a common sleeve shaft 1560 journaled to the countershaft 1512. A clutch 1562 is connected to the countershaft 1512 and is configured to connect the countershaft 1512 to gear element 1526 on the sleeve shaft 1560.

Countershaft gear element 1532 is connected to a second sleeve shaft 1566 journaled to the countershaft 1512. Countershaft gear element 1530 is journaled to the second sleeve shaft 1566. A clutch 1568 is connected to the sleeve shaft 1566 and is configured to connect the second sleeve shaft 1566 to countershaft gear element 1528 and the first sleeve shaft 1560. Alternatively, clutch 1568 may connect journaled countershaft gear element 1530 to the second sleeve shaft 1566 for rotation therewith.

Another clutch 1570 is connected to the sleeve shaft 1566 and is configured to connect the second sleeve shaft 1566 to countershaft gear element 1540. Alternatively, clutch 1570 may connect journaled countershaft gear element 1536 to the second sleeve shaft 1566 for rotation therewith.

Figure 32:
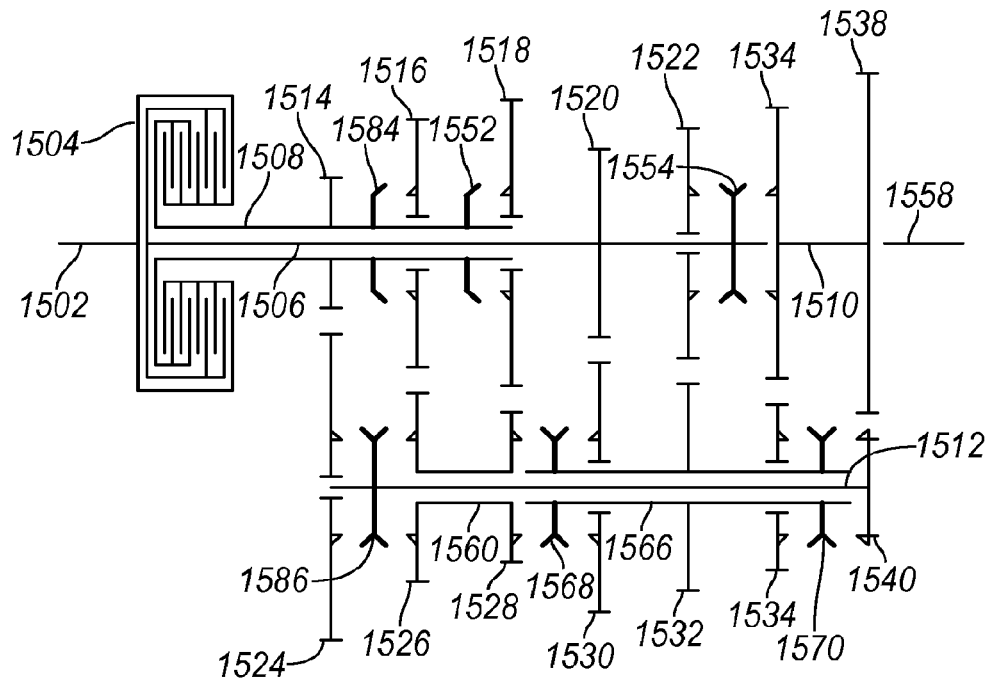
FIG. 32 is a diagram for the transmission of FIG. 28 with clutch placements and gear diameters according to another embodiment.

FIG. 32 illustrates the transmission 1500 with clutch placements and gear to shaft connections according to another embodiment. FIG. 32 uses the same reference numerals for elements in common with those shown in FIG. 28-31. The gear diameters for the transmission 1500 of FIG. 32 according to a non-limiting example are as follows: diameter of gear 1514 is 104.7 mm, diameter of gear 1516 is 199.1 mm, diameter of gear 1518 is 232.0 mm, diameter of gear 1520 is 149.9 mm, diameter of gear 1522 is 184.4 mm, diameter of gear 1534 is 218.2 mm, diameter of gear 1538 is 274.7 mm, diameter of gear 1524 is 249.3 mm, diameter of gear 1526 is 154.9 mm, diameter of gear 1528 is 122.0 mm, diameter of gear 1530 is 204.1 mm, diameter of gear 1532 is 169.6 mm, diameter of gear 1534 is 135.8 mm, and diameter of gear 1540 is 79.3 mm.

Headset gear 1514 is connected to the shaft 1508 for rotation therewith, for example, using a splined connection. Headset gears 1516, 1518 are journaled to the shaft 1508. A clutch 1584 connects gear 1516 to the shaft 1508 for rotation therewith. A clutch 1552 connects headset gear 1518 to shaft 1508 for rotation therewith.

Headset gear 1520 is connected to shaft 1506 for rotation therewith. Headset gear 1522 is journaled to shaft 1506. A clutch 1554 is connected to shaft 1506 and configured to connect headset gear 1522 to shaft 1506 for rotation therewith.

Clutch 1554 may also selectively connect the input shaft 1506 to gear element 1534 on the mainshaft 1510, thereby connecting the input shaft 1506 to the mainshaft 1510 for rotation therewith. Gears 1534, 1538 are connected to mainshaft 1510 for rotation therewith.

The output shaft 1558 is coaxial with and connected to the mainshaft section 1510, for example, using a splined connection.

The countershaft 1512 has countershaft gear element 1540 directly connected to it. Countershaft gear element 1524 is journaled to the countershaft 1512. Clutch 1586 selectively connects gear 1524 to the countershaft 1512 for rotation therewith.

Countershaft gear elements 1526 and 1528 are on a common sleeve shaft 1560 journaled to the countershaft 1512. Clutch 1586 is configured to connect the countershaft 1512 to gear element 1526 on the sleeve shaft 1560.

Countershaft gear element 1532 is connected to a second sleeve shaft 1566 journaled to the countershaft 1512. Countershaft gear element 1530 is journaled to the second sleeve shaft 1566. A clutch 1568 is connected to the sleeve shaft 1566 and is configured to connect the second sleeve shaft 1566 to countershaft gear element 1528 and the first sleeve shaft 1560. Alternatively, clutch 1568 may connect journaled countershaft gear element 1530 to the second sleeve shaft 1566 for rotation therewith.

Another clutch 1570 is connected to the sleeve shaft 1566 and is configured to connect the second sleeve shaft 1566 to countershaft gear element 1540. Alternatively, clutch 1570 may connect journaled countershaft gear element 1536 to the second sleeve shaft 1566 for rotation therewith.

Figure 33:
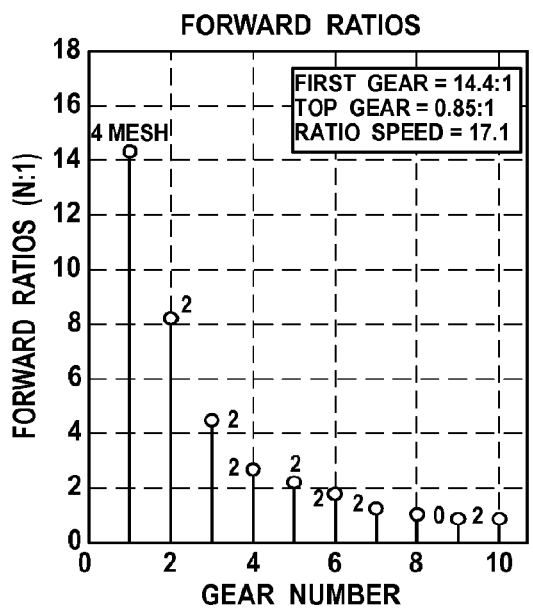
FIG. 33 is a graph illustrating forward ratios for the transmission layout and gear diameters as shown in FIG. 32.

FIG. 33 illustrates forward ratios for the gear diameters and layout of the transmission 1500 of FIG. 32. As can be seen by the graph, each forward gear ratio is smaller than the one before it, such that the gear ratios are monotonically decreasing as the gear number increases. Gear diameters and power paths for the transmission 1500 layouts are selected such that the gear ratios monotonically decrease in this manner. Also shown is the number of meshes engaged to transmit torque for each associated forward ratio.

Figure 34:
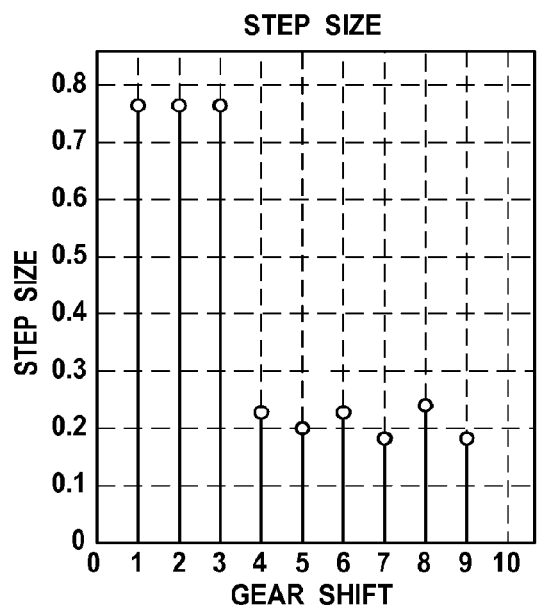
FIG. 34 is a graph illustrating step sizes for the transmission layout and gear diameters as shown in FIG. 32.

FIG. 34 illustrates step sizes for the gear diameters and layout of the transmission 1500 of FIG. 32. As can be seen by the graph, the step sizes are large in the lower, launch gears and shifts, and small in the higher gears and shifts.

FIG. 35 illustrates an embodiment of various powerpaths for the transmission 1500 of FIG. 32. The transmissions 1500 illustrated in FIGS. 28-31 have associated powerpaths and FIG. 32 is not intended to limit the spirit and scope of the disclosure. The transmission 1500 as shown in FIGS. 28-32 powershifts between consecutive gear ratios such that there are no torque interrupts during a shift. The torque or power path is illustrated as a dashed line in FIG. 35.

FIG. 35A illustrates the transmission 1500 in a first gear ratio. The torque path for the first gear ratio begins at the input shaft 1502, and continues through the dual clutch 1504 engaged such that the torque flows to the input shaft 1506. Clutch 1554 is engaged to connect journaled headset gear element 1522 to the input shaft 1506. Torque flows from the headset gear 1522 to countershaft gear element 1532, and sleeve shaft 1566. Clutch 1568 connects sleeve shaft 1566 to gear element 1528 to headset gear 1518. Clutch 1552 connects the headset gear element 1518 to shaft 1508 such that the torque flows to the headset gear 1514. Clutch 1586 is engaged to connect gear 1524 to the countershaft 1512. Torque then flows through countershaft 1512 to countershaft gear 1540, mainshaft gear element 1538, and to the output shaft 1558 of the transmission 1500.

FIG. 35B illustrates the transmission 1500 in a second gear ratio. The dual clutch is engaged such that torque flows to the input shaft 1508. Clutch 1586 is engaged to provide the torque flow path as shown.

FIG. 35C illustrates the transmission 1500 in a third gear ratio. The dual clutch is engaged such that torque flows to the input shaft 1506. Clutches 1568 and 1570 are engaged to provide the torque flow path as shown.

Figure 35D:
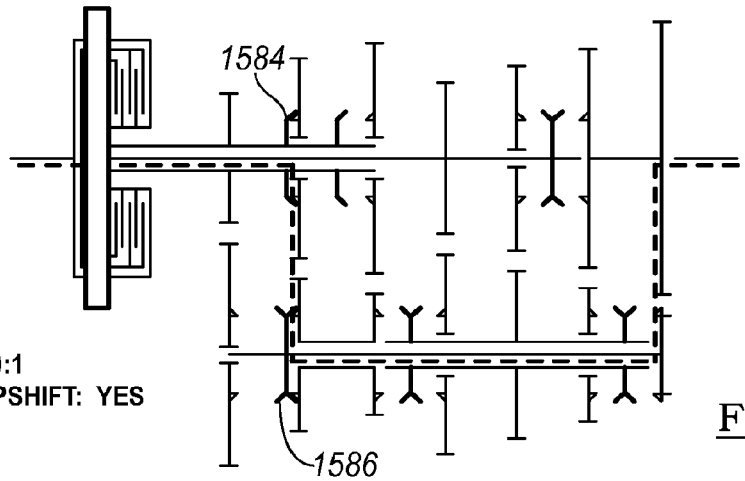

FIG. 35D illustrates the transmission 1500 in a fourth gear ratio. The dual clutch is engaged such that torque flows to the input shaft 1508. Clutches 1584 and 1586 are engaged to provide the torque flow path as shown.

Figure 35E:
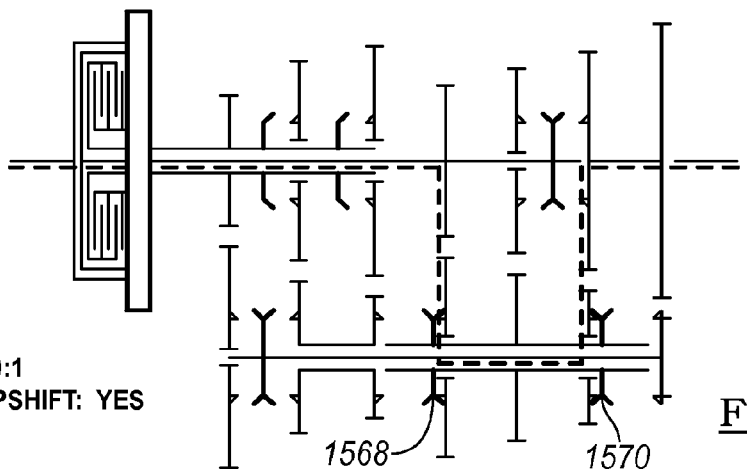

FIG. 35E illustrates the transmission 1500 in a fifth gear ratio. The dual clutch is engaged such that torque flow to the input shaft 1506. Clutches 1568 and 1570 are engaged to provide the torque flow path as shown.

Figure 35F:
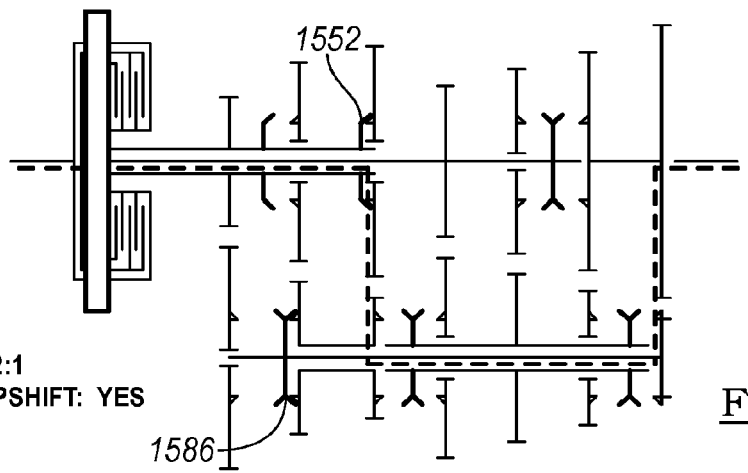

FIG. 35F illustrates the transmission 1500 in a sixth gear ratio. The dual clutch is engaged such that torque flow to the input shaft 1508. Clutches 1552 and 1586 are engaged to provide the torque flow path as shown.

Figure 35G:
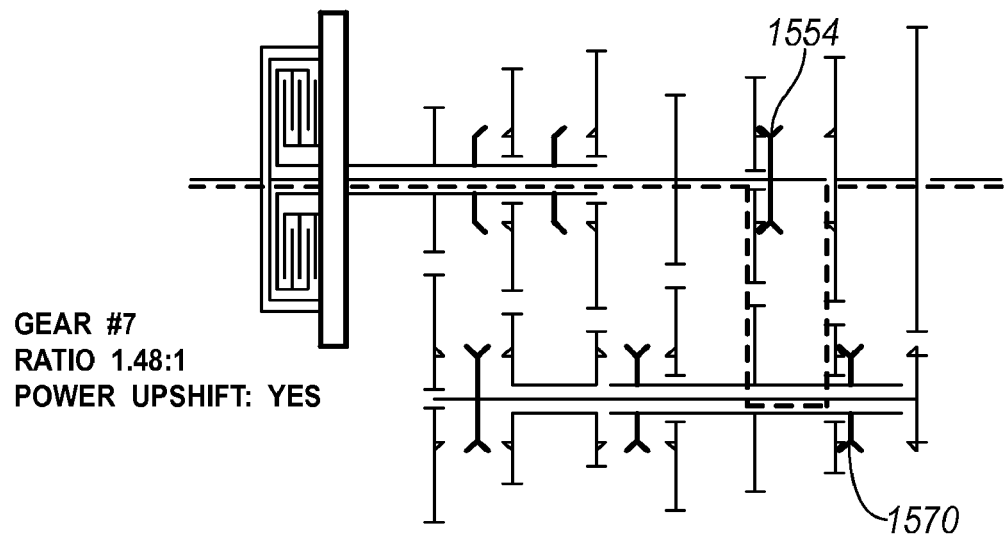

FIG. 35G illustrates the transmission 1500 in a seventh gear ratio. The dual clutch is engaged such that torque flow to the input shaft 1506. Clutches 1554 and 1570 are engaged to provide the torque flow path as shown.

Figure 35H:
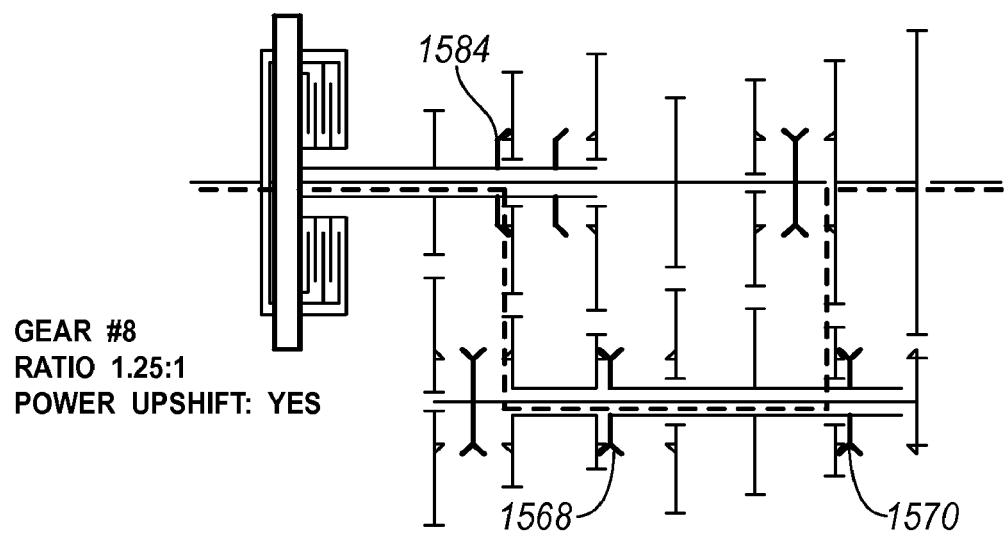

FIG. 35H illustrates the transmission 1500 in an eighth gear ratio. The dual clutch is engaged such that torque flow to the input shaft 11508. Clutches 1584, 1568, and 1570 are engaged to provide the torque flow path as shown.

Figure 35I:
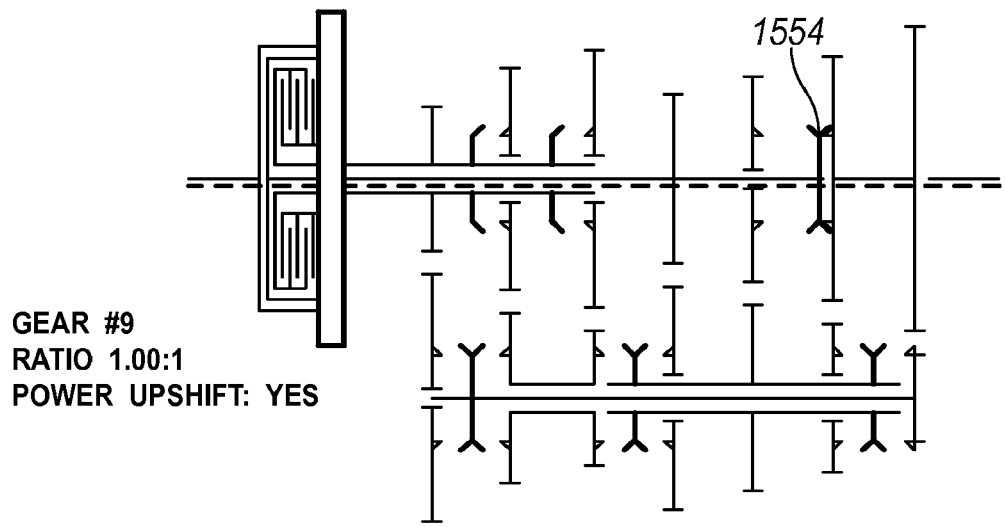

FIG. 35I illustrates the transmission 1500 in a ninth gear ratio. The dual clutch is engaged such that torque flow to the input shaft 1506. Clutch 1554 is engaged to provide the torque flow path as shown.

Figure 35J:
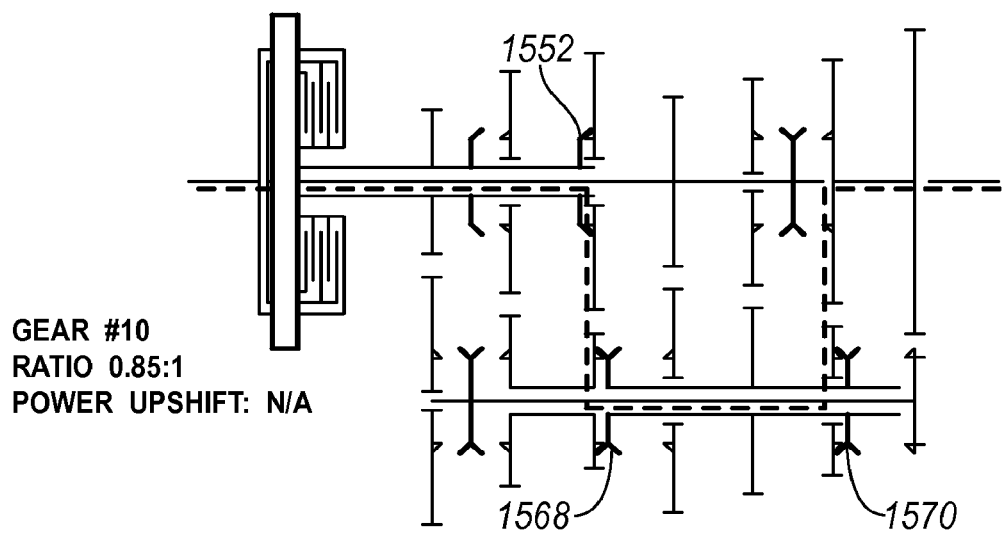

FIG. 35J illustrates the transmission 1500 in a ninth gear ratio. The dual clutch is engaged such that torque flow to the input shaft 1508. Clutches 1552, 1568, and 1570 are engaged to provide the torque flow path as shown.

FIG. 36 illustrates shift diagrams for the transmission 1500 as illustrated in FIG. 32. Of course, the transmissions 1500 illustrated in FIGS. 28-31 have associated powerpaths and shift patterns, and FIG. 36 is not intended to limit the spirit and scope of the disclosure. The transmission 1500 powershifts between consecutive gear ratios of the transmission 1500 such that there are no torque interrupts during a shift. The torque or power path of the driving gear ratio in FIG. 36 is shown as a solid line, and the torque or power path of the preselected gear ratio is illustrated as a dashed line.

Figure 36A:
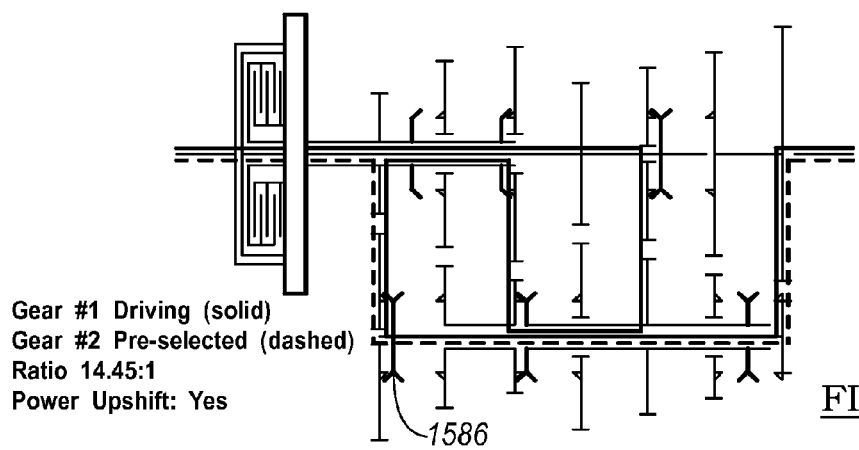
FIGS. 36A-J are shift diagrams for the transmission of FIG. 32.

FIG. 36A illustrates the transmission in first gear as shown in FIG. 35A and the preselected power path for after an upshift is completed into second gear, as shown in FIG. 35B. The transmission has clutch 1586 preselected and engaged such that when the dual clutch is activated to change the torque flow from input shaft 1506 to shaft 1508, the transmission shifts into second gear without a torque interrupt. Note that gear 1586 is also engaged and used for driving the transmission 1500 in first gear.

Figure 36B:
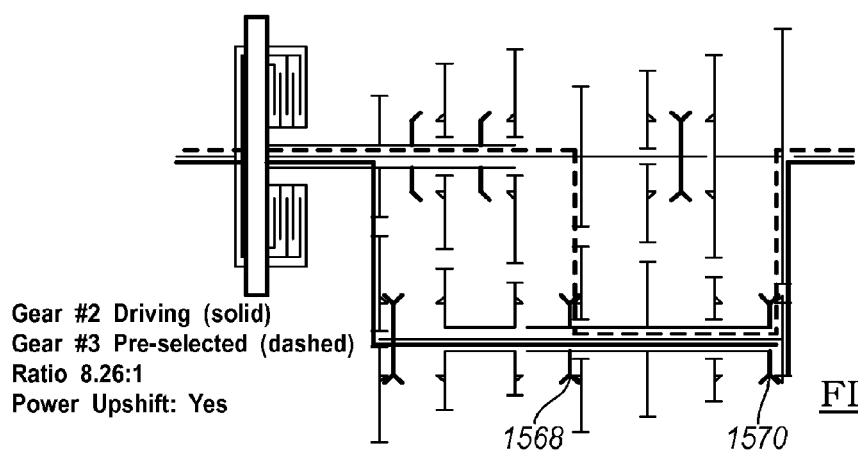

FIG. 36B illustrates the transmission in second gear as shown in FIG. 35B and the preselected power path for after an upshift is completed into third gear, as shown in FIG. 35C. The transmission has clutches 1568 and 1570 preselected and engaged such that when the dual clutch is activated to change the torque flow from input shaft 1508 to shaft 1506, the transmission shifts into third gear without a torque interrupt.

Figure 36C:
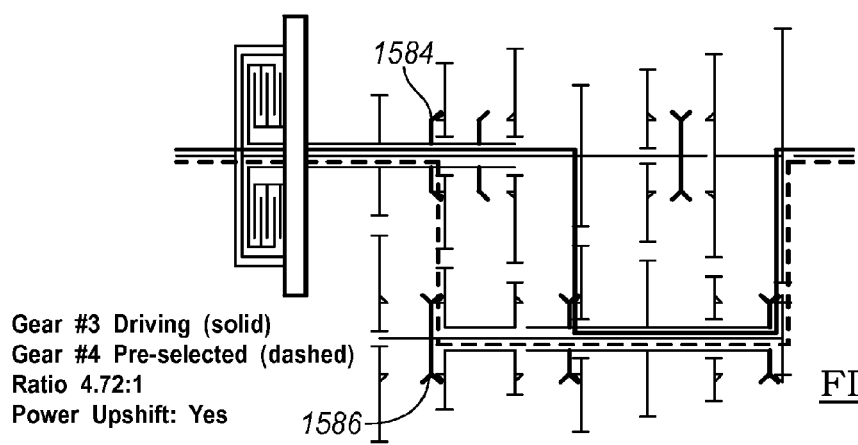

FIG. 36C illustrates the transmission in third gear as shown in FIG. 35C and the preselected power path for after an upshift is completed into fourth gear, as shown in FIG. 35D. The transmission has clutches 1584 and 1586 preselected and engaged such that when the dual clutch is activated to change the torque flow from input shaft 1506 to shaft 1508, the transmission shifts into fourth gear without a torque interrupt.

Figure 36D:
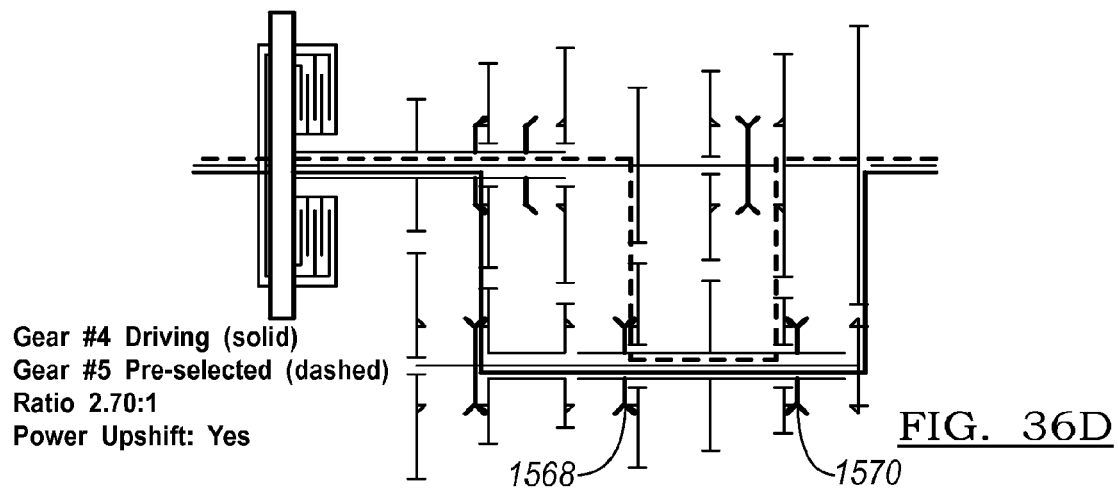

FIG. 36D illustrates the transmission in fourth gear as shown in FIG. 35D and the preselected power path for after an upshift is completed into fifth gear, as shown in FIG. 35E. The transmission has clutches 1568 and 1570 preselected and engaged such that when the dual clutch is activated to change the torque flow from input shaft 1508 to shaft 1506, the transmission shifts into fifth gear without a torque interrupt.

Figure 36E:
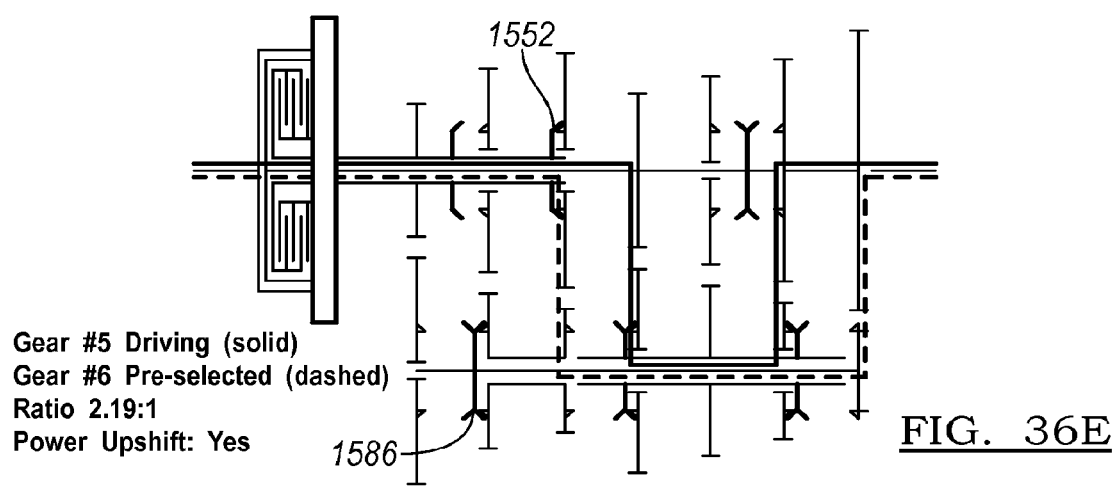

FIG. 36E illustrates the transmission in fifth gear as shown in FIG. 35E and the preselected power path for after an upshift is completed into sixth gear, as shown in FIG. 35F. The transmission has clutches 1552 and 1586 preselected and engaged such that when the dual clutch is activated to change the torque flow from input shaft 1506 to shaft 1508, the transmission shifts into sixth gear without a torque interrupt.

Figure 36F:
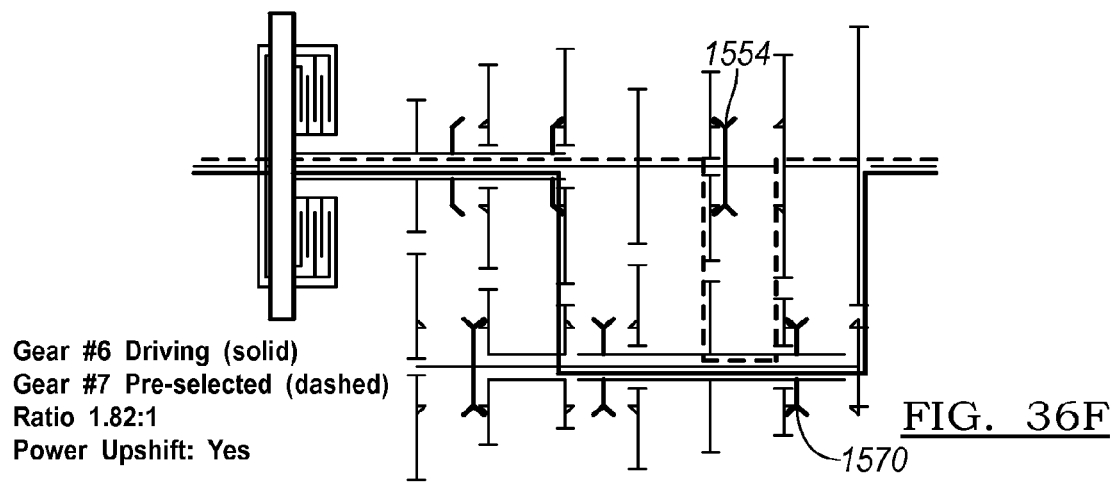

FIG. 36F illustrates the transmission in sixth gear as shown in FIG. 35F and the preselected power path for after an upshift is completed into seventh gear, as shown in FIG. 35G. The transmission has clutches 1554 and 1570 preselected and engaged such that when the dual clutch is activated to change the torque flow from input shaft 1508 to shaft 1506, the transmission shifts into seventh gear without a torque interrupt.

Figure 36G:
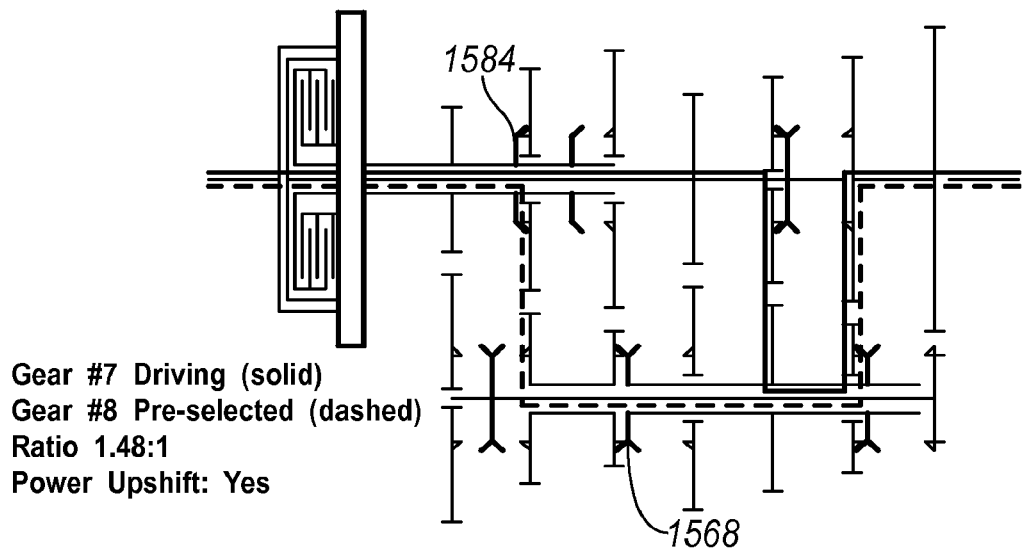

FIG. 36G illustrates the transmission in seventh gear as shown in FIG. 35G and the preselected power path for after an upshift is completed into eighth gear, as shown in FIG. 35H. The transmission has clutches 1584 and 1568 preselected and engaged such that when the dual clutch is activated to change the torque flow from input shaft 1506 to shaft 1508, the transmission shifts into eighth gear without a torque interrupt.

Figure 36H:
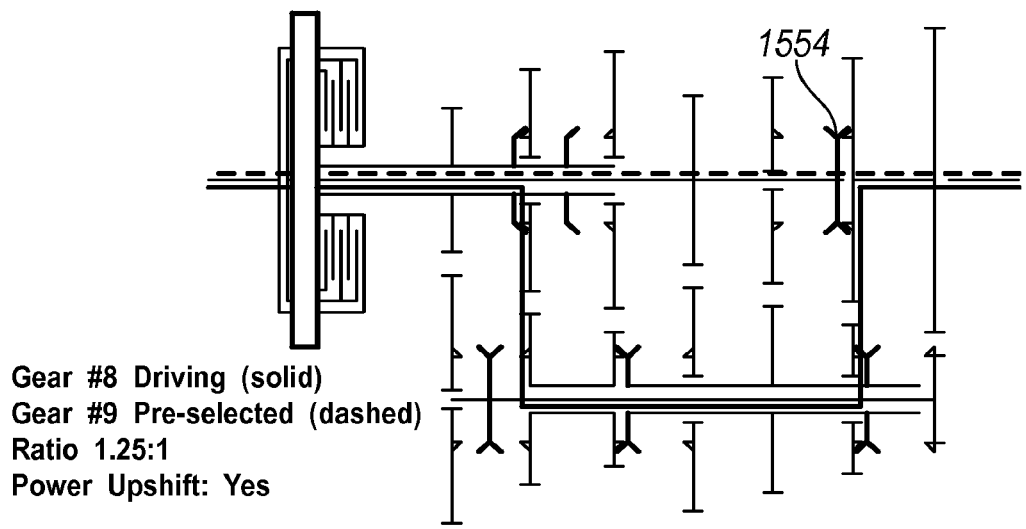

FIG. 36H illustrates the transmission in eighth gear as shown in FIG. 35H and the preselected power path for after an upshift is completed into ninth gear, as shown in FIG. 35I. The transmission has clutch 1554 preselected and engaged such that when the dual clutch is activated to change the torque flow from input shaft 1508 to shaft 1506, the transmission shifts into ninth gear without a torque interrupt.

Figure 36I:
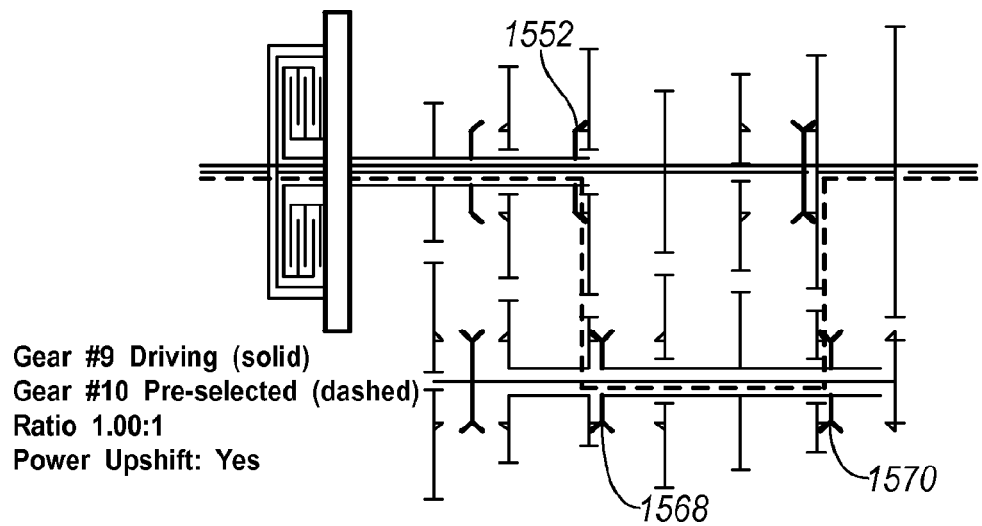

FIG. 36I illustrates the transmission in ninth gear as shown in FIG. 35I and the preselected power path for after an upshift is completed into tenth gear, as shown in FIG. 35J. The transmission has clutches 1552, 1568, and 1570 preselected and engaged such that when the dual clutch is activated to change the torque flow from input shaft 1506 to shaft 1508, the transmission shifts into tenth gear without a torque interrupt.

Figure 36J:
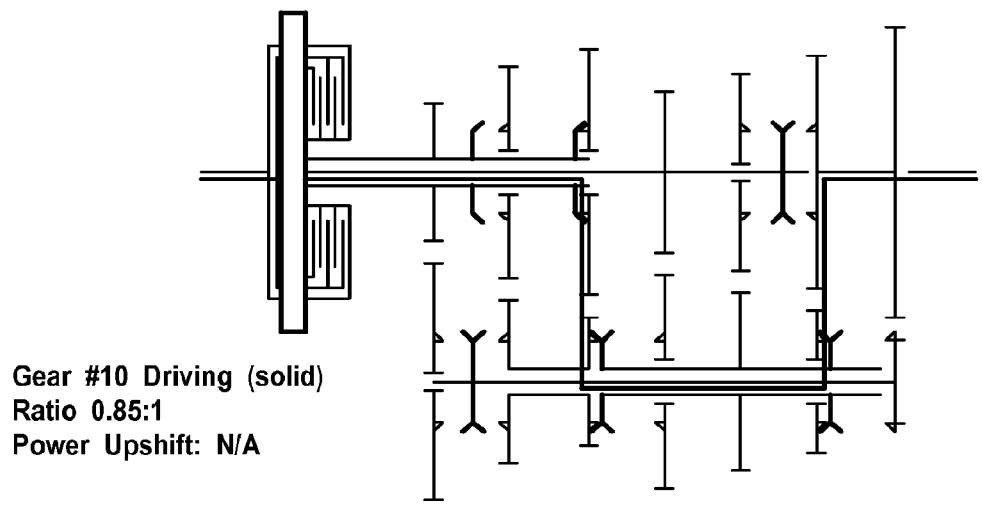

FIG. 36J illustrates the transmission in tenth gear as shown in FIG. 35J. The transmission 1500 is now at its highest gear ratio, and no further upshifting occurs.

Various embodiments of the present disclosure have associated non-limiting advantages. For example, a dual clutch transmission is provided that has a single countershaft and seven gear meshes. The seven gear meshes cooperate to provide at least nine gear or speed ratios for the transmission. The transmission is fully powershiftable for consecutive shifts between the nine gear ratios, thereby eliminating torque interrupts caused by shifting.

In one aspect of the disclosure, a dual clutch transmission is provided with a first input shaft, a second input shaft concentric with the first input shaft, a mainshaft coaxial with the first and second input shafts, and a countershaft offset from the mainshaft. The countershaft is drivably connected to the first input shaft, the second input shaft, and the mainshaft. The countershaft supports seven countershaft gear elements forming no more than seven gear meshes for the transmission. The seven gear meshes cooperate to provide at least nine forward gear ratios. The transmission is powershiftable between at least nine consecutive gear ratios such that no torque interrupt occurs during the shifts.

In another aspect of the disclosure, a dual clutch transmission is provided with a first input shaft supporting a first headset gear element, and a second input shaft concentric with the first input shaft and supporting a second and a third headset gear element. The transmission has a first mainshaft coaxial with the first input shaft and supporting a pair of gear elements, and a second mainshaft coaxial with the first mainshaft and supporting a pair of gear elements. A countershaft is offset from the first input shaft and supports seven countershaft gear elements drivably connected to respective gear elements on the first and second input shafts and the first and second mainshaft sections thereby forming seven gear meshes for the transmission. The seven gear meshes provide at least nine forward gear ratios. The transmission is powershiftable between consecutive gear ratios of the at least nine gear ratios such that no torque interrupt occurs during the shifts.

In yet another aspect of the disclosure, a dual clutch transmission is provided with a first input shaft supporting a first headset gear element and a second headset gear element. The transmission also has a second input shaft concentric with the first input shaft and supporting a third headset gear element, a fourth headset gear element, and a fifth headset gear element. A mainshaft is coaxial with the first input shaft and supports a pair of gear elements. A countershaft is offset from the first input shaft and supports seven countershaft gear elements drivably connected to respective gear elements on the first and second input shafts and the mainshaft thereby forming seven gear meshes for the transmission. The seven gear meshes provide at least nine forward gear ratios. The transmission is powershiftable between consecutive gear ratios of the at least nine gear ratios such that no torque interrupt occurs during the shifts.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A dual clutch transmission comprising:
   a first input shaft supporting a first headset gear element and a second headset gear element;
   a second input shaft concentric with the first input shaft and supporting a third headset gear element, a fourth headset gear element, and a fifth headset gear element;
   a mainshaft coaxial with the first input shaft and supporting a pair of mainshaft gear elements; and
   a countershaft offset from the first input shaft and supporting seven countershaft gear elements drivably connected to respective gear elements on the first and second input shafts and the mainshaft thereby forming seven forward gear meshes for the transmission, the seven gear meshes providing at least nine forward gear ratios; and an output shaft coaxial with and connected to the mainshaft for rotation therewith;
   wherein the transmission is powershiftable between consecutive gear ratios of the at least nine gear ratios such that no torque interrupt occurs during sequential shifts.

2. The dual clutch transmission of claim 1 wherein the countershaft has a first sleeve shaft journaled to the countershaft and supporting two of the seven countershaft gear elements in meshed engagement respectively with the fifth headset gear element and one of the pair of mainshaft gear elements.

3. The dual clutch transmission of claim 2 wherein the countershaft has a second sleeve shaft journaled to the countershaft and spaced longitudinally apart from the first sleeve shaft, the second sleeve shaft supporting three of the seven countershaft gear elements in meshed engagement respectively with the second, third and fourth headset gear elements.

4. The dual clutch transmission of claim 3 wherein the countershaft directly supports the remaining two of the seven countershaft gear elements in meshed engagement respectively with the first headset gear element and the other of the pair of mainshaft gear elements.

5. The dual clutch transmission of claim 1 wherein the countershaft has a first sleeve shaft journaled to the countershaft and supporting two of the seven countershaft gear elements in meshed engagement respectively with the third and fourth headset gear elements.

6. The dual clutch transmission of claim 5 wherein the countershaft has a second sleeve shaft journaled to the countershaft and spaced longitudinally apart from the first sleeve shaft, the second sleeve shaft supporting three of the seven countershaft gear elements in meshed engagement respectively with the fifth headset gear element and one of the pair of mainshaft gear elements.

7. The dual clutch transmission of claim 6 wherein the countershaft directly supports the remaining three of the seven countershaft gear elements in meshed engagement respectively with the first headset gear element, the second headset gear element, and the other of the pair of mainshaft gear elements.

8. The dual clutch transmission of claim 1 wherein the countershaft has a first sleeve shaft journaled to the countershaft and supporting two of the seven countershaft gear elements in meshed engagement respectively with the fourth and fifth headset gear elements.

9. The dual clutch transmission of claim 8 wherein the countershaft has a second sleeve shaft journaled to the countershaft and spaced longitudinally apart from the first sleeve shaft, the second sleeve shaft supporting three of the seven countershaft gear elements in meshed engagement respectively with the first and second headset gear elements and one of the pair of mainshaft gear elements.

10. The dual clutch transmission of claim 9 wherein the countershaft directly supports the remaining two of the seven countershaft gear elements in meshed engagement respectively with the third headset gear element and the other of the pair of mainshaft gear elements.

11. A dual clutch transmission comprising:
    a first input shaft supporting a first headset gear element and a second headset gear element;
    a second input shaft concentric with the first input shaft and supporting a third headset gear element, a fourth headset gear element, and a fifth headset gear element;
    a mainshaft coaxial with the first input shaft and supporting a pair of mainshaft gear elements; and
    a countershaft offset from the first input shaft and supporting seven countershaft gear elements drivably connected to respective gear elements on the first and second input shafts and the mainshaft thereby forming seven forward gear meshes for the transmission, the seven gear meshes providing at least nine forward gear ratios;
    wherein the transmission is powershiftable between consecutive gear ratios of the at least nine gear ratios such that no torque interrupt occurs during sequential shifts.

12. The dual clutch transmission of claim 11, further comprising an output shaft coaxial with and connected to the mainshaft for rotation therewith.

13. The dual clutch transmission of claim 11 wherein the countershaft has a first sleeve shaft journaled to the countershaft and supporting two of the seven countershaft gear elements in meshed engagement respectively with the fifth headset gear element and one of the pair of mainshaft gear elements.

14. The dual clutch transmission of claim 13 wherein the countershaft has a second sleeve shaft journaled to the countershaft and spaced longitudinally apart from the first sleeve shaft, the second sleeve shaft supporting three of the seven countershaft gear elements in meshed engagement respectively with the second, third and fourth headset gear elements.

15. The dual clutch transmission of claim 14 wherein the countershaft directly supports the remaining two of the seven countershaft gear elements in meshed engagement respectively with the first headset gear element and the other of the pair of mainshaft gear elements.

16. The dual clutch transmission of claim 11 wherein the countershaft has a first sleeve shaft journaled to the countershaft and supporting two of the seven countershaft gear elements in meshed engagement respectively with the third and fourth headset gear elements.

17. The dual clutch transmission of claim 16 wherein the countershaft has a second sleeve shaft journaled to the countershaft and spaced longitudinally apart from the first sleeve shaft, the second sleeve shaft supporting three of the seven countershaft gear elements in meshed engagement respectively with the fifth headset gear element and one of the pair of mainshaft gear elements.

18. The dual clutch transmission of claim 17 wherein the countershaft directly supports the remaining three of the seven countershaft gear elements in meshed engagement respectively with the first headset gear element, the second headset gear element, and the other of the pair of mainshaft gear elements.

19. The dual clutch transmission of claim 11 wherein the countershaft has a first sleeve shaft journaled to the countershaft and supporting two of the seven countershaft gear elements in meshed engagement respectively with the fourth and fifth headset gear elements.

20. The dual clutch transmission of claim 19 wherein the countershaft has a second sleeve shaft journaled to the countershaft and spaced longitudinally apart from the first sleeve shaft, the second sleeve shaft supporting three of the seven countershaft gear elements in meshed engagement respectively with the first and second headset gear elements and one of the pair of mainshaft gear elements, and wherein the countershaft directly supports the remaining two of the seven countershaft gear elements in meshed engagement respectively with the third headset gear element and the other of the pair of mainshaft gear elements.

* * * * *